(12) United States Patent
Lin

(10) Patent No.: US 7,774,075 B2
(45) Date of Patent: Aug. 10, 2010

(54) AUDIO-VISUAL THREE-DIMENSIONAL INPUT/OUTPUT

(76) Inventor: Julius J. Y. Lin, 10546 Red Fir Ct., Cupertino, CA (US) 95014

( * ) Notice: Subject to any disclaimer, the term of this patent is extended or adjusted under 35 U.S.C. 154(b) by 1349 days.

(21) Appl. No.: 11/174,348

(22) Filed: Jun. 30, 2005

(65) Prior Publication Data

US 2005/0264527 A1 Dec. 1, 2005

Related U.S. Application Data

(63) Continuation-in-part of application No. 10/703,184, filed on Nov. 5, 2003, now Pat. No. 7,337,410.

(60) Provisional application No. 60/424,557, filed on Nov. 6, 2002, provisional application No. 60/591,611, filed on Jul. 28, 2004.

(51) Int. Cl.
G05B 11/01 (2006.01)
G05B 15/00 (2006.01)
G01B 11/30 (2006.01)
G01B 11/14 (2006.01)
G06K 9/00 (2006.01)
G06K 9/36 (2006.01)
G06K 9/20 (2006.01)
G09G 5/00 (2006.01)
G09G 5/08 (2006.01)

(52) U.S. Cl. ............................ 700/17; 700/83; 345/156; 345/158; 345/168; 356/600; 356/614; 356/625; 382/103; 382/104; 382/106; 382/286

(58) Field of Classification Search ................. 345/156, 345/158, 168; 700/17, 83; 382/103, 104, 382/106, 286; 356/600, 614, 625
See application file for complete search history.

(56) References Cited

U.S. PATENT DOCUMENTS

| 4,988,981 A | | 1/1991 | Zimmerman | |
|---|---|---|---|---|
| 5,581,484 A | | 12/1996 | Prince | |
| 5,697,001 A | * | 12/1997 | Ring et al. | 396/121 |

(Continued)

OTHER PUBLICATIONS

Wu, Andrew, A Virtual 3D Blackboard: 3D Finger Tracking Using a Single Camera, 8 pp.

(Continued)

Primary Examiner—Ronald D Hartman, Jr.

(57) ABSTRACT

Methods and apparatus for determining an object's three-dimensional location (i.e. real world coordinates) using the audio-video infrastructure of a 3G cellular phone or a 3C (Computer, Communications, Consumer) electronic device. A first detection device (e.g. a camera) is used to capture images of the objects. The captured image data is used to compute location data of the object in a first two-dimensional plane. A second detection device (e.g. microphone or infrared detector) may be used to collect additional location data in a second plane, which when combined with image data from the captured images allows the determination of the real world coordinates (x, y, z) of the object. The real-world coordinate data may be used in various applications. If the size of an object of interest is known or can be calculated, and the size of the projected image does not vary due to rotation of the object, a single camera (e.g. the camera in a 3G or 3C mobile device) may be used to obtain three-dimensional coordinate data for the applications.

21 Claims, 37 Drawing Sheets
(4 of 37 Drawing Sheet(s) Filed in Color)

U.S. PATENT DOCUMENTS

| | | | |
|---|---|---|---|
| 5,767,842 A * | 6/1998 | Korth | 345/168 |
| 6,094,625 A | 7/2000 | Ralston | |
| 6,201,484 B1 | 3/2001 | Russell | |
| 6,215,498 B1 | 4/2001 | Filo et al. | |
| 6,600,480 B2 | 7/2003 | Natoli | |
| 6,611,252 B1 | 8/2003 | DuFaux | |
| 6,611,253 B1 | 8/2003 | Cohen | |
| 6,614,422 B1 * | 9/2003 | Rafii et al. | 345/168 |
| 6,670,894 B2 | 12/2003 | Mehring | |
| 6,711,293 B1 * | 3/2004 | Lowe | 382/219 |
| 6,911,972 B2 * | 6/2005 | Brinjes | 345/175 |
| 6,965,374 B2 | 11/2005 | Villet et al. | |
| 7,162,084 B2 * | 1/2007 | Herley | 382/173 |
| 7,337,410 B2 | 2/2008 | Lin | |
| 2002/0126026 A1 | 9/2002 | Lee et al. | |
| 2004/0178995 A1 | 9/2004 | Sterling | |
| 2004/0184640 A1 | 9/2004 | Bang et al. | |
| 2004/0258328 A1 * | 12/2004 | Adler | 382/286 |
| 2005/0110771 A1 | 5/2005 | Hall et al. | |
| 2005/0156914 A1 | 7/2005 | Lipman et al. | |
| 2008/0130016 A1 * | 6/2008 | Steinbichler et al. | 356/610 |
| 2008/0150899 A1 | 6/2008 | Lin | |
| 2009/0129628 A1 * | 5/2009 | Mirbach et al. | 382/103 |

OTHER PUBLICATIONS

International Search Report dated Mar. 11, 2004, PCT/US2003/035308, 1 page.

International Search Report dated Aug. 4, 2006, PCT/US2005/027037, 3 pages.

* cited by examiner

| Thresholds | Property 1 | Values 1 | Property 2 | Values 2 | Comment |
|---|---|---|---|---|---|
| Key Press | Vector | < -1 mm | Velocity | 1 sec. | If previous coordinate (x,y,z,t) passed (a status in key object) the *released coordinate* of a key and current vector <-1 mm (e.g. -3), which will make the current coordinate reach the "key hold" coordinate eventually as defined below, when the current (x,y,z,t) reach the "key hold" surface, then the key is considered to be pressed. Less than -1 mm means the sensor is going toward the object surface with distance >1 mm. With large velocity time frame 1 second, means VEM can also allow for a very slow typist. |
| Key Release | Vector | > 1mm | Velocity | 1 sec | If previous coordinate (x,y,z,t) passed (a status in key object) the *pressed coordinate* of a key and current vector >1 mm/s. When the current (x,y,z,t) eventually reach the "*released coordinate*" object plane, then the key is considered to be released. Greater than 1mm means the sensor is moving outward the relative perpendicular object plane with distance >1mm in 1 second time frame. |
| Key Hold | Vector | 1mm | | | If abs(vector)<1mm, (means the calibrated coordinates of the sensor is within 1mm vector difference to the *pressed coordinate* of the world model of a key), then the key is still on hold. Abs() means moving distance without direction. |
| Key Repeating | Vector | 1mm | Velocity | 0.1sec | When a key is on hold as defined above, VEM will generate repeating key 10 characters per second. |
| Mouse Move | Vector | <1mm | Velocity | 1 sec | If abs(vector)<1mm within 1 second, VEM considers as unintentional mouse movement. |
| Mouse Button Release | Vector | 1mm | Velocity | 1 sec | Same principle as Key Release. If vector >1mm, then button is released. Which means moving a distance >2mm |
| Mouse Button Hold | Vector | 1mm | | | Sample principle as Key Hold. If abs (vector)<1mm, the button is being held. |
| Mouse Button Click | Vector | 1mm | Velocity | 1 sec | Same principle as Key Press. If vector <-1mm and velocity >1 mm/sec, then the button is considered to be pressed. |
| Mouse Button Double Click | Vector | 2mm | Velocity | 0.4 sec | If consequential qualified clicks happen in 0.4 seconds, then to be considered a double click. |

Figure 11

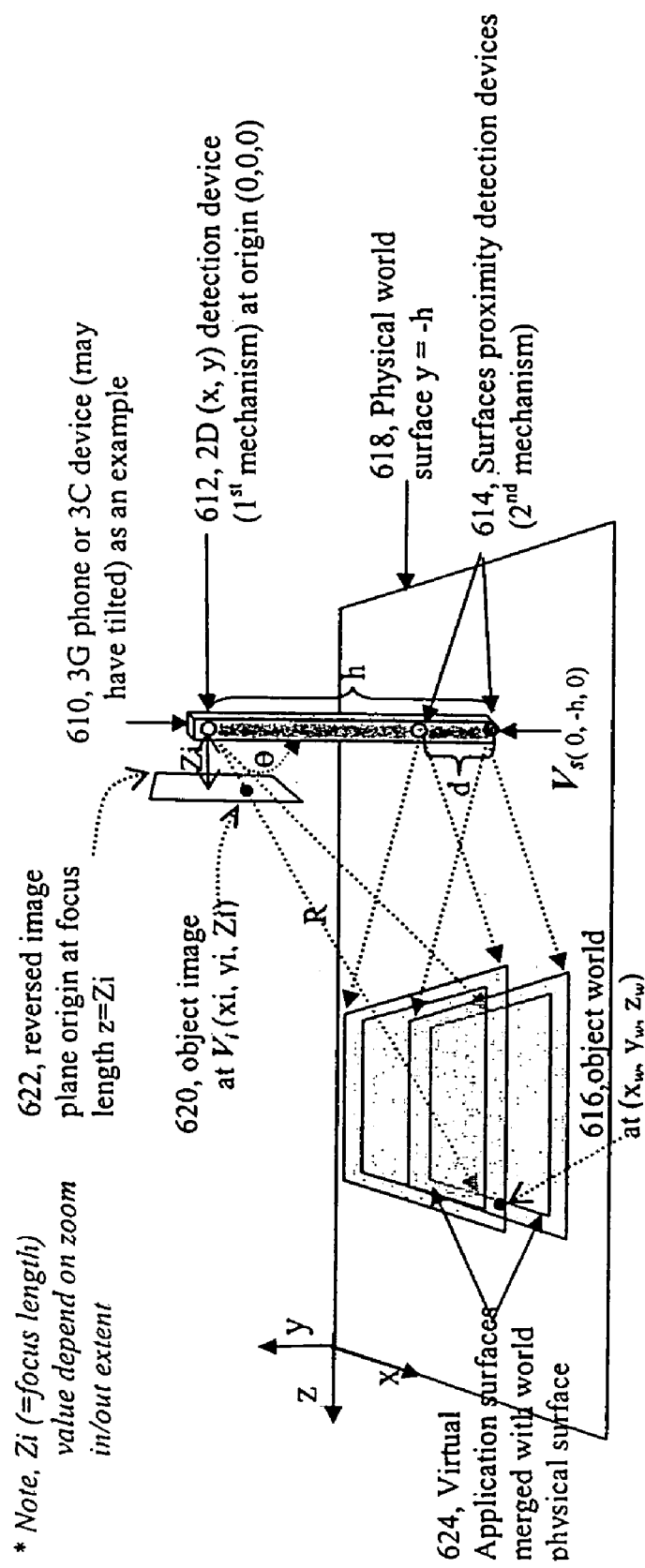
Fig. 22, General configuration of 'Audio-Visual 3D I/O' method using dual mechanisms

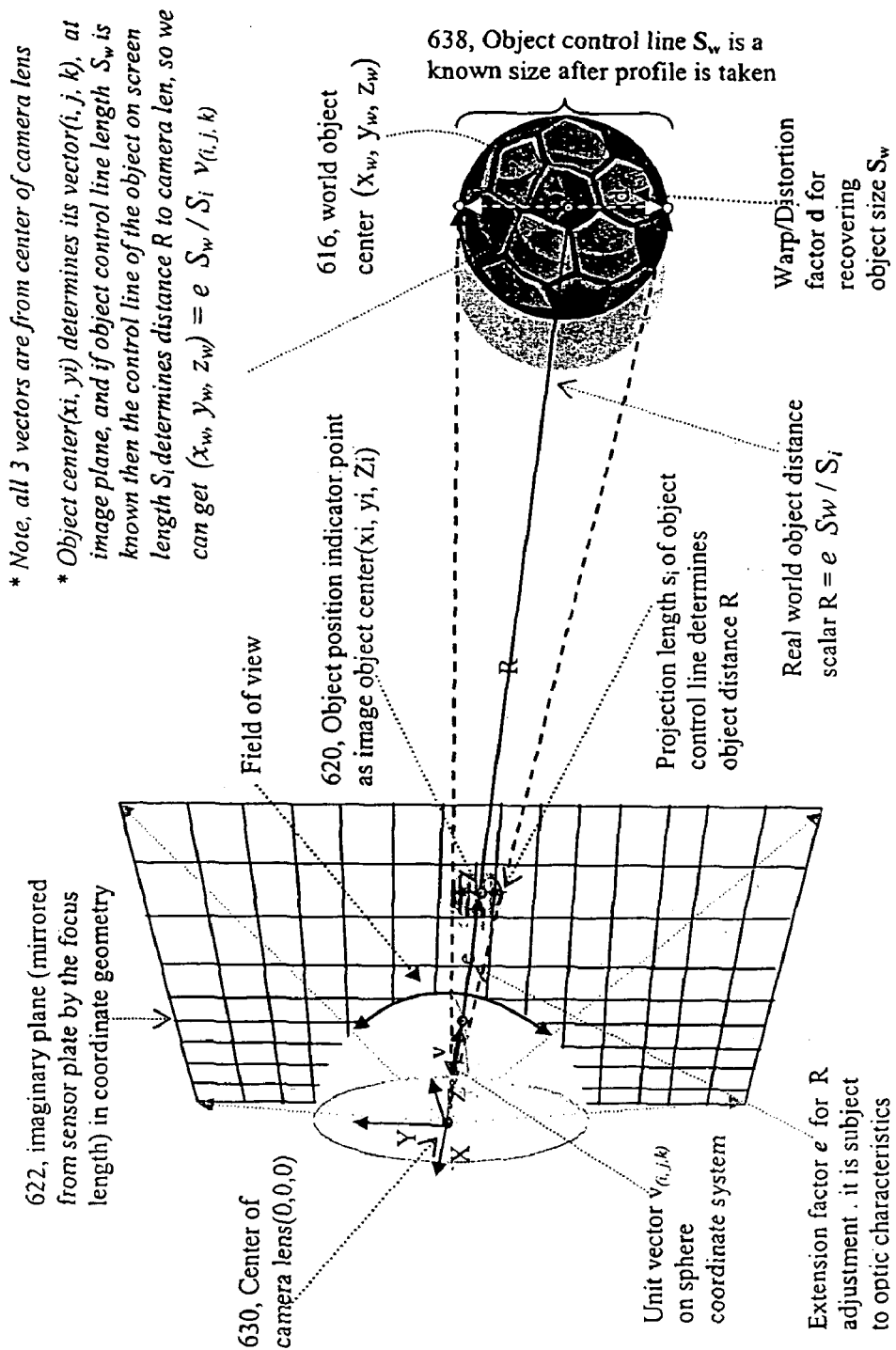
Fig. 23, General configuration of 'Mono-View 3D' I/O method using single image

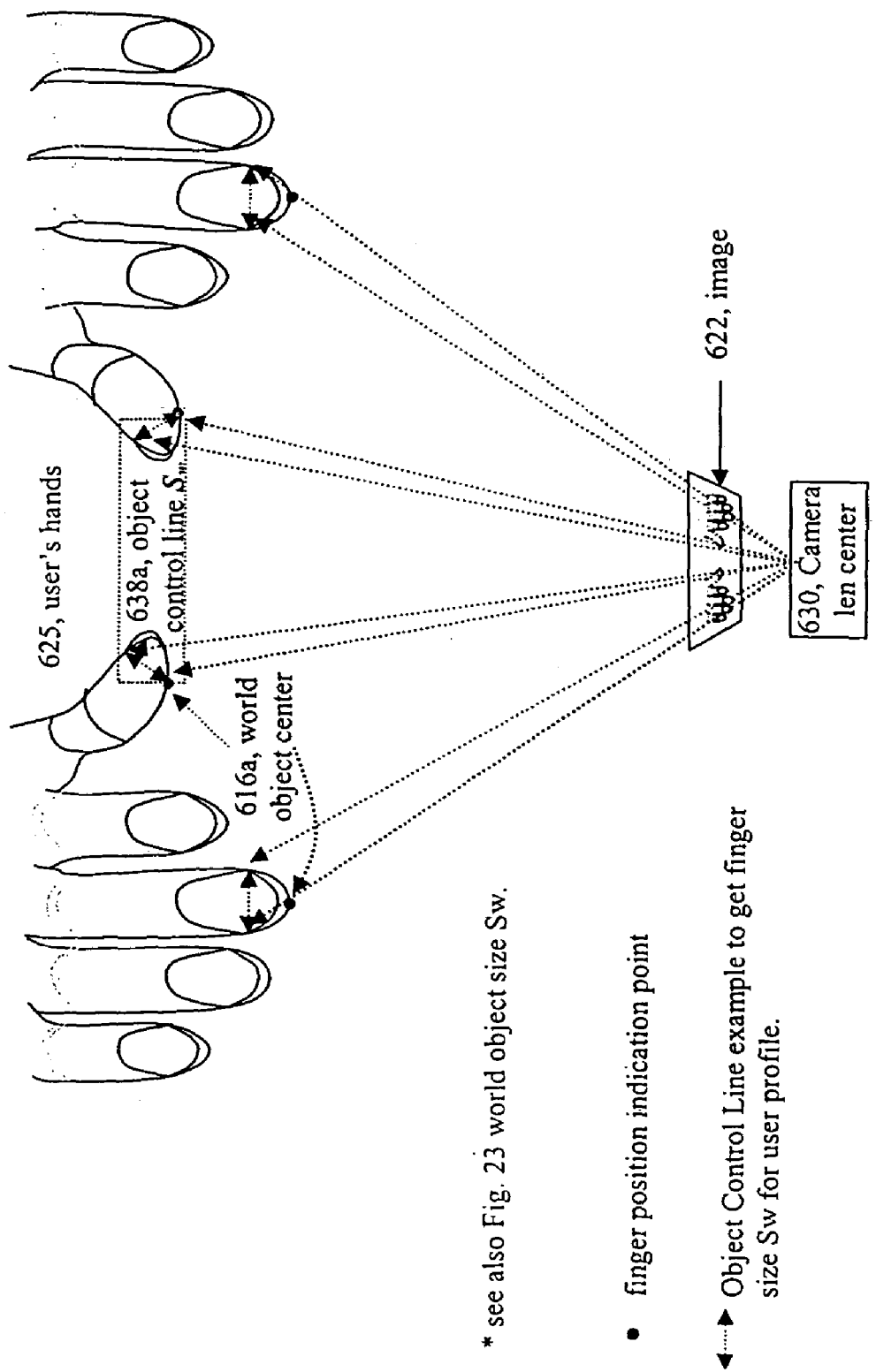
Fig. 24, Example of object control points and lines for fingertip position and size

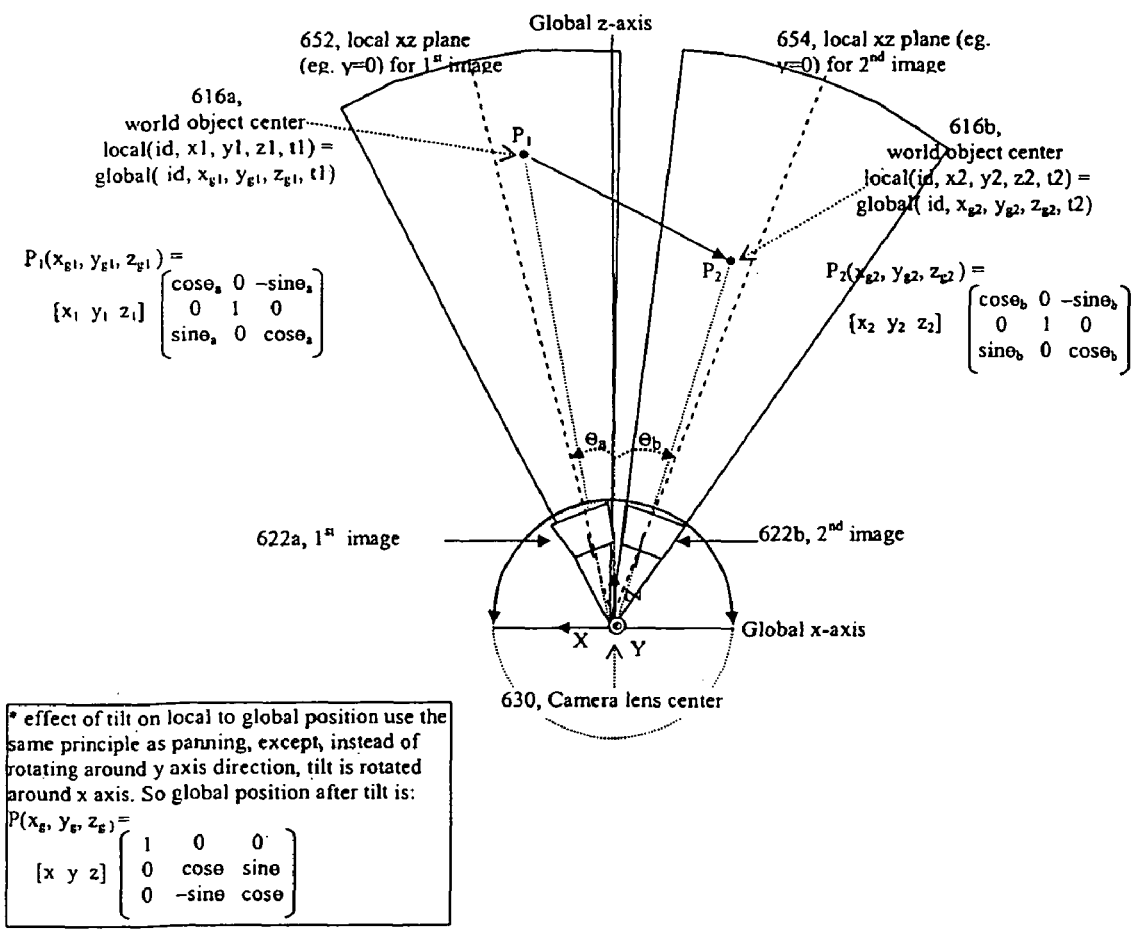
Fig. 25, Panning/Tilting effect on local to global position evaluation as an

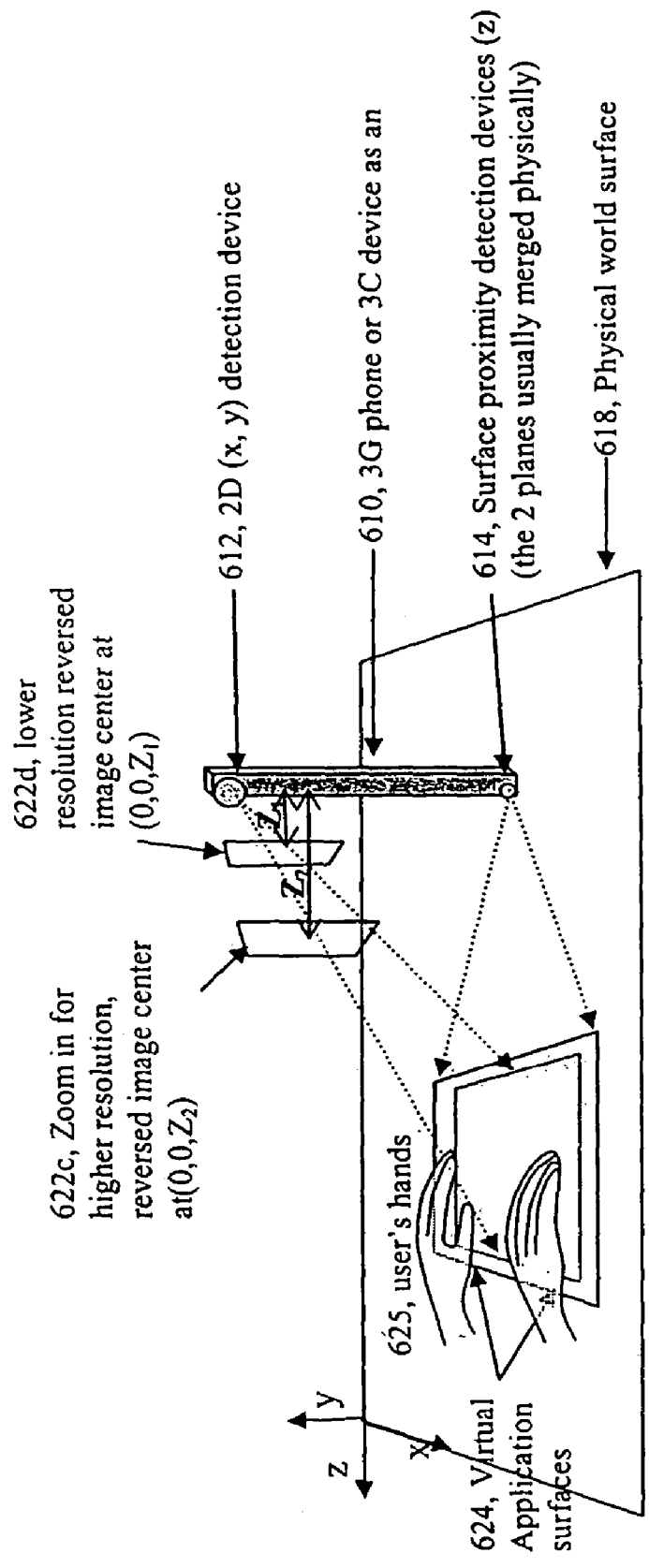
Fig. 26, Optical zoom in and focus effects on resolution and accuracy

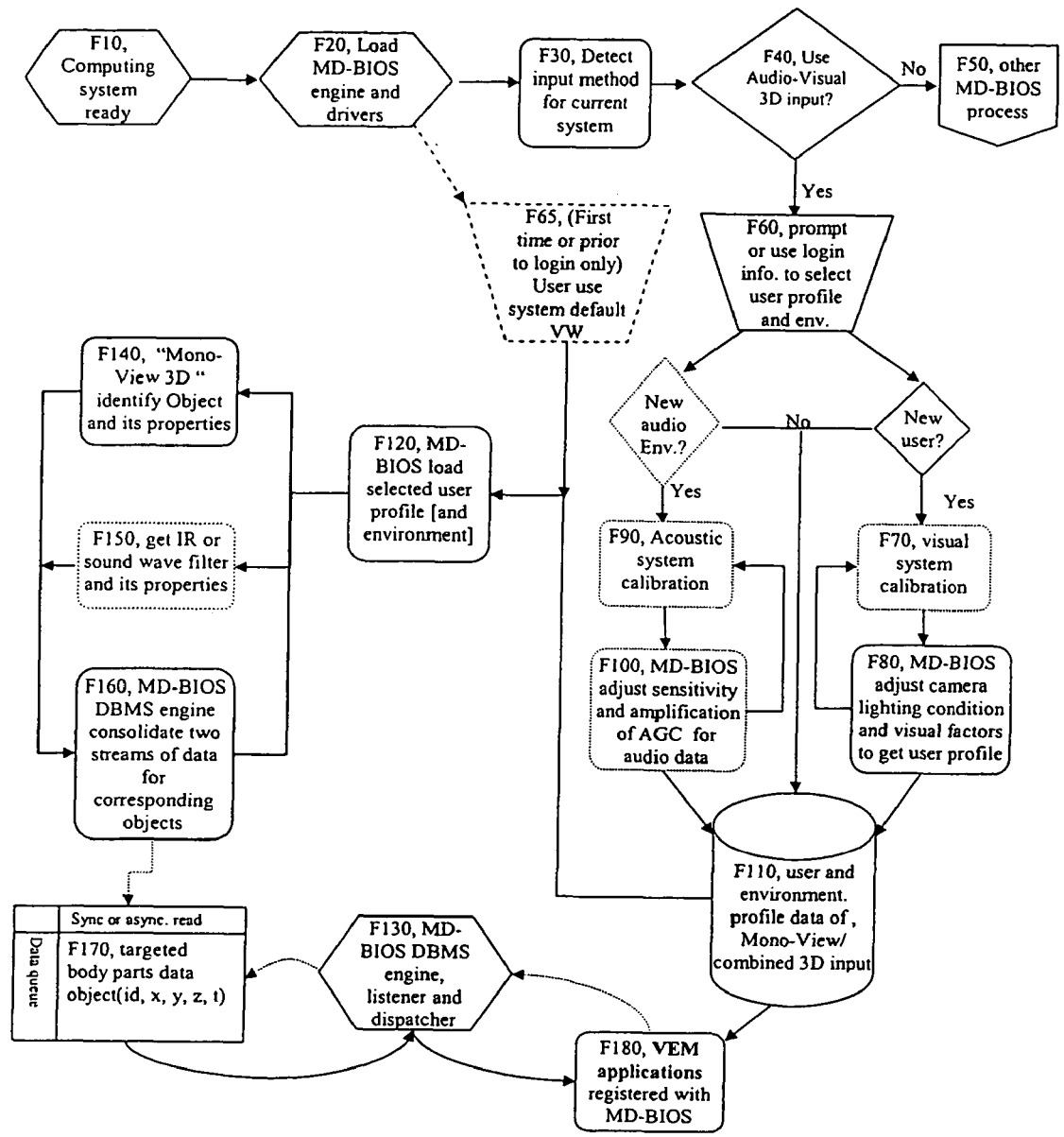
Fig. 27, General Flowchart for Audio-Visual 3D input method of MD-BIOS infrastructure

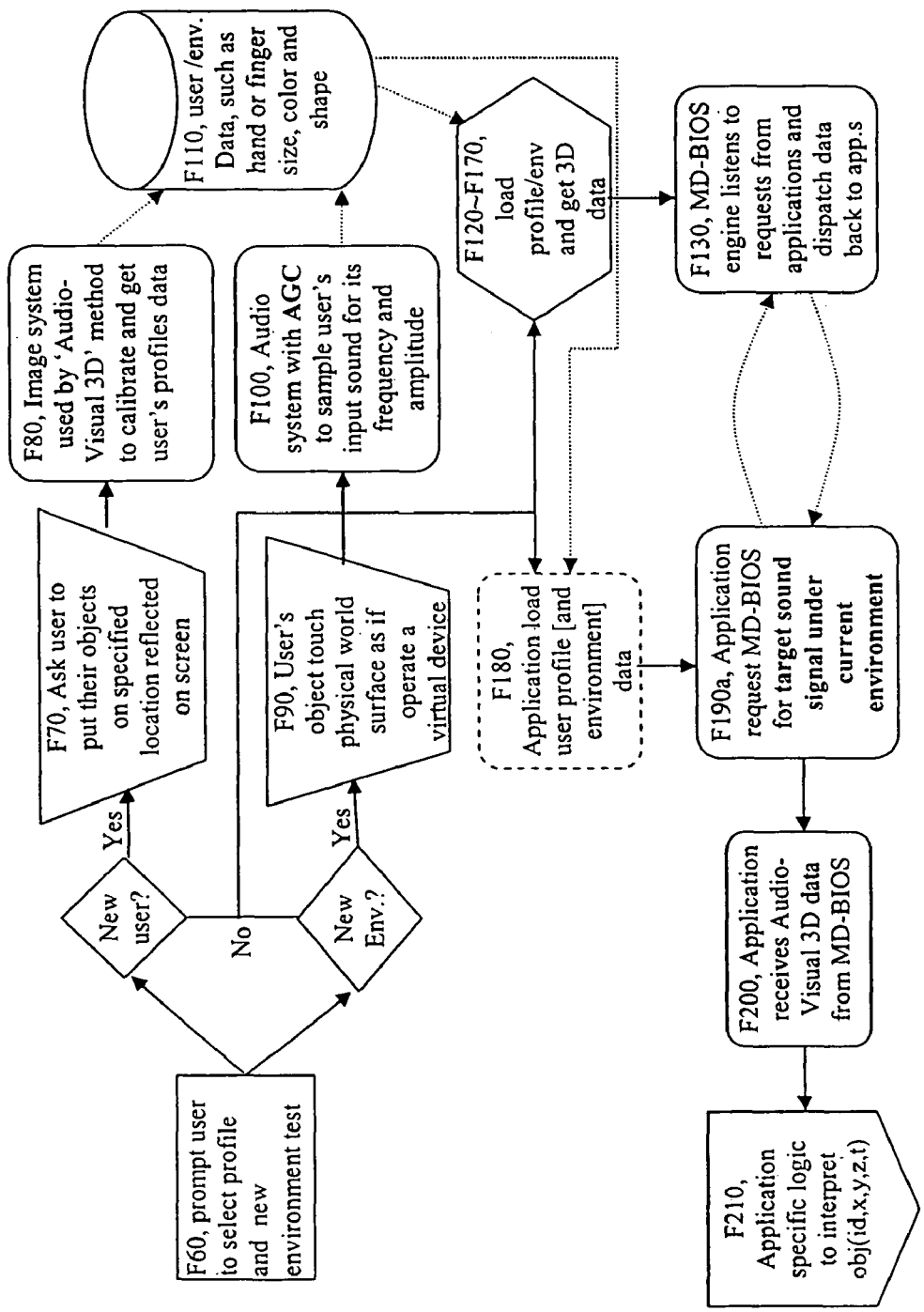
Fig. 28, xz plane detection example a) use audio system of Audio-Visual 3D method

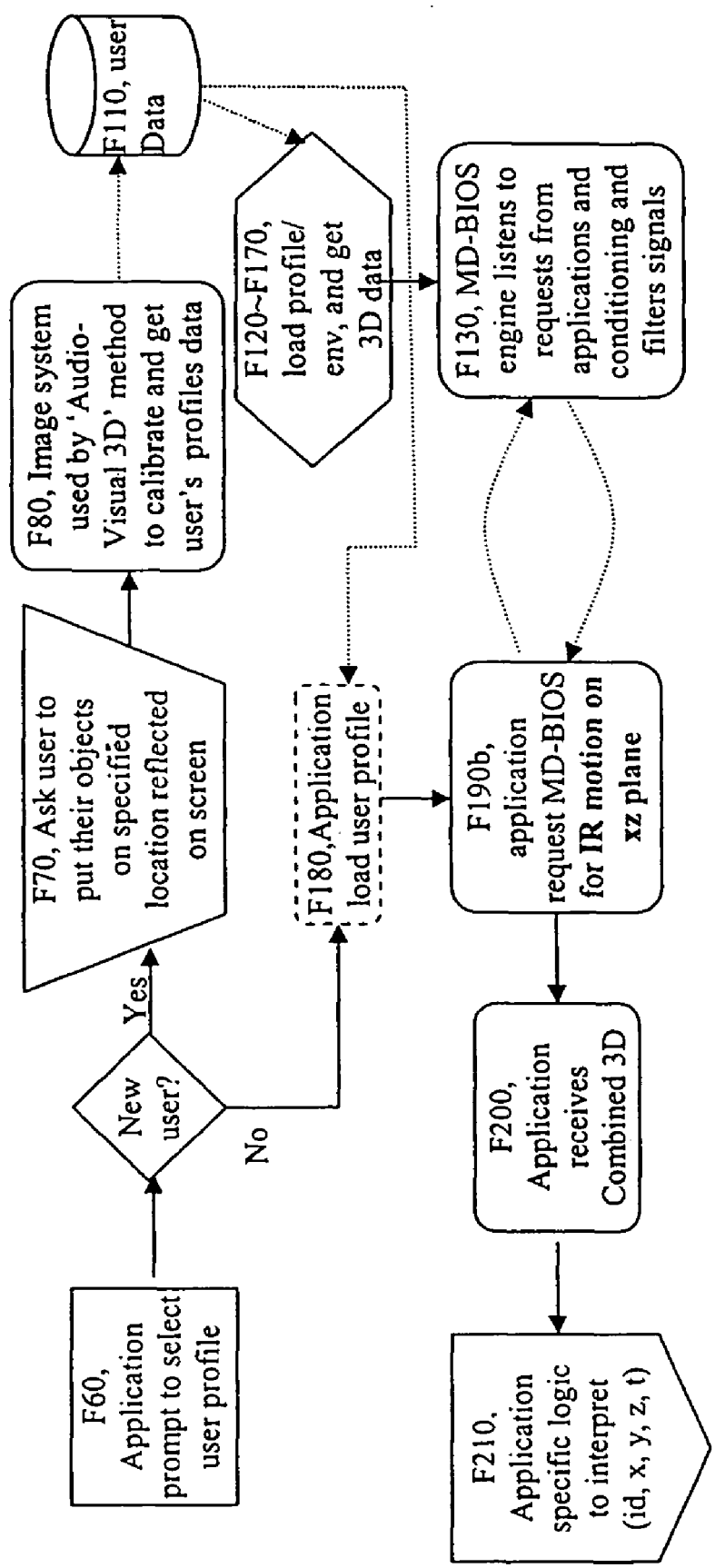
Fig. 29, xz plane detection example b) use IR system of "Audio-Visual 3D" method

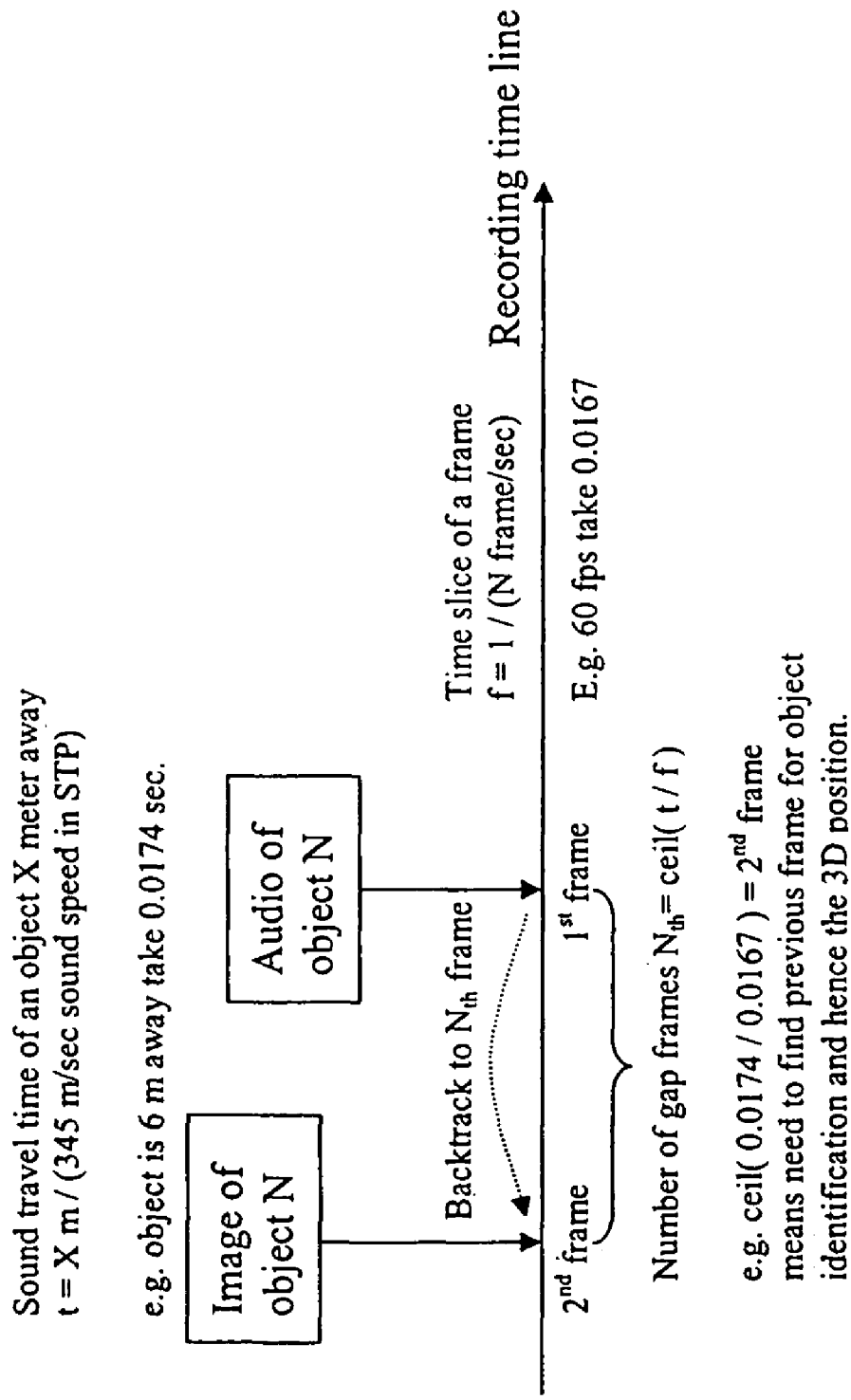
Fig. 30, Audio-Visual synchronization in high end 3D input system for fast moving object

* Edge detection is used in both profiling and operation
* High mega pixel mode used for profiling, CIF (320x240) or VGA (640x480) mode used for current operation.
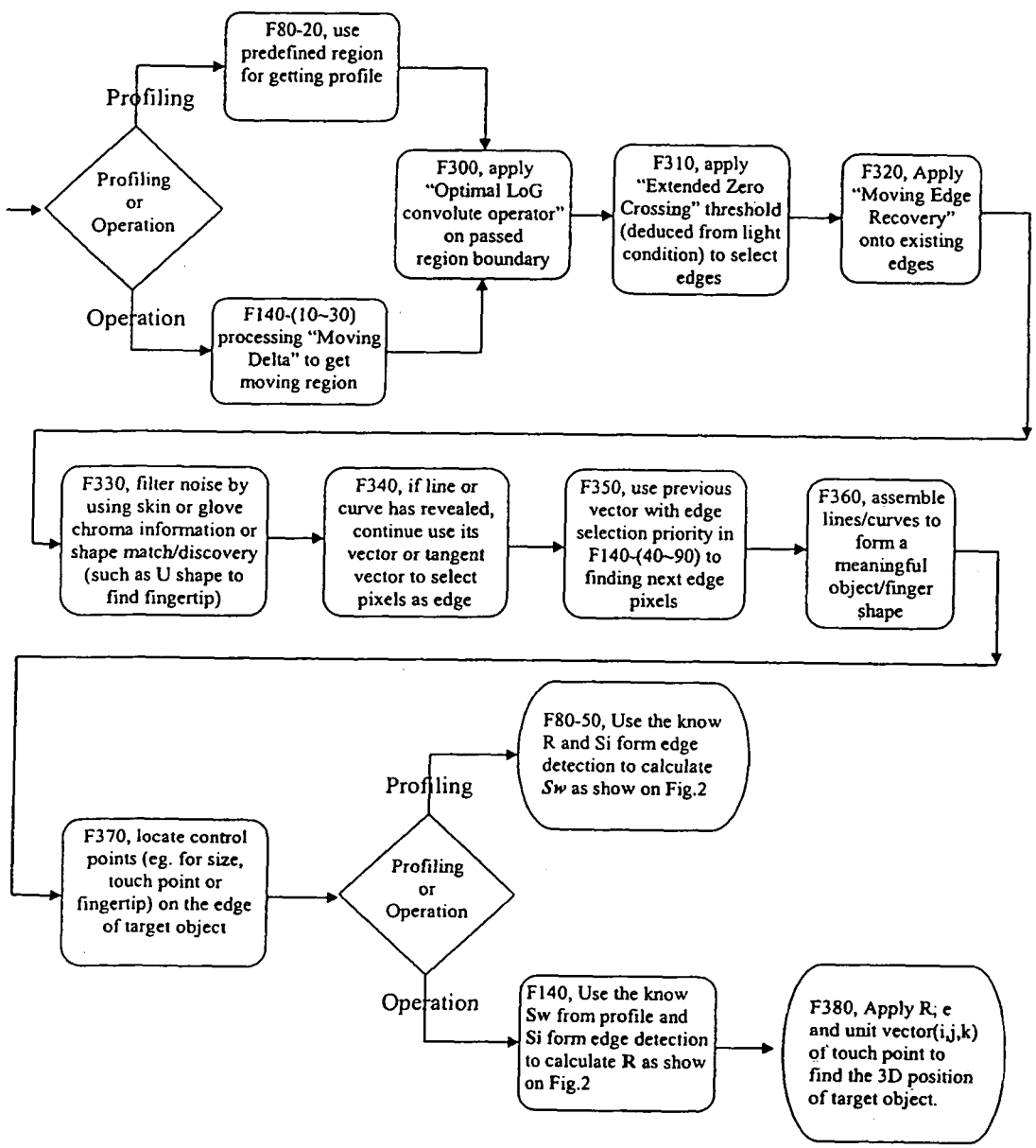
Fig. 31, Preferred Segmentation Method: "Dynamic Edge Detection"

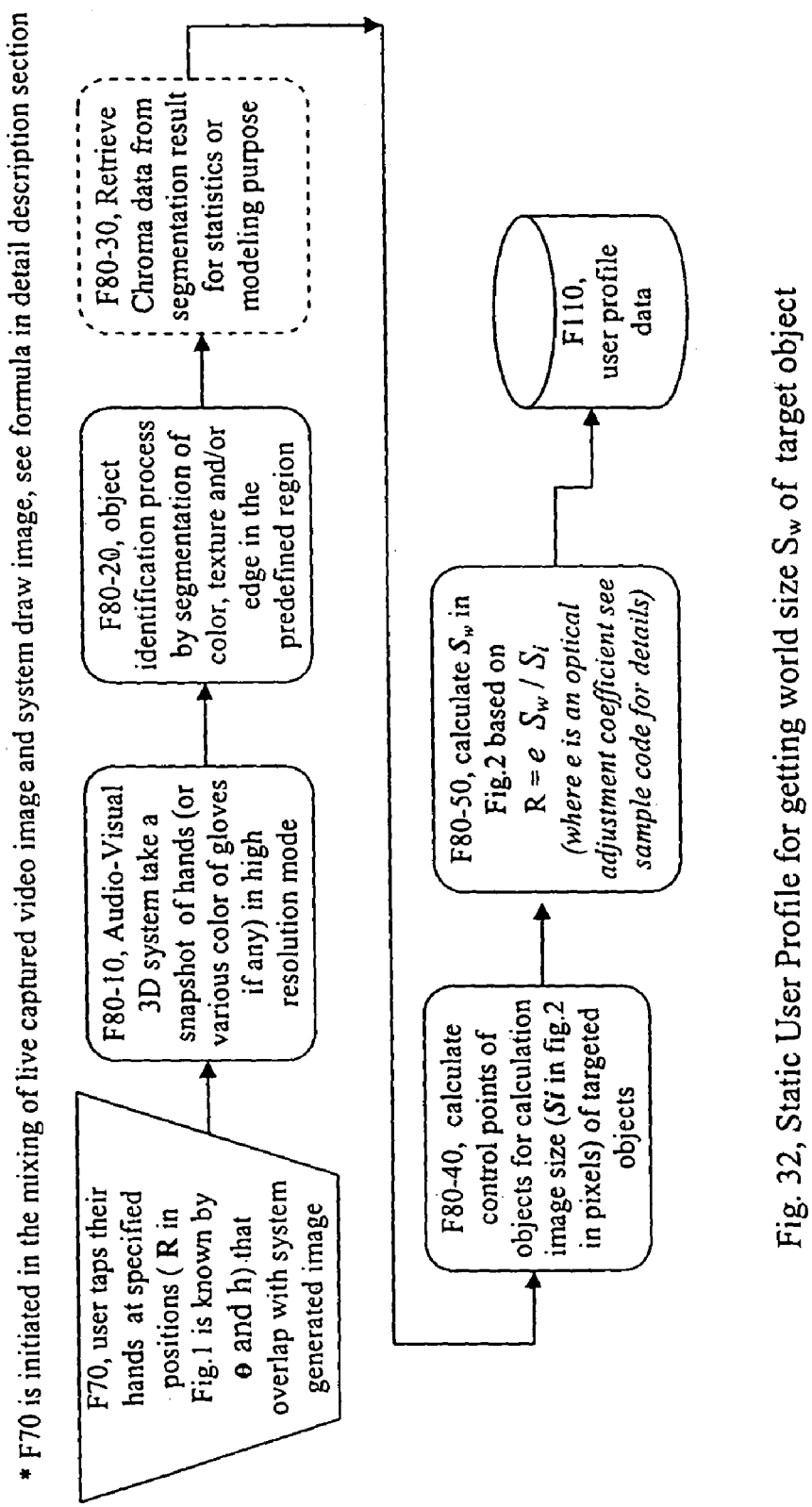
Fig. 32, Static User Profile for getting world size $S_w$ of target object

|  | Skin (target) | Non-Skin |
|---|---|---|
| Moving | (Y, UV)<br>YUV of moving skin is mapped to (Green,Blue,Red) during presentation | (Y,0) |
| Non-moved | (15, UV)<br>Because Y has normal range from 16 to 235 | (0,0) |

Fig. 33A: Notation used in the preferred embodiment during "Moving Delta" processing Where Y,U,V represent the raw values retrieve from [I]YUV video data stream.

* moving delta: provide the most efficient way of compressing video stream data (instead of doing motion prediction calculation on sprites of a MPEG stream)
* because, unlike a block of data such as sprites of MPEG, moving delta is pixel base, we can reconstruct a clear picture from moving delta( however MPEG can't), and yet, knowing what object was in previous position and now is at current position.

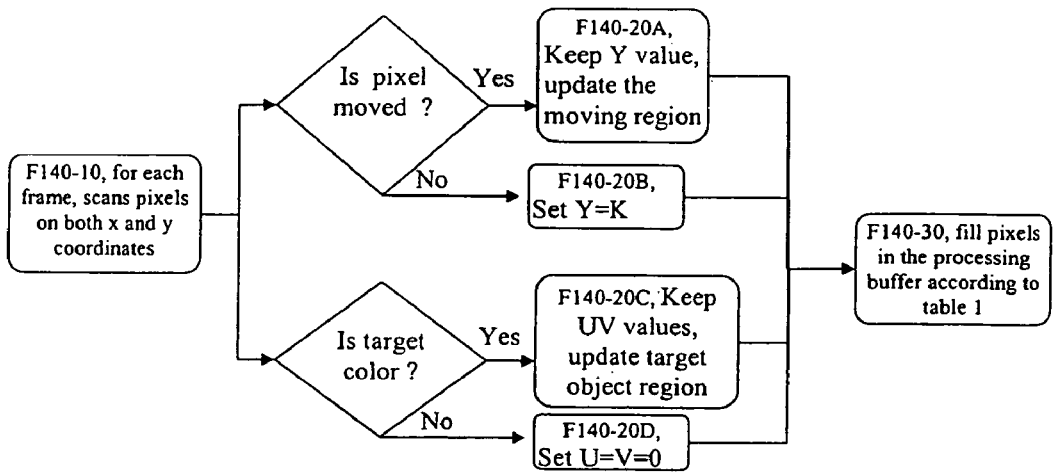

* Note, "Is pixel moved"? The following code segment shows how the delta is obtained:
```
int CbCr_diff = abs(*pCur_U - *pPrv_U) + abs(*pCur_V - *pPrv_V) ;
if ( CbCr_diff > g_CbCr_diff_threshold )
    diff_flag =2 ;
int Y_diff = abs( *(cb[ cid].pBuffer+ Y_pos) - *(pPrv_Y_begin+Y_pos) );
if ( Y_diff > g_CbCr_diff_threshold )
    diff_flag += 1 ;
return diff_flag ;
```

Fig. 33B, "Moving Delta" Process for Identifying Object and its

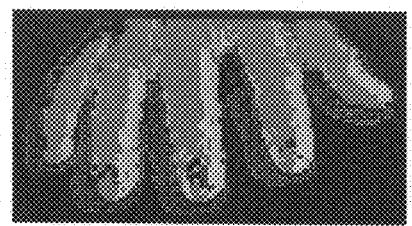

Fig. 34A, "Moving Delta" example result, (note, the current fingers pixels are complete filled, while previous fingers are filled in mesh style).

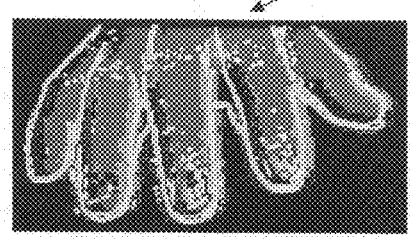

Fig.34B "Moving Delta" example result, outline the previous fingers positions

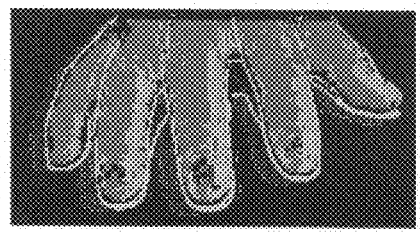

Fig.34C "Moving Delta" example result, outline the current fingers positions

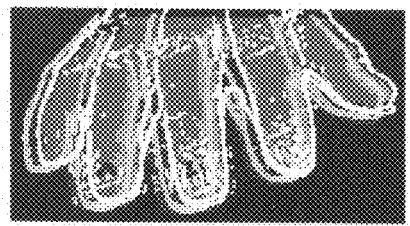

Fig.34D "Moving Delta" example result, outline both the previous (pink edge) and current (white edge) fingers positions which were embedded in Fig.34A

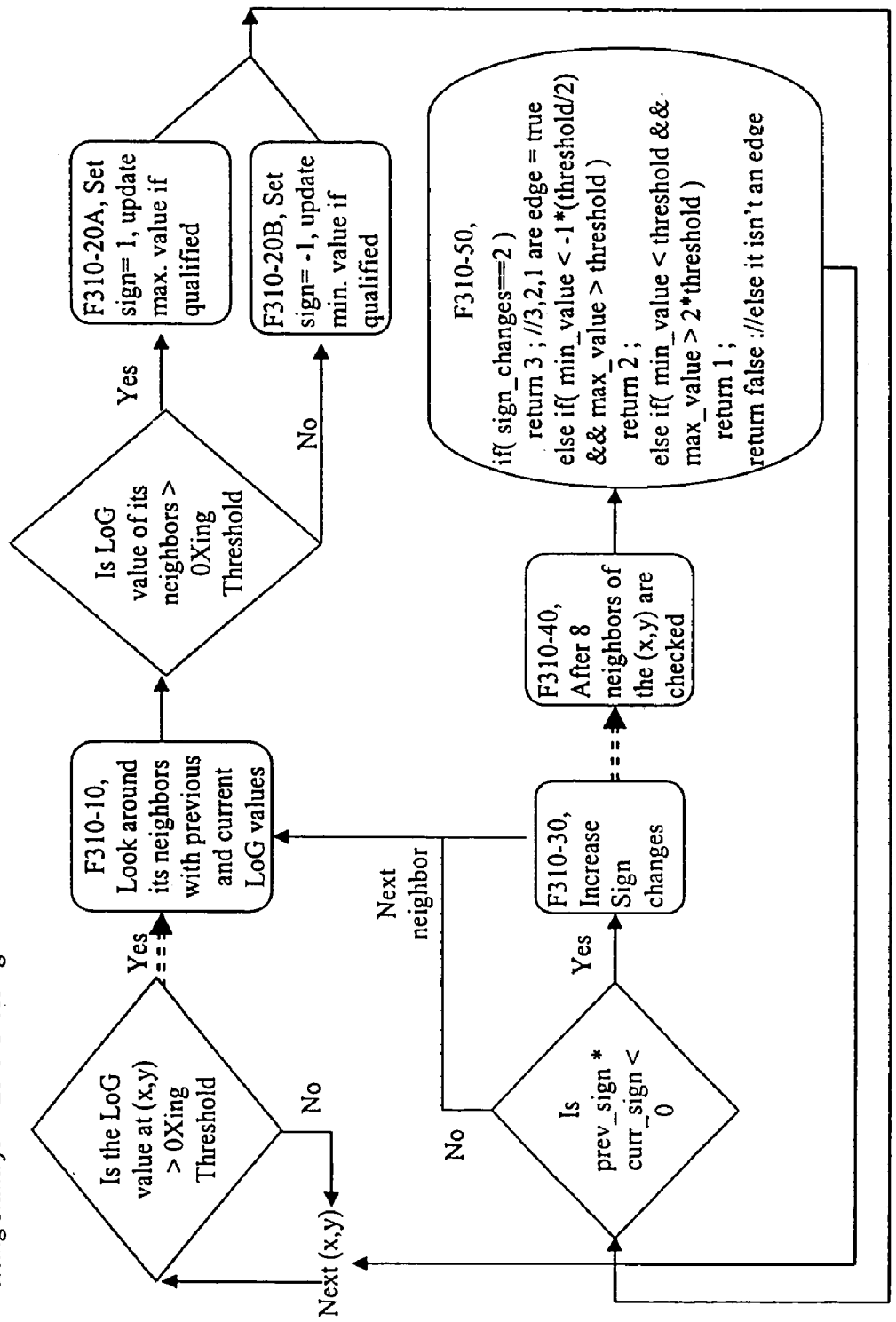
Fig. 35, "Extended Zero Crossing" after generating LoG values to revealing select edge

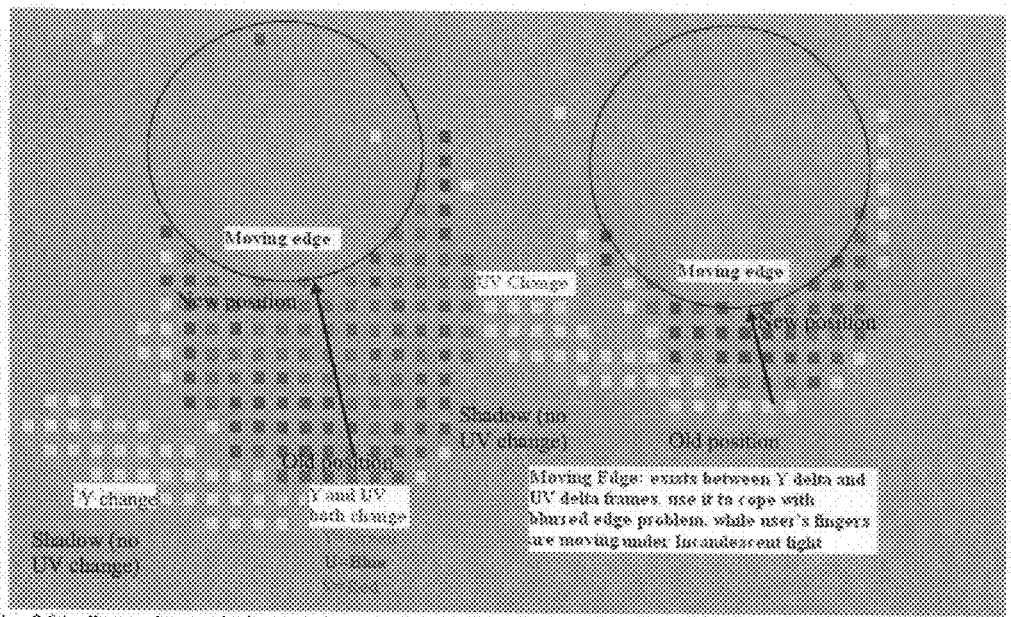
Fig. 36A, Example result from "Moving Delta"(Fig.33) without showing fingers while fingers move upward
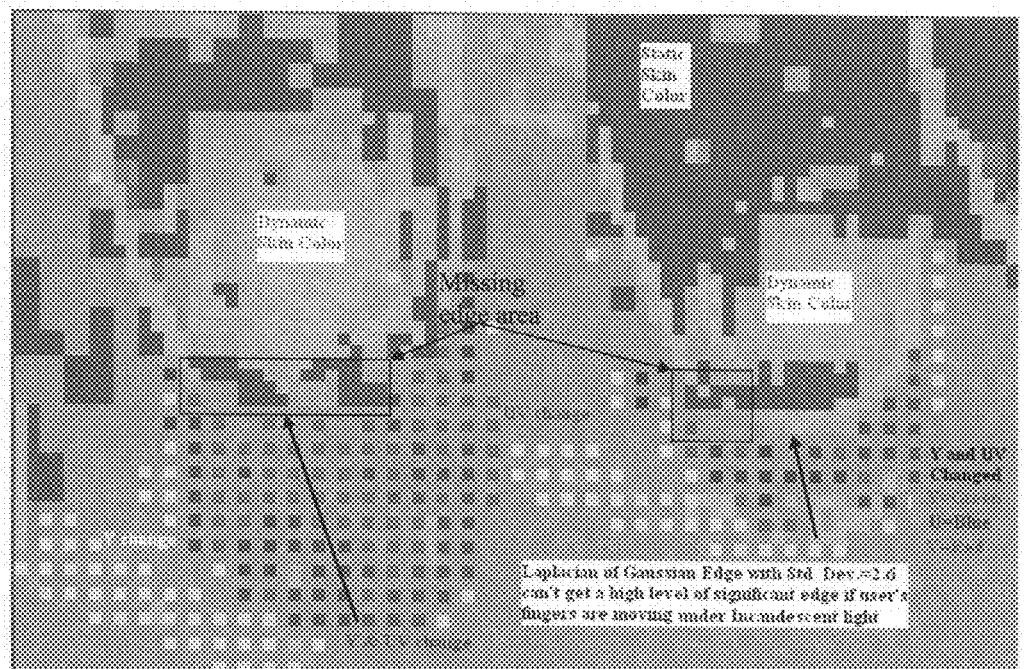
Fig. 36B, Continue to show Fig.36A by adding fingers edge. Note, missing edge occurred at fingertips

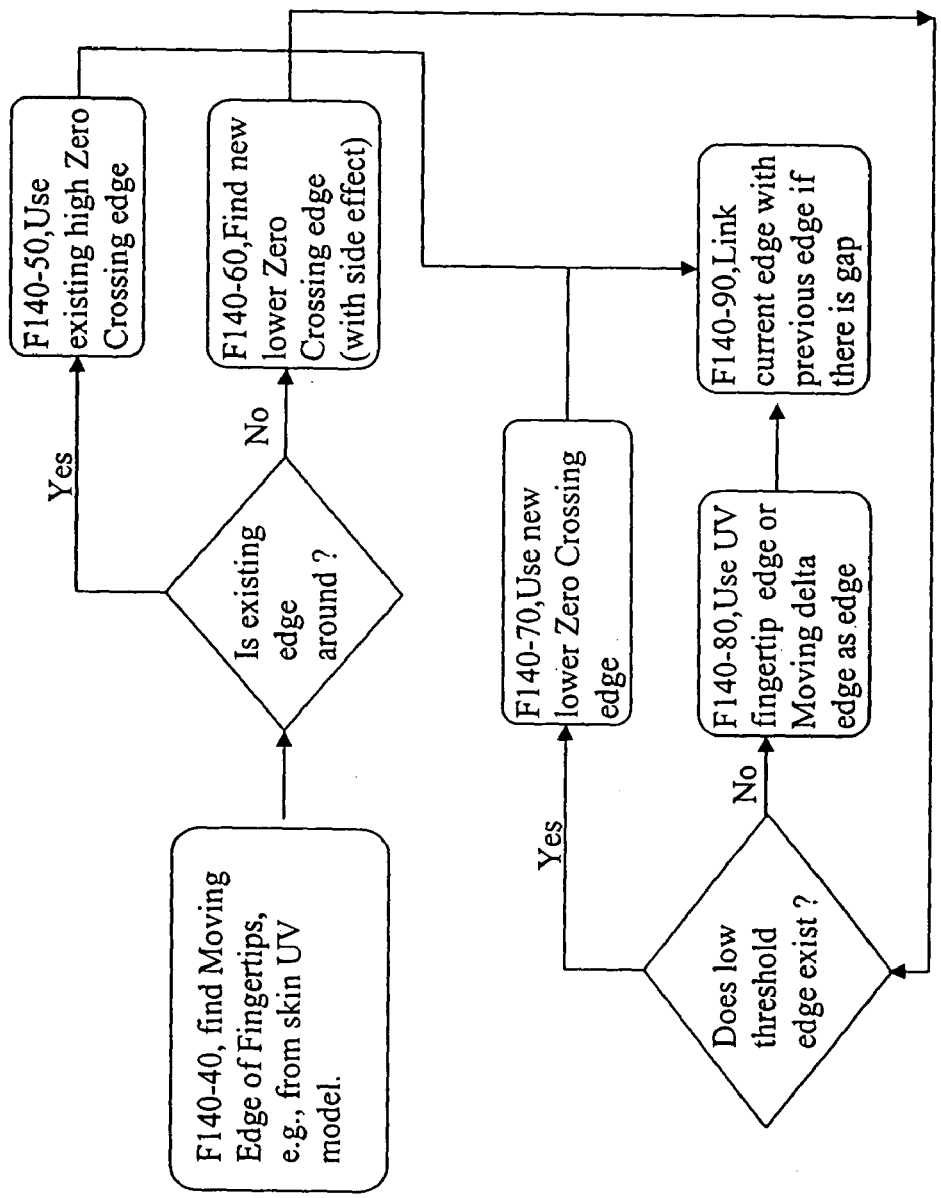
Fig. 37, "Moving Edge Recovery" Process

Fig. 38A, initial RGB picture when fingers are all down

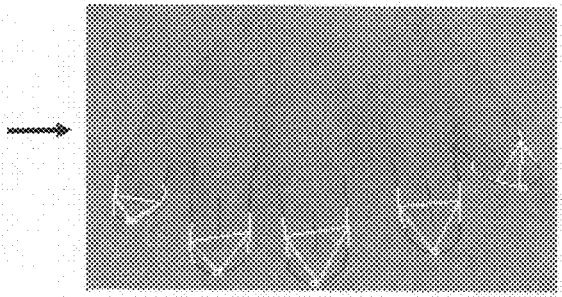

Fig. 38B, Y(=greyscale) image after finger edges and orientations are detected

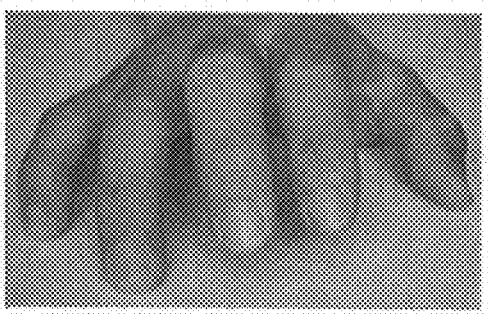

Fig. 38C, the 2nd RGB picture shows 2 fingers Are moving up (edge in moving path blurred)

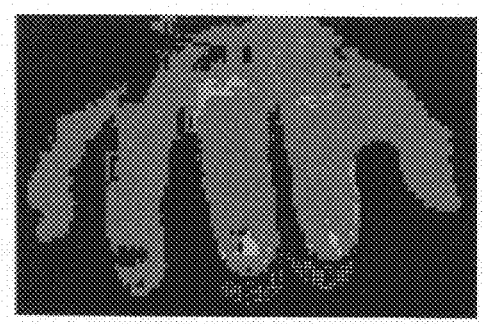

Fig. 38D, shows all moved/skin notation as table in FIG. 33A

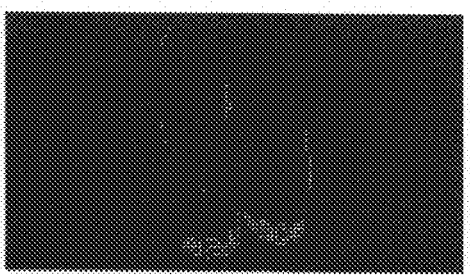

Fig. 38E, continue from Fig. 38D, shows only Y, UV moving delta

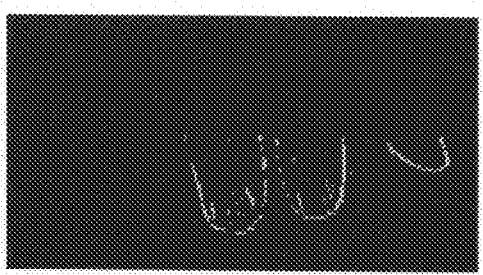

Fig. 38F, continues from Fig. 38D, show Y edge and recovered "Moving Edge"

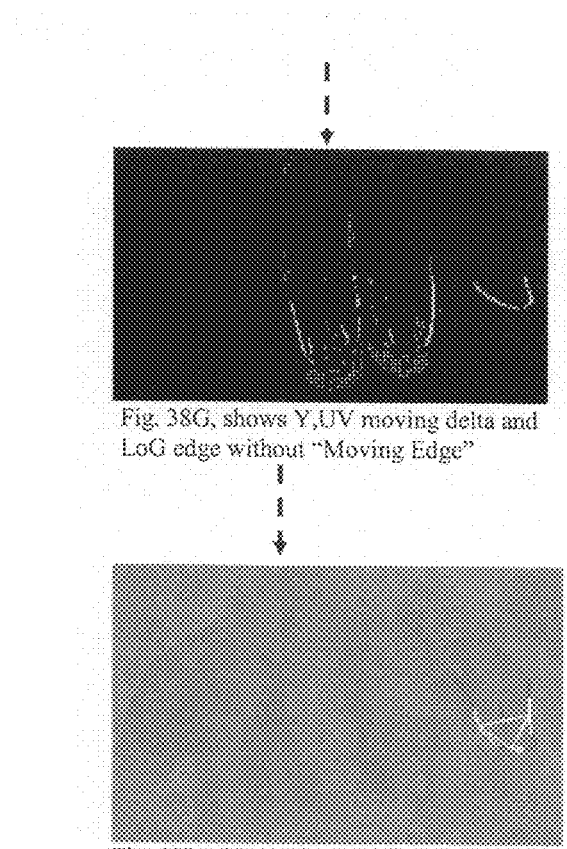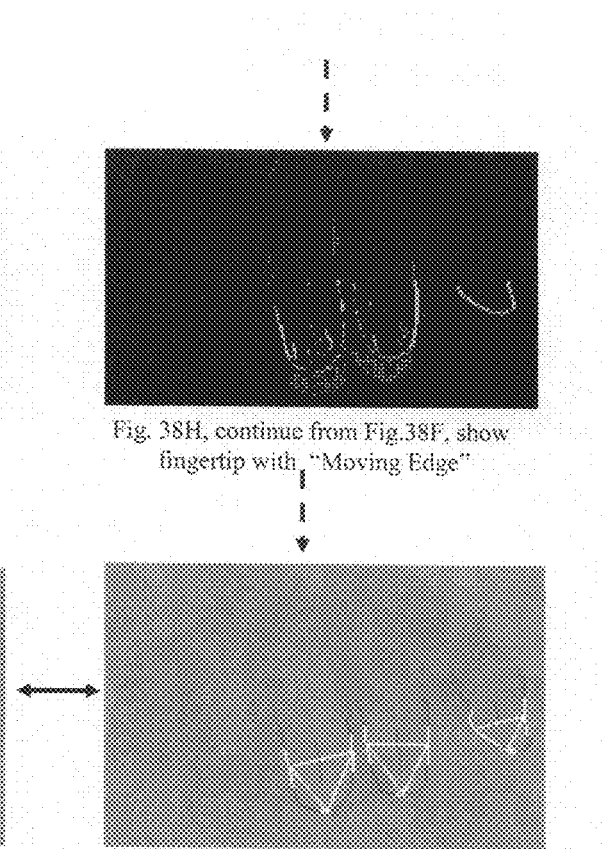
Fig. 38G, shows Y,UV moving delta and LoG edge without "Moving Edge"
Fig. 38H, continue from Fig.38F, show fingertip with "Moving Edge"
Fig. 38I, without "Moving Edge" as in Fig.38G, the U shape approach can't
Fig. 38J, with assistance from "Moving Edge", the U shape can detect moving fingers

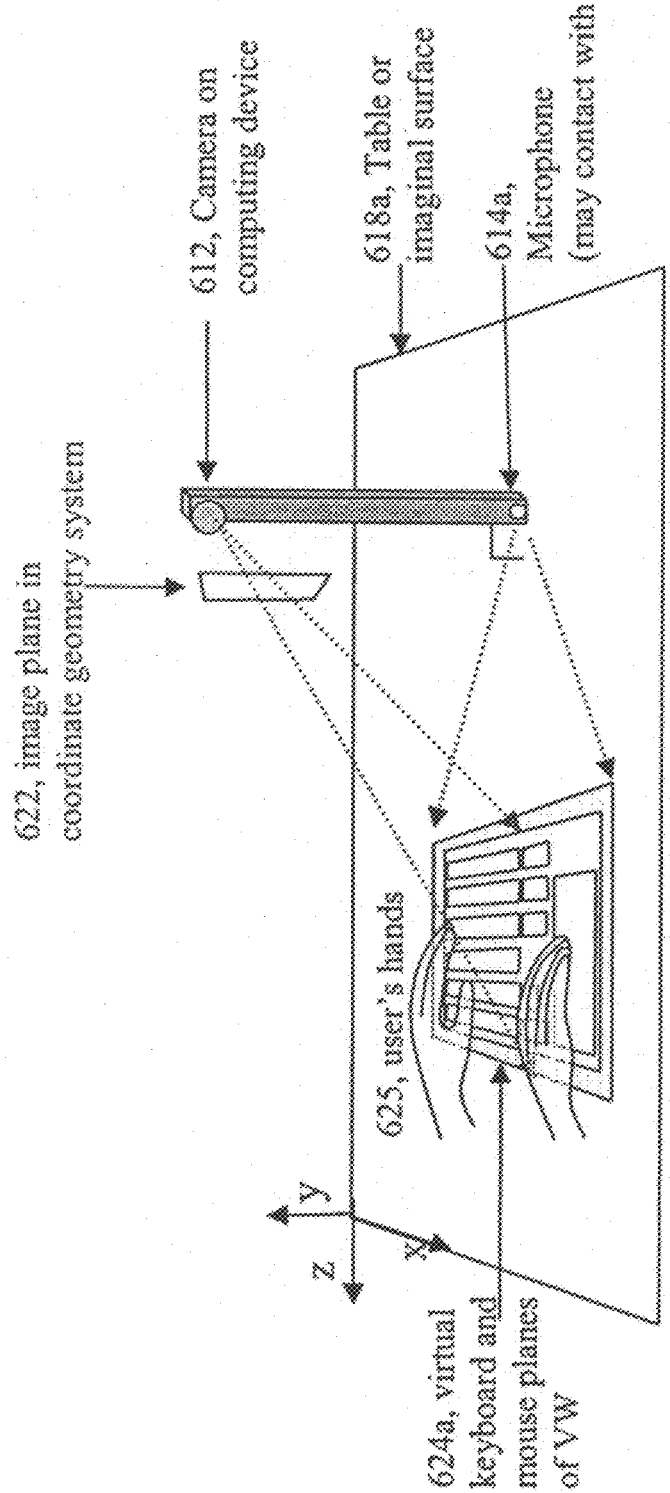
Fig. 39, Application examples 1: VW (Virtual Workstation)

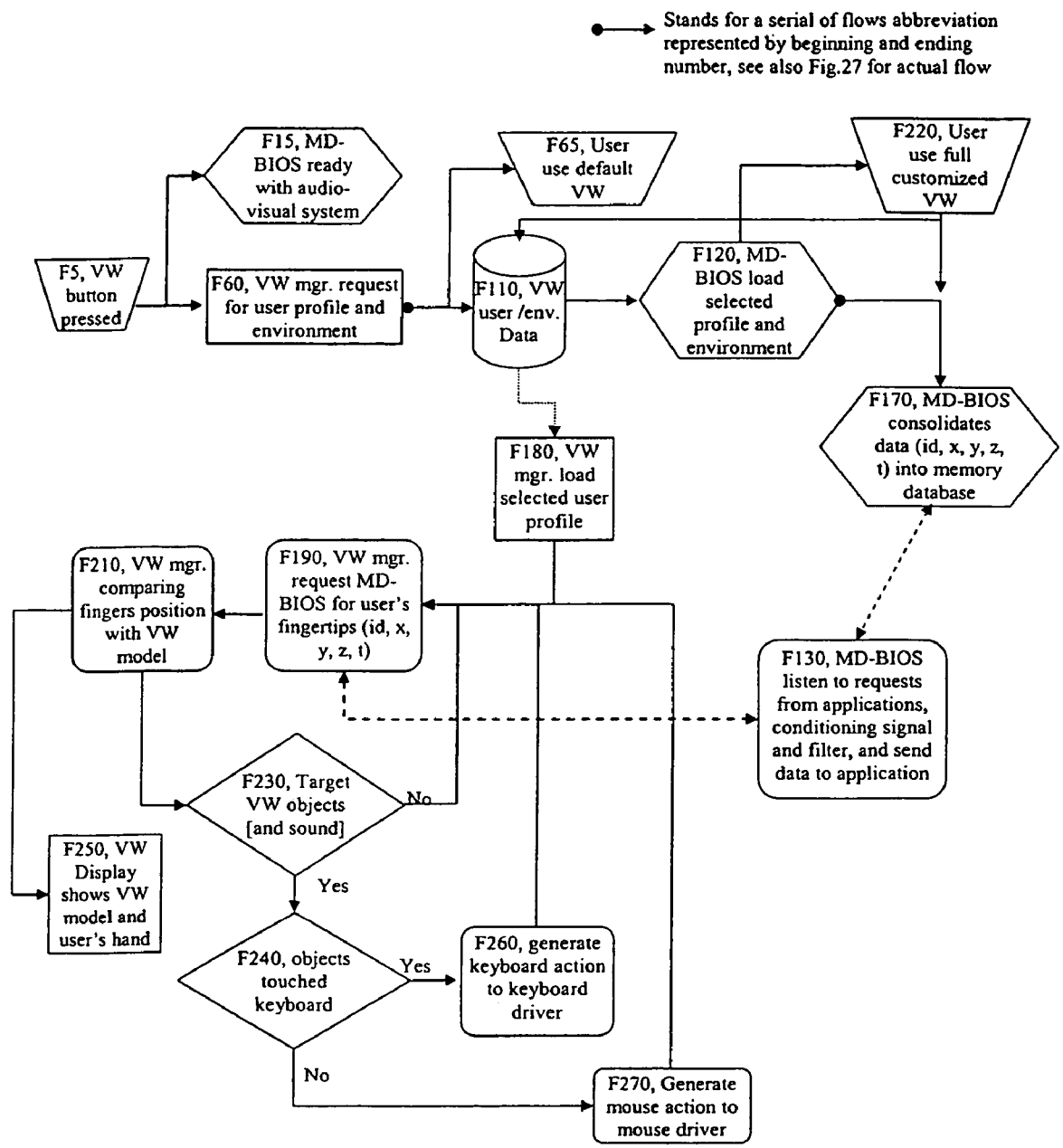
Fig. 40, Virtual Workstation use Audio-Visual 3D infrastructure of MD-BIOS

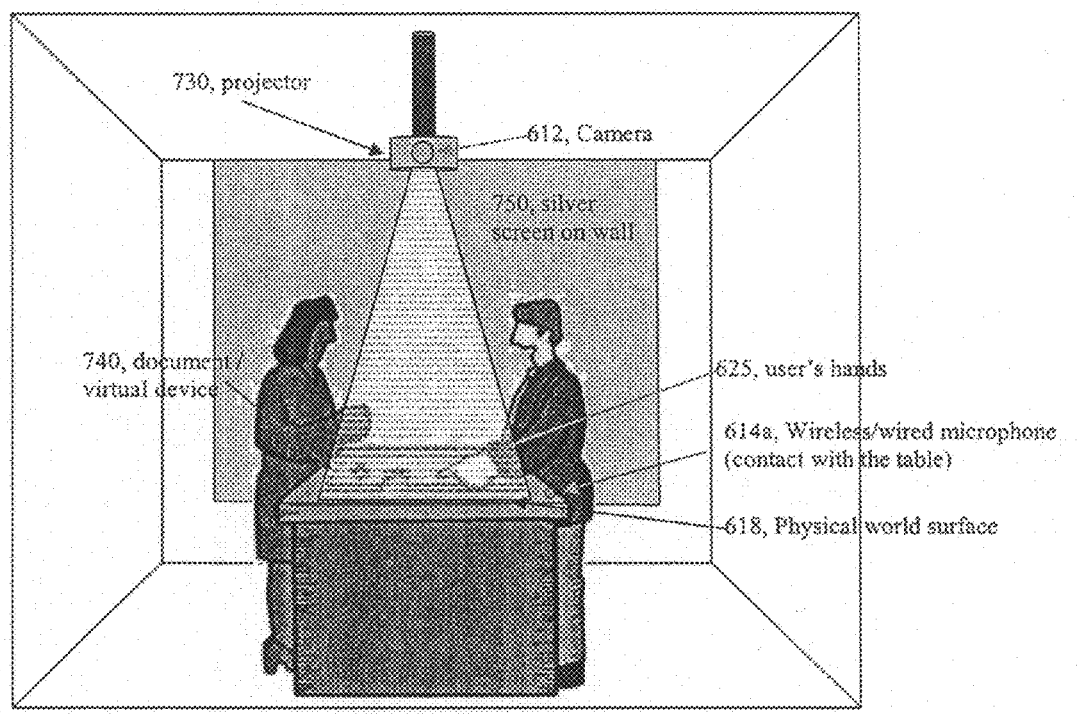
Fig. 41, Application examples 2: Virtual Conferencing

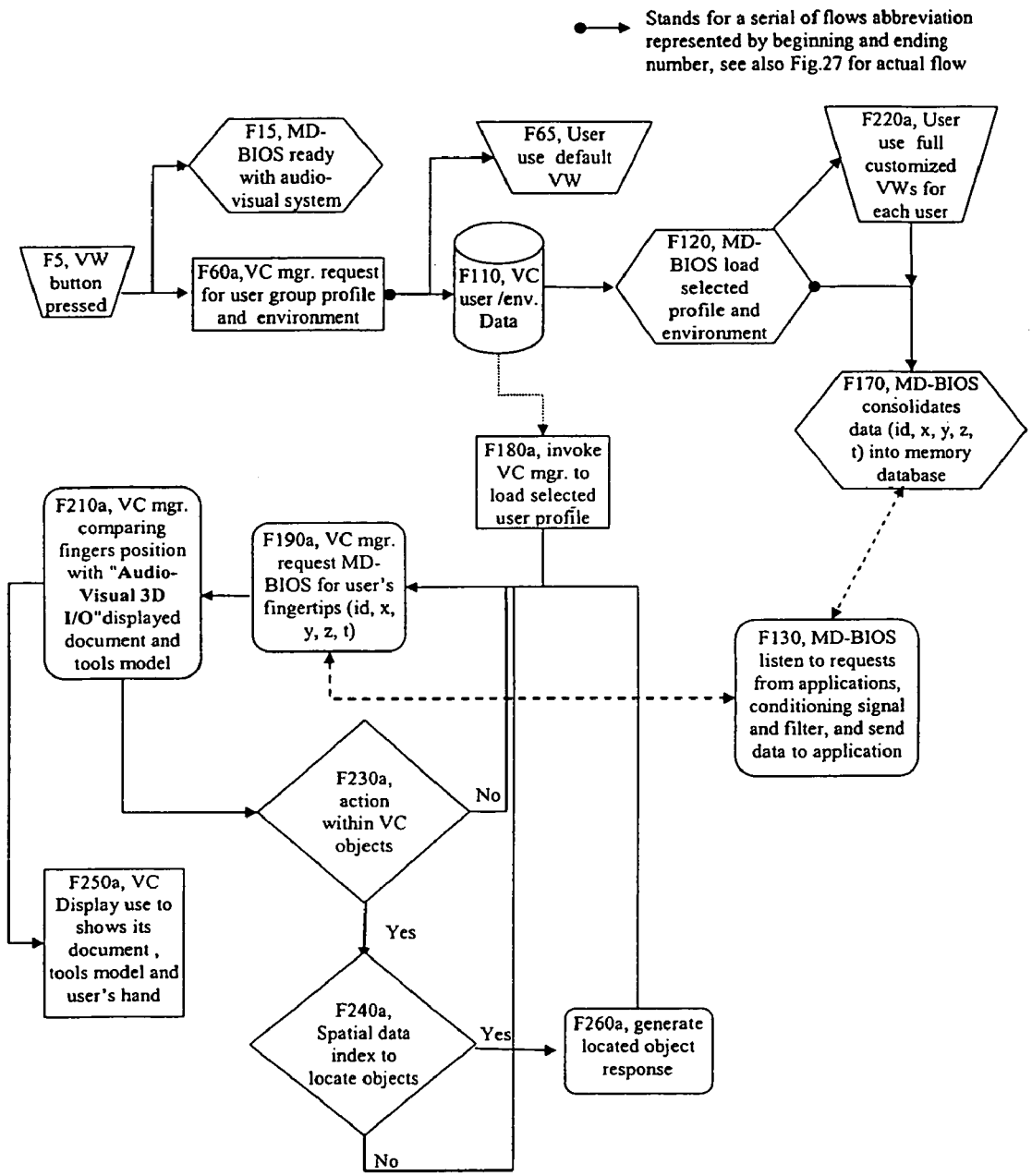
Fig. 42, Virtual Conferencing(VC) use "Audio-Visual 3D I/O" infrastructure of MD-BIOS

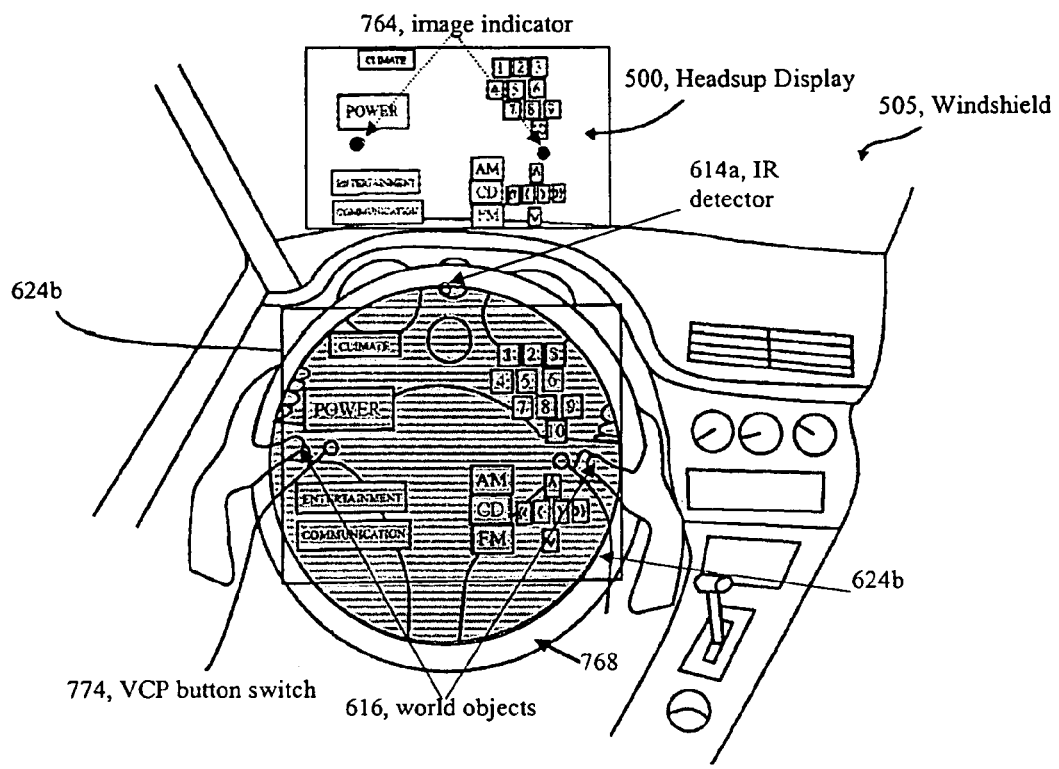
Fig. 43, Application examples 3: Virtual Control Panel (video above driver's head)

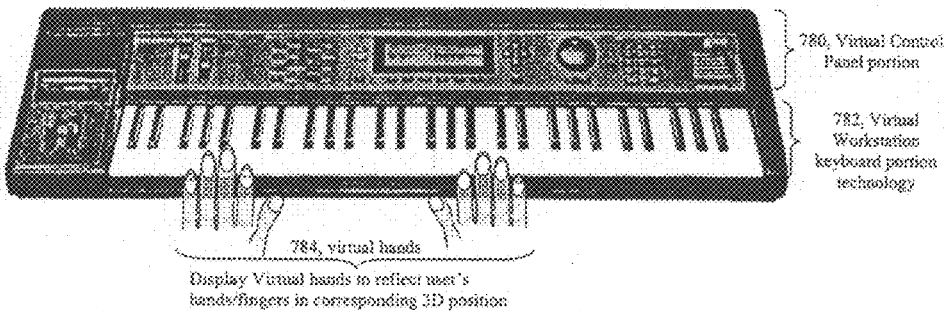
Fig. 44, Application examples 4: Virtual Musical Station, use electronic keyboard as example
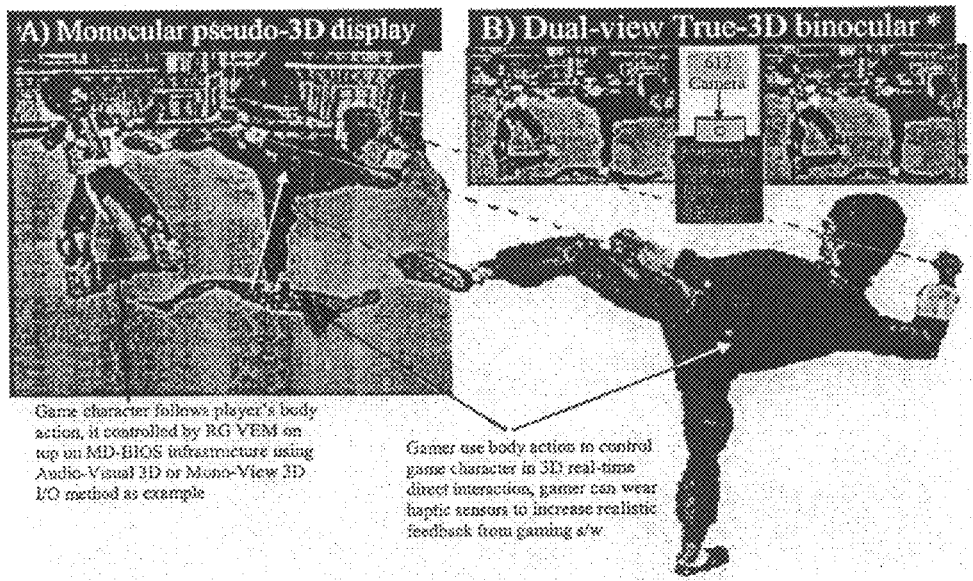
Fig. 45, Application examples 5: Real Gamestation: a 3D interaction system

AUDIO-VISUAL THREE-DIMENSIONAL INPUT/OUTPUT

CROSS-REFERENCE TO RELATED APPLICATIONS

This application is a continuation-in-part of prior U.S. application Ser. No. 10/703,184, filed Nov. 5, 2003 now U.S. Pat. No. 7,337,410, which claims the benefit of U.S. Provisional Patent Application No. 60/424,557, filed Nov. 6, 2002. This application also claims the benefit of U.S. Provisional Patent Application No. 60/591,611, filed on Jul. 28, 2004.

FIELD OF THE INVENTION

The present invention is generally related to methods and devices for producing a virtual computing environment. More specifically, the present invention is related to methods and devices that in combination mimic the functionality and behavior of a physical computer system in a virtual environment. In particular the methods and devices in accordance with the present invention includes a portable computing system wherein the system is configured to provide the user with a virtual hardware environment that may be utilized for computing, gaming or other uses.

BACKGROUND OF THE INVENTION

With the advent of the modern computer input devices were invented to allow for the input of data, for example, early computer systems utilized punch cards to input data into the computer's memory. Although punch cards were effective at inputting data, a more simplified device was necessary, thus the modern keyboard was developed.

One of the most important factors contributing to the effective use of a computer is the interface between the computer and a person using it. Unquestionably the most popular computer interface device is the keyboard, which has a plurality of depressible keys each corresponding to a particular alphanumeric character, symbol, or computer function. While computer keyboards are widely accepted and quite suitable in many situations, keyboards are not always the most efficient, convenient, or easy to use devices.

A drawback of computer keyboards is that they include up to 110 individually marked keys mounted to a base with as many switches. All of these components must be produced and assembled, which accounts for considerable expense. Since keyboards are mechanical, are also more prone to failure than solid-state devices, additionally, due to the likelihood of failure, broken keyboards additionally present disposal problems. Further, the conventional keyboard cannot be quickly changed to a new keyboard layout, such as might be desired by those who have learned a keyboard layout other than the somewhat inefficient but traditional QWERTY layout.

Another drawback of computer keyboards is that they are built generally in one size for all users. As a result, users with relatively small or large hands must adapt to a keyboard size that is not optimal for their particular hand size. A person with smaller hands must stretch further to strike a key some distance from a home row of keys, whereas a person with larger hands will have a harder time accurately striking any desired key. Keyboard size that is optimized for a particular use may lead to decreased hand fatigue. However, keyboard manufacturers have determined an ergonomically acceptable compromise, which is a compromise nevertheless. Since keyboards are produced having only one size forces a user to type with his hands close together in an unnatural manner. It has been found that so called "split" keyboards, which are split into a separate keyboard for each hand, are more comfortable for the user and produce a slightly faster typing speed as a result. Additionally, as computers become more common in the workplace, a greater number of injuries have been reported due to utilizing a keyboard.

There have been attempts by various manufacturers to address the problems associated with mechanical keyboards. One such example is described in U.S. Pat. No. 5,581,484, wherein there is described a finger mounted computer input device. The finger-mounted device utilizes a series of pressure sensors to determine a users hand movement which then corresponds to a key on a keyboard. A problem with this type of system is that the user must still physically interact with a surface to generate a signal. Additionally, the sensors are usually disposed on a glove, wherein the user wears the glove to utilize the system. A problem associated with glove-based systems is that the material from which the glove has been fabricated has a fatigue life, and therefore will eventually wear out from prolonged usage. Additionally, a user may experience discomfort from using these types of gloves in that they may perspire inside the glove. The perspiration may further lead to degradation of the glove.

Another example of a virtual keyboard are produced by www.vkb.co.il, www.canasta.com, and www.virtualdevices.net. These types of keyboards utilize an infrared projection system, wherein a keyboard is projected onto a surface and a sensor detects the position of a finger on top of the projected keyboard image. A problem with they types of keyboards is that you can only utilize the system on a smooth clean non-transparent steady surface, additionally, if you rest your hands within the projected keyboard the sensor may interpret this motion as keystrokes, thereby resulting in errors. Further still, since the keyboard is projected onto the surface, the user may experience light interference from surrounding light sources.

Lastly, with the resurgence in tablet type computers having pressure sensitive screens, Microsoft® has released an on-screen keyboard in their latest version of Windows® that enables a user to utilize their fingers or a stylus to input data.

While each of these systems are a novel approach to overcoming the dependence on a physical keyboard, there are still shortcomings. Namely, each of the systems require the user to either be physically tethered to a computer, where pressure sensitive devices that must be depressed on a surface or find a smooth surface to set up a virtual keyboard. Additionally, these devices do not allow a user to customize the layout of the keyboard or adapt the keyboard to a users specific style of typing. In addition to being tethered to a computer, the use of physical input devices may cause injury to the user. For example, many claims are filed every year for repetitive stress injuries incurred from keyboard usage. Examples of common injuries are carpal tunnel syndrome, eye fatigue, neck and back strain, many of which are attributed to usage of a personal computer.

Attempts have been made to eliminate the use of a keyboard as an input device entirely. Many manufactures have attempted to produce voice recognition software systems, wherein a user could speak every command to a computer thereby eliminating the need for a physical or virtual keyboard. While this approach may be novel, presently voice recognition software has not advanced to the point of being reliable enough to replace a keyboard. In addition to requiring more hardware, a microphone, the voice recognition software is always running within a computer's operating system, thus requiring additional computing power. Also, voice recognition software must be custom tailored to each user's voice, inflections and/or accents, therefore once a system has been customized to an individual user other user's cannot readily utilize the system. Another shortcoming of voice recognition systems is that it is difficult to use voice recognition for editing, browsing the Internet, graphic design and similar input intensive programs. Additionally, constant talking may fatigue the user's voice, wherein the user's pitch and tone may change, thereby leading to additional input errors because the voice recognition software no longer recognizes the user's voice. Further still, voice recognition systems cannot be utilized in cubicle type work environments or similar "open" type environment where noise interference from other voices may confuse the voice recognition software.

Additional input devices may also be utilized in conjunction with keyboards. For example, pointing devices, such as "mouse" pointing devices and so called "track ball" devices are also popular computer interfaces. Generally, these types of devices provide velocity information, in both an X direction and an orthogonal Y direction, to the computer, as well as signals from one or more momentary contact push buttons. A pointing icon or other "tool" on a computer monitor responds to such velocity input by corresponding X and Y movement on the computer monitor. Graphics tablets are another type of "pointing" input device that provide the computer with X and Y positional information, as opposed to velocity information, which is used in much the same manner by the computer. Such devices are well suited for pointing to various software "push button" options on the screen, selecting portions of text or a group of software "objects," freehand on-screen drawing, positioning a typing cursor location, and similar functions. However, such pointing devices are remarkably ill suited for text data input.

Other types of computer interfaces have been developed to overcome some of the above-mentioned drawbacks. For example, U.S. Pat. No. 5,212,372 to Quick et al. on May 18, 1993, teaches a glove device that has sensors for measuring the curvature of each finger at joints thereof. For entering numerical data, a person using this type of device curves his fingers to point to "zones," or virtual keys, that each represents a particular number. While the input of alphabetical data is mentioned in the Quick disclosure, only numerical zones are illustrated and it remains unclear how such a device could possibly be used to enter the twenty-six additional characters of the alphabet, especially since the little finger is used solely for designating an "enter" key and is therefore not available for pointing to alphanumeric zones.

A variety of similar glove-based prior art devices exist, and in most cases each uses some type of joint flexing sensor to determine finger curvature. Many such devices are designed for communication with deaf or otherwise challenged individuals, and typically provide for computer interpretation of alphanumeric data formed by a single hand with standard sign language. It is a slow and fatiguing process for people, even those fluent in sign language, to use such devices to enter a large amount of data into a computer, such as might be required while typing a patent disclosure, for example. Further, while finger curvature is relatively easy to detect in a variety of sophisticated ways, such detection is only accomplished in one dimension. Lateral movement of the finger, for example from the "J" key to the "H" key of a standard QWERTY keyboard, cannot be detected by such joint flexure sensors as disclosed in the prior art. This drawback is also evident in many "virtual reality" data manipulation gloves, which also include a variety of motion sensors on similar gloves. As a result, such devices have limited use and are not well suited for prolonged data entry from a wide selection of character and command keys, such as those found on the standard computer keyboard. As previously described, these gloves are generally fragile and are not constructed for constant everyday usage. Additionally, the gloves are particularly sensitive to moisture such as sweat from the users hands or a wet environment, wherein moisture may cause sensor problems or lead to eventual failure of the glove.

Therefore there is a need for a device that eliminates the shortcomings of the presently available input devices, wherein the device may be utilized by a user in any physical configuration without requiring the user to remain physically limited by the device. Such a needed device would be adaptable to any individual, regardless of hand size or typing style. Further, such a needed device could be used equally well for both alphanumeric data entry, command entry, and position/velocity input. Such a needed device would be to a large extent software re-configurable, making use of the device immensely flexible and adaptable. The present invention fulfills these needs and provides further related advantages.

These and other objects, advantages, and features of the invention will become apparent to those persons skilled in the art upon reading the details of the methods and systems of the present invention, which are more fully described below.

SUMMARY OF THE INVENTION

The present invention provides systems and methods for interaction within a virtual environment. Wherein the methods of the present invention may be utilized to virtually interact with a computer system through the use of virtual input devices, wherein the methods and systems allow a user to input data into a computing system without physical limitations.

In accordance with the present invention, there is provided methods and apparatus for determining an object's three-dimensional location (i.e. real world coordinates) using audio, video and/or infrared detection techniques. According to these particular methods and apparatus, no sensors mounted on objects are required to determine location data, as may be required in other embodiments disclosed and claimed in this disclosure. Instead, a first detection device (e.g. a camera) is used to capture images of the objects, which can be used to compute location data corresponding to a first two-dimensional plane. A second detection device (e.g. microphone or infrared detector) may be used to collect additional location data in a second plane, which when combined with image data from the captured images, allows the determination of the real world coordinates (x, y, z) of the object. Objects may comprise, for example, the fingers of a user. By determining and tracking the three-dimensional coordinates of multiple objects (e.g. fingers of a user's hand) over time, real-time, real world coordinate data is generated.

The first and second detection mechanisms may comprise the audio-video infrastructure (e.g. camera and microphone) commonly found in a 3G mobile phone or 3C (Computer, Communications, Consumer) electronic device. Using that preexisting infrastructure, together with the Audio-Visual 3D and/or Mono-View 3D I/O algorithms set forth in this disclosure, real-time coordinate data can be generated and used as input data in virtual applications, such as virtual workstations, virtual conferencing systems, virtual music stations, virtual control panels in automobiles, virtual games, etc. Unlike prior art attempts, no additional hardware (e.g. special purpose integrated circuits or modules) is necessary to implement the methods of the present invention.

In accordance with the present invention, if the size of an object of interest is known (e.g. as determined by the Audio- Visual 3D input method of the present invention or by a manual calibration process), and if it can be safely assumed that the size of the projected image does not vary due to rotation of the object, a single camera (e.g. the camera in a 3G or 3C mobile device) may be used to obtain three-dimensional coordinate data (x, y, z, t) for the virtual applications. Furthermore, with "Pose Invariant" technology, we can get the size of an object indirectly and then apply the same algorithm to find out the world coordinate of an object. According to this aspect of the invention, referred to herein as the Mono-View 3D I/O method, image data obtained from the single camera, the known or calculated distance (R in FIG. 22 or FIG. 23) of the object from the camera, and the known or calculated size of the object ($S_w$ in FIG. 22) are used to compute the real world coordinates of the object. Further details of the Mon-View 3D and the Audio-Visual 3D I/O methods are set forth in the detailed description of the invention.

In accordance with the present invention there is provided a method for controlling a microprocessor based system in a virtual environment, the method comprising: loading a computer program into a memory space; transmitting at least one signal from at least one transmitter; displaying virtual input devices on a display device, wherein the virtual input devices initially have pre-determined coordinates; receiving data generated from movement of at least one sensor; calculating coordinates of the sensor movement; comparing calculated coordinates to the pre-determined coordinates of each virtual input device; calculating desired input from coordinates generated by the sensor movement; and displaying input on the display device and transmitting the input to the operating system.

In accordance with another embodiment of the present invention there is provided a method for controlling a microprocessor controlled device in a virtual environment, the method comprising: loading a computer program into a memory space; loading an operating system into a memory space; transmitting at least one signal from a transmitting device displaying a virtual keyboard and a virtual input device on a display device; initializing coordinates defining individual keys of the keyboard; initializing coordinates defining a location of the input device in relation to the keyboard; receiving data at least one sensor wherein the data received is converted into coordinate information and stored in a memory space; determining if coordinated derived from movement correlates to a key location of the virtual keyboard or movement of the virtual input device; and displaying sensor movement on the display device.

In accordance with the present invention there is provided a method of generating and controlling a virtual workstation, the method comprising: initializing an operating system and a controller system in a microprocessor based computer system; displaying virtual hands, a virtual keyboard, a virtual pointing device and a virtual workstation environment on a display device; monitoring movement of sensors disposed on a user's hands for movement; displaying movement of the virtual hands in response to movement of the sensors; and determining if movement of at least one sensor passes a user defined threshold.

In accordance with the present invention there is provided a method of generating a virtual gaming system, the method comprising: initializing an operating system and a controller system in a microprocessor based computer system; loading a game program into a memory space; displaying a virtual player on a display device; monitoring movement of sensors disposed on a user for movement; and displaying movement of the virtual player in response to movement of the sensors.

In accordance with the present invention there is provided a system for virtually controlling a microprocessor based system, the system comprising: a microprocessor based computer system having an operating system configured to be run thereon; a display device, at least one tracking device; at least one sensor, wherein said tracking device is configured to track movement of said sensor and determine coordinates of said sensor and time components of sensor movement within a pre-defined area; and a software component, wherein said software is stored in a computer readable medium, wherein said software is in communication with said tracker and said display device, wherein said software determines vector movement and acceleration of said sensor and displays said sensor movement on said display device.

In accordance with the present invention there is provided a system for implementing a virtual reality environment, the system comprising: a display device associated with a user, the display device being responsive to image data for generating and displaying an image simulating a physical computer system, including a physical keyboard, a physical input device, and physical representation of the user's hands, wherein each of the simulated components appear to the user to be in space independent of actual physical objects; an output device for transmitting a signal; an input device for generating data in response to interaction with the signal; a processor connected to the input and output device and the display device and operating a virtual environment manager program and a multi-dimensional basic input and output program for generating a virtual keyboard, a virtual input device, and virtual hands, the processor being responsive to data generated from the input device, for generating motion image data corresponding to the input device data; and wherein the display device is responsive to motion image data for generating a second image simulating physical motion of at least one virtual component.

In accordance with the present invention there is provided a system for implementing a virtual reality (VR) computing environment, the system comprising: VR display device including at least one display and worn by a user the one display viewable by the user, with the VR display, responsive to first image data, for generating and displaying a first VR image simulating a physical computer system including a virtual keyboard having a plurality of physical keys, a virtual mouse having at least one physical button, with the first VR image representing the VR keyboard and VR mouse, the VR keyboard and VR mouse having a first appearance corresponding to the first image data; an input and an output device for generating motion-representative data corresponding to motion of a user's body part; and a processor connected to the VR display device and operating a virtual environment manager (VEM) and multi-dimensional basic input/output subsystem (MD-BIOS) program, wherein the VEM and MD-BIOS provide the first image data to the VR display device, the processor being responsive to the motion-representative data generated from the input device, for generating motion image data corresponding to the motion; and wherein the VR display device is responsive to the motion image data for generating a second VR image simulating motion corresponding to the motion of the portion of the body of the user.

In accordance there is a need for smaller input/output interfaces as miniaturized portable computing devices become more common.

There is also a need for a system that recreates a full desktop computing experience without requiring the space needed for a full desktop computer or physically limiting a user to a physical location to utilize such a system.

There is an additional need for a system that can be utilized to minimize computer related injuries such as repetitive stress injury, carpal tunnel injuries and other such injuries that are related to physical computer use.

There is also a need for a system that is capable of displaying true three dimensional real world human-machine interactions.

It is the applicant's belief that the present invention addresses these needs with novel software and hardware solutions as described in detail below.

BRIEF DESCRIPTION OF THE DRAWINGS

The patent or application file of the present invention contains at least one drawing executed in color. Copies of this patent or patent application publication with color drawings will be provided by the Office upon request and payment of the necessary fee.

To facilitate understanding, the same reference numerals have been used (where practical) to designate similar elements that are common to the Figures. Some such numbering has, however, been omitted for the sake of drawing clarity.

FIG. 11 is a block diagram illustrating the threshold values and calculation methods of the virtual workstation manager in accordance with the present invention.

FIG. 22 is a diagram illustrating the Audio-Video 3D I/O system configuration, according to an embodiment of the present invention.

FIG. 23 is a diagram illustrating the Mono-View 3D I/O system configuration, according to an embodiment of the present invention.

FIG. 24 is a drawing of exemplary object control points and lines for fingertip and size evaluation.

FIG. 25 is a diagram illustrating panning and tilting effects and their relationship to local and global positions.

FIG. 26 is a diagram illustrating how optical zoom and focus affect the resolution and accuracy of an image of an object.

FIG. 27 is a flow diagram illustrating the Audio-Visual 3D input method of the MD-BIOS infrastructure, according to an aspect of the present invention.

FIG. 28 is a flow diagram illustrating x-z plane detection using the audio subsystem of an audio-visual system, in accordance with the Audio-Visual 3D input method of the present invention.

FIG. 29 is a flow diagram illustrating x-z plane detection using an infrared detector, in accordance with the Audio-Visual 3D input method of the present invention.

FIG. 30 is a diagram illustrating audio-visual synchronization, according to an aspect of the present invention.

FIG. 31 is flow diagram illustrating the Dynamic Edge Detection method of the present invention.

FIG. 32 is a flow diagram illustrating a static user profiling process used to determine the size of target objects, according to an aspect of the present invention.

FIG. 33A is a table illustrating how the Y, UV components retrieved from a YUV video data stream are applied in the Moving Delta process of the present invention.

FIG. 33B is a flow diagram illustrating an exemplary Moving Delta process, according to an aspect of the present invention.

FIGS. 34A-D are color screenshots illustrating the YUV Moving Delta process of the present invention determines the deltas of a plurality of objects (fingers).

FIG. 35 is a flow diagram illustrating the Extended Zero Crossing method of the present invention.

FIGS. 36A and 36B are color snapshots illustrating missing edges following performing the Moving Delta method of the present invention, and the need to apply a Moving Edge Recovery process, according to an aspect of the present invention.

FIG. 37 is a flow diagram illustrating the Moving Edge Recovery method of the present invention.

FIGS. 38A-J compares application of the Dynamic Edge Detection method of the present invention with and without the benefit of the Moving Edge Recovery method of the present invention.

FIG. 39 is a drawing of a Virtual Workstation (VW) environment that uses the Audio-Visual 3D and/or Mono-View 3D I/O methods of the present invention.

FIG. 40 is a flow diagram illustrating operation of the VW shown in FIG. 39, using the Audio-Visual 3D and/or Mono-View 3D I/O methods of the present invention.

FIG. 41 is a diagram illustrating a Virtual Conferencing (VC) that uses the Audio-Visual 3D and/or Mono-View 3D I/O methods of the present invention.

FIG. 42 is a flow diagram illustrating the operation of the VC shown in FIG. 41, using the Audio-Visual 3D and/or Mono-View 3D I/O methods of the present invention.

FIG. 43 is a drawing illustrating a Virtual Car Control System (VCCS) that uses the Audio-Visual 3D and/or Mono-View 3D I/O methods of the present invention.

FIG. 44 is a drawing illustrating a Virtual Music Station (VMS) that uses the Audio-Visual 3D and/or Mono-View 3D I/O methods of the present invention.

FIG. 45 is a drawing illustrating a Real Gamestation (RG) that uses the Audio-Visual 3D and/or Mono-View 3D I/O methods of the present invention.

DETAILED DESCRIPTION OF THE PREFERRED EMBODIMENTS

Figure 1:
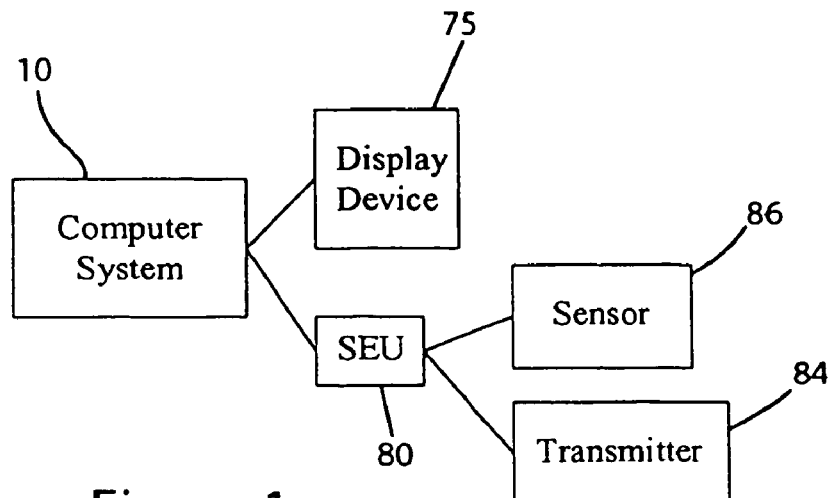
FIG. 1 is a block diagram illustrating exemplary mechanical devices that may be utilized with the methods in accordance with the present invention.

Before the present invention is described in such detail, it is to be understood that this invention is not limited to particular variations set forth herein as various changes or modifications may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events that are logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "and," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Last, it is to be appreciated that unless defined otherwise, all technical and scientific terms used herein have the same meaning as commonly understood by one of ordinary skill in the art to which this invention belongs.

Referring to the detail drawings and the disclosure herein, the term "keyboard" is defined herein to include alphanumeric keyboards, subsets of alphanumeric keyboards, keypads including numerical keypads, telephone and DTMF keypads, security access input devices using buttons and labels, etc., and so it not limited to QWERTY alphanumeric keyboards. Accordingly, it is understood that the use of the term "keyboard" and the depiction in any of the figures of a keyboard such as a QWERTY alphanumeric keyboard typically used with personal computers and the like is only an example of a keyboard for use, interaction, and operation by a user for any application of keyboards for input and/or output devices. As defined herein, the term "keyboard" is more than a plurality of keys, since a keyboard includes a layout of the plurality of keys as well as keys, with the layout typically being predetermined. The keys may be associated with symbols such as alphabetical, numerical, mathematical, or other representations, and the keys may include associated pictorial or symbolic representations thereupon. Accordingly, a keyboard is not identical to a set of buttons but may be a plurality of buttons having a layout and a set of symbols associated with each key or button.

The term "virtual reality" and its abbreviation "VR" are herein defined to include, but not limited to, visual and/or other sensory applications implemented using software and/or hardware to simulate and/or provide representations of environments which may be different from the physical environment of the user. Such VR may provide visual and/or multimedia zones, worlds, and work areas in which the user and/or other software applications may change and interact representations of elements in the VR environment. For example, in a VR world, a graphical representation of a switch may be changed to represent the flicking or switching of the switch, which may have an associated switch-flicking sound, which is activated by flicking the switch. In addition, the VR switching of the VR switch may cause the actuation of other events, either in the VR world or in actual physical devices and structures; for example, the flicking of the VR switch may cause an actual computer to be turned on or off. Accordingly, the term "virtual reality" is not limited to simulations or representations of VR devices and information in VR worlds, but may also be extended to physical devices as well as, in hybrid implementations, to both physical and VR devices.

In accordance with the present invention, the detail description of the present invention will be divided into sections, wherein each section will be utilized to described components of the present invention. It shall be understood that the examples described herein should not be considered limiting in any manner and should be considered exemplary.

In accordance with the present invention there is provided devices, systems and methods for providing a human interface device that may be utilized to simulate a virtual environment. The human interface device includes hardware components consisting of a tracker assembly, a processing unit, and a display device. The software/firmware components comprise a virtual environment manager (VEM) and a Multi-Dimensional Basic Input/Output subsystem (MD-BIOS), wherein the software and hardware components are utilized in combination to provide a virtual environment. Examples of applications of the present invention include a virtual workstation environment (VWE) wherein a physical computing system is simulated in a virtual environment including virtual hands and virtual input devices such as a keyboard, pointing device or other similar input devices. Another contemplated application for the present invention is a virtual gaming system (VGS) wherein the present invention could be utilized to simulate a gaming environment wherein the user could virtually interact within the game. The above examples are to be considered to be merely exemplary in that the present invention may be utilized in many other applications such as military use, flight simulation/training, corporate meetings, etc.

The present invention will now be described in greater detail below with regard to the system's individual components.

Hardware

In accordance with the methods of the present invention there will be disclosed hardware devices that may be utilized in accordance with the methods of the present invention. It shall be understood that many of the hardware components are described in a general sense and that many other types/styles of similar hardware devices may be substituted for those described herein. For example, as described in the present invention a computer system may be embodied as an Intel® central processor unit (CPU) based system a RISC based processor system, though it shall be understood that this should not be considered limiting in any manner in that a computer system for use with the present invention may be based on similar microprocessor devices.

Referring now to FIG. 1, there is shown an exemplary embodiment of hardware components in accordance with the present invention. As shown in FIG. 1, the hardware components comprise a microprocessor based computer system, a display device, and a tracking system. In addition to the hardware shown, the present invention further includes software running stored in a computer readable medium, wherein the software is in association with the hardware components of the system. The software of component of the present invention will be described in greater detail below in reference to the methods of the present invention.

Figure 2:
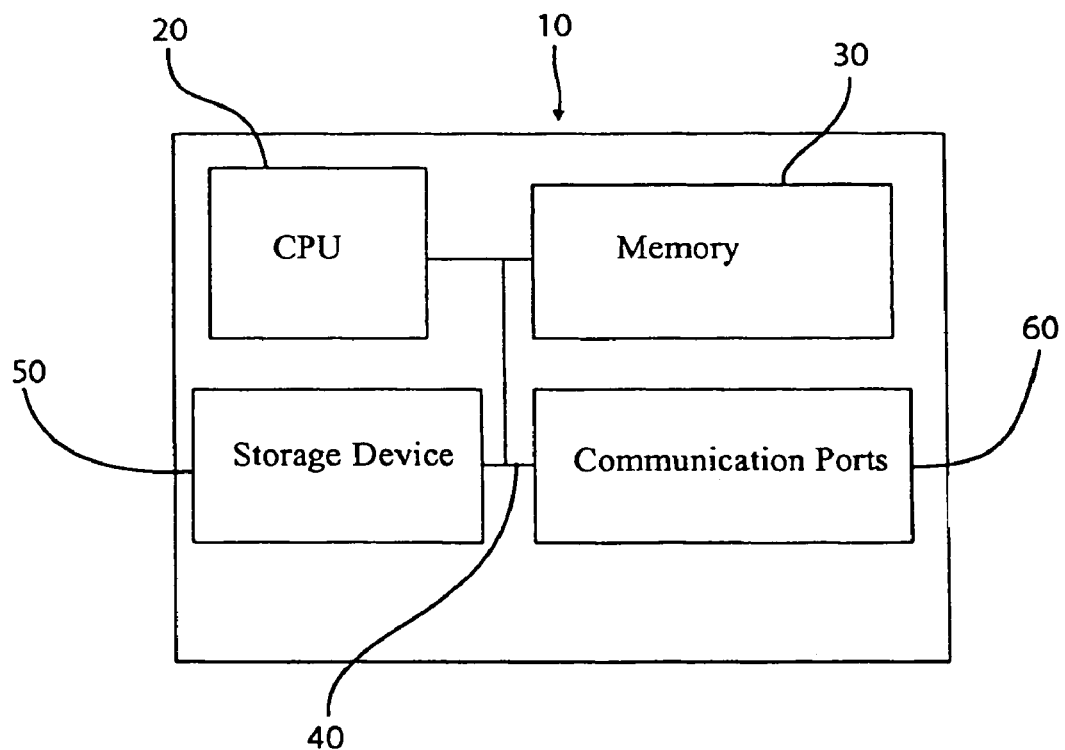
FIG. 2 is an exemplary embodiment of a computer system in accordance with the methods of the present invention.

As shown in FIG. 2, the microprocessor based computer system 10 includes a central processing unit 20, memory 30, a communication bus 40, a computer readable storage device 50 such as an optical storage device, magnetic storage device, flash memory storage device or similar computer readable storage mediums, and at least one communication port 60. The communication port 60 comprise any one of the following types of communication ports as well as a combination thereof: universal serial bus (USB), IEEE 1394 (firewire), serial port, parallel port, infrared port, 802.11b, 802.11a, 802.11g, Bluetooth® or similar communication ports and devices.

Figure 3:
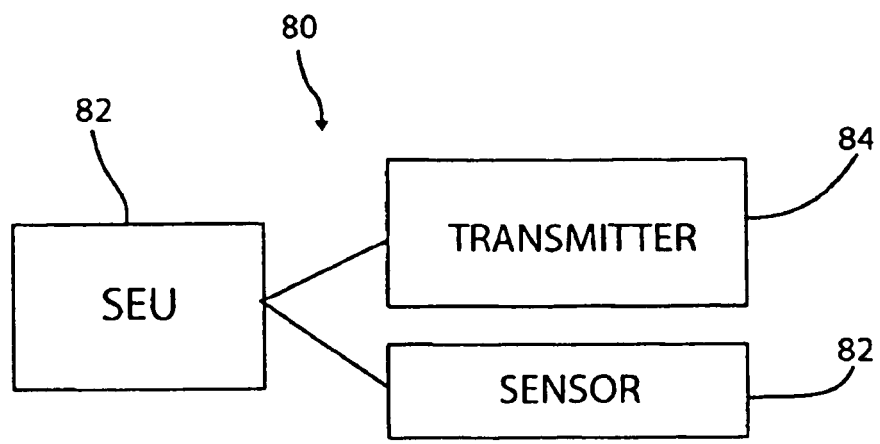
FIG. 3 is an exemplary block diagram of the tracker system in accordance with the present invention.

Referring now to FIG. 3, there is shown an exemplary embodiment of the tracker system 80 in accordance with the present invention. The tracker system 80 comprises a system electronic unit (SEU) 82, at least one transmitter and at least one sensor each in communication with the SEU 82.

The SEU 82 comprises communication ports that are in communication with at least one sensor 86 and at least one transmitter 84. The communication ports may comprise serial, parallel, universal serial bus, Firewire® or other similar wired communication ports. The SEU 82 additionally includes an analog section and a digital signal processing section controlled by a computer program stored within an erasable programmable memory device. The functionality of the SEU 82 and the interaction between the transmitter and the sensors will be described in greater detail in the methods section of the present invention.

As shown in FIG. 3, the SEU 82 is in communication with the transmitter 84 and at least one sensor 86. In one embodiment the sensor 86 is configured to be coupled to the SEU 82 through the use of a cable communication device such as a serial port, parallel port, universal serial bus, firewire port, or similar wired communication ports. The transmitter may be coupled to the SEU through similar communication devices such as those described above with regard to the sensors.

The transmitter 84 is configured to emit an electromagnetic signal, wherein the SEU 82 controls the transmission rate of the transmitter 84. Transmitters 84 that may be utilized with the current invention are those shown and described in U.S. Pat. No. 4,742,356, the entirety of which is herein incorporated by reference. The transmitter 84 includes a plurality of radiating antennas for radiating electromagnetic energy. Each of the radiating antennas having independent components for defining a source reference coordinate frame. The transmitted electromagnetic field will generally have a transmission range of about 0 to 30 feet, more preferably 0 to 15 feet and most preferred about 0 to 3 feet. The range of the transmitted magnetic field may be adjusted manually or automatically in accordance with the methods disclosed herein. It is further contemplated that the transmitter 84 may be configured to include more than one transmitting device, wherein the two transmitting devices would be of different types. For example, the transmitter 84 may include a first magnetic transmitting device and a second transmitting device or third transmitting device. The second or third transmitting devices may be configured to transmit acoustical, optical, or electromagnetic signals. As will be described in greater detail in the methods section, the system in accordance with the present invention may be configured to automatically choose between the two transmitters or the system may be manually configured. For example, if the user were to utilize the system in an environment having a large amount of stray magnetic fields that may interfere with the magnetic tracker, the system in accordance with the present invention may automatically switch to one of the other transmitting devices.

The transmitter 84 is configured to transmit at least one signal. The transmitted signal may be electromagnetic, optical, acoustical, inertial etc. in a generally defined field of view. For example, the transmitting device may be configured to transmit a signal in a field of view having a spherical radius of between about 0 to 360 degrees, more preferably between about 0 and 270 degrees and most preferred between about 0 and 180 degrees. It shall be understood that although the present invention has been described as including only a single transmitting device shall not be considered limiting in any manner and that it is contemplated that additional transmitting devices may be utilized with the present invention to further expand the field of view of the transmitting device and or to increase accuracy and functionality.

Figure 4:
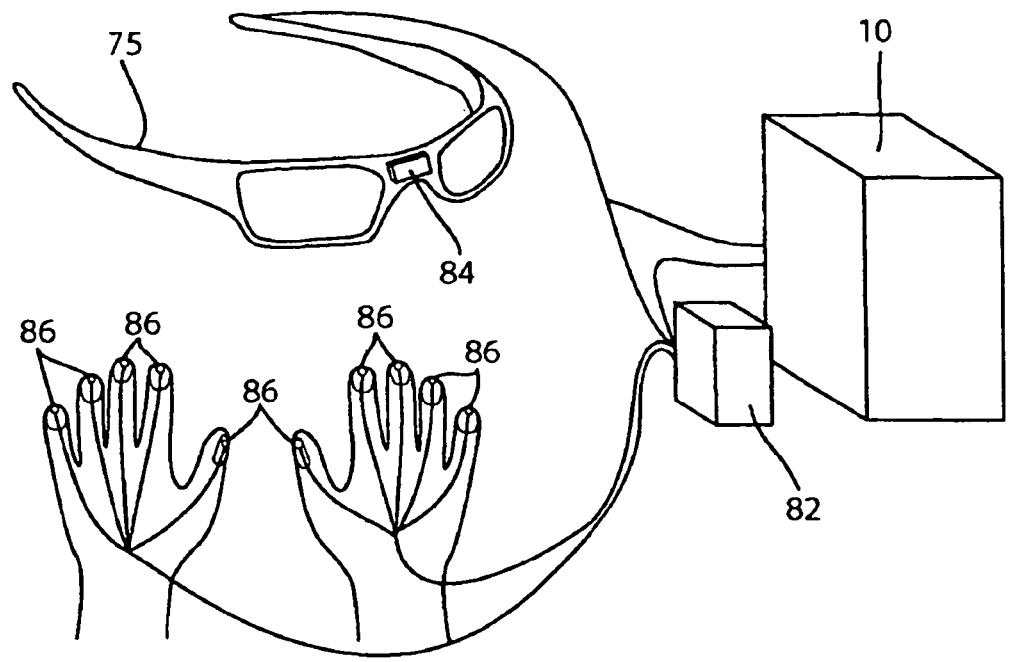
FIG. 4 is an exemplary embodiment of the system in accordance with the present invention.

Referring now to FIG. 4, there is shown an exemplary embodiment of the hardware components of the present invention in use. As shown in FIG. 4 the computer system 10, display device 75, and the tracker system 80, wherein the tracker system 80 comprises the transmitter 84, SEU 82 and sensors 86. In a preferred embodiment the computer 10 is configured to be embodied in the form of a wearable computer system. Examples of preferred computer systems would be based on the Pocket PC® platform developed by the Microsoft® corporation. Although a Pocket PC platform is described as a preferred embodiment this shall not be considered limiting in any manner. It is contemplated that a user may be tethered to a conventional desktop computer system either wired or wirelessly or utilize other computer systems such as an Intel® or AMD® powered computing system, PalmPilot® or other similar computing devices.

Referring now to FIG. 4, there is shown one embodiment of an display device 75 in accordance with the present invention. As shown in FIG. 4, the display device 75 may be configured to include the transmitter 84 of the tracker system 80. In one embodiment the transmitter 84 is configured to be retained on the display device 75. The display device 75 in a preferred embodiment is a liquid crystal display (LCD) device, wherein the LCD device is in communication with the computer system 10 through the use of a wired or wireless connection (not shown). In alternative embodiments, the display device 75 may comprise other types and styles of head mounted display devices, such as organic displays, thin film transistor (TFT) displays, light emitting diode (LED) displays. Additionally, it is contemplated that the display may incorporate a multi-layer device, wherein one layer is generally opaque and a second layer is a generally opaque dot-matrix layer, wherein the opaqueness of the first layer may be manually or automatically adjusted thereby allowing the heads-up display to be utilized in many different ambient light situations. While the present invention has been described as utilizing a single display device, it is contemplated that a second display device may be utilized for stereoscopic vision. The second display device may be a conventional display device such as a cathode ray tube (CRT) device, a liquid crystal display (LCD) device, or a video projection device, wherein the transmitter 84 would be mounted onto the display device.

Figure 5:
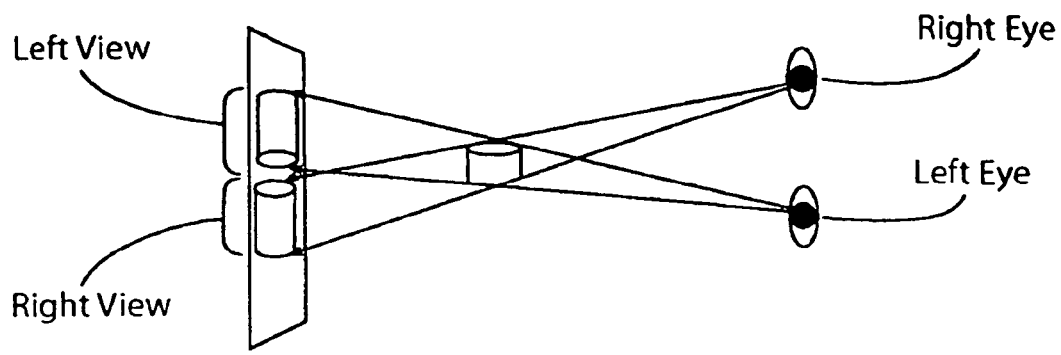
FIG. 5 is an exemplary embodiment illustrating an alternative embodiment of a display device in accordance with the present invention.

It is further contemplated that, a multi-layer liquid crystal display may be utilized in accordance with the present invention, wherein the multiple layers are capable of simulating three-dimensions. By utilizing two display devices a three dimensional workspace may be simulated. Such a system could be utilized to simulate a "real" world experience in the virtual environment and would further provide haptic feedback. As such, the three-dimensional display device would be configured to interact with the software components of the present invention. The present invention would utilize a display device having two LCD screens, wherein a left view model is generated and a right view model is generated by a graphic processing unit (GPU). An example of such a system can be seen in FIG. 5, where there is shown an exemplary embodiment of the three dimensional system in accordance with the present invention. As shown in FIG. 5, a user's right and left eyes would focus on the right and left view model generated in the display device, wherein the user's brain can comprehend the information displayed on the display device and decide the distance and depth of the displayed object. Thus, the user would believe that they are seeing a true three dimensional display of the object displayed on the display device.

Figure 6:
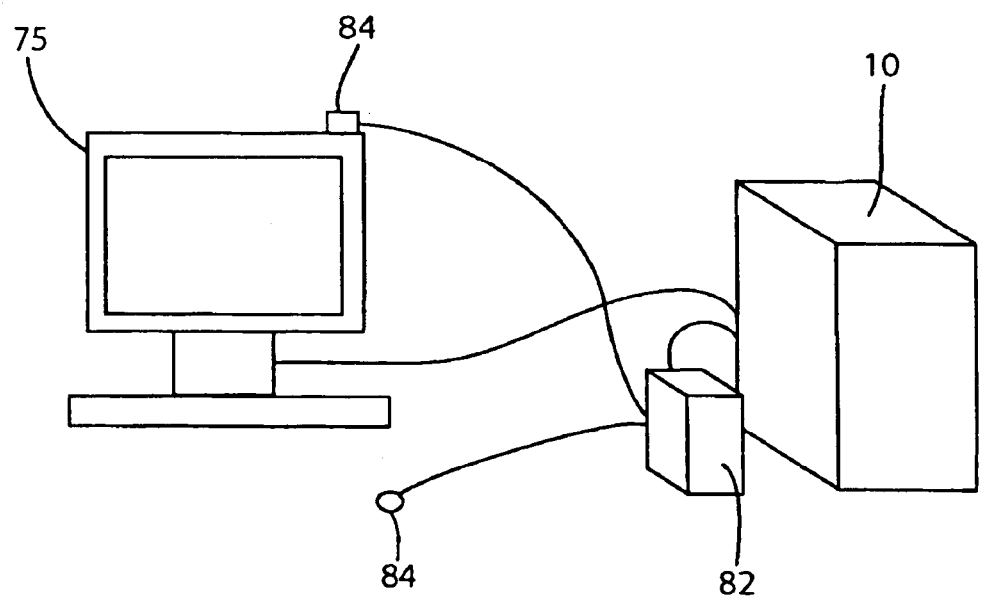
FIG. 6 an exemplary embodiment of an alternative display device in accordance with the present invention.

Referring now to FIG. 6, there is shown an alternative display device in accordance with the present invention. As shown in FIG. 6, the display device may be a conventional display device such as a cathode ray tube (CRT) monitor or a liquid crystal display (LCD) monitor, wherein the tracker would be in association with the monitor frame. For example, the transmitter may be positioned in the upper corner of the monitor frame, wherein the physical location of the transmitter will be utilized to establish an origin for the coordinate system of the present invention as will be described in greater detail. Further still, it is contemplated that the transmitter may be placed in other locations on the frame of the display device or alternatively in a location near the display device. In addition to conventional display devices as described above, other types of display devices may be utilized. For example, a video projector may be utilized to project an image on a surface, wherein the transmitter will be placed near one corner of the projected image. The projected image may be directed onto a screen, wall or similar vertical surface, or alternatively, the projector may be mounted such that the image is projected onto a horizontal surface such as a conference table. Further still, the display device may be a combination of devices, for example, a video camera and a CRT or LCD or projector, wherein the present system and methods may be utilized for video conferencing.

In another embodiment, it is contemplated that the display device may be embodied in the form of a physical display device such as a white board, chalkboard or a similar device, wherein the transmitter would be mounted to one corner of the board.

Still further, it is contemplated that any of the display devices described above may be utilized in any combination. For example, a user may utilize a head mounted display device and a projector simultaneously in accordance with the methods described in the present application.

As shown in FIGS. 1-6 the present invention further includes at least one sensor device 86 disposed on the user. The sensor device 86 is preferably disposed on the user's hand, and most preferable disposed on the user's fingertip. It is contemplated that at least one sensor 86 may be disposed on each of the user's fingertips. As shown and described in FIGS. 3 and 4, the sensors are in communication with the SEU 80.

The sensor(s) 86 are comprised of multiple coils encased in a protective housing, wherein the coils are configured to interact with the electromagnetic field generated by the transmitter 84. Each of the sensors are configured to generate at least one electrical signal, and more preferably between about three and six electrical signals in response to interaction with the signal generated by the tracking device. The electrical signal(s) generated by the sensor 86 are passed through the cable connection to the SEU 82, wherein the signals are amplified and converted into a digital signal. In addition to converting the sensor signals into digital form, the MD-BIOS further assigns a unique sensor id to each sensor. The digital signals are embodied in the form of coordinate information of the sensor, such as, x, y, z, and yaw, pitch and roll information. This coordinate information is then passed from the SEU 82 to the computing system 10.

Figure 7:
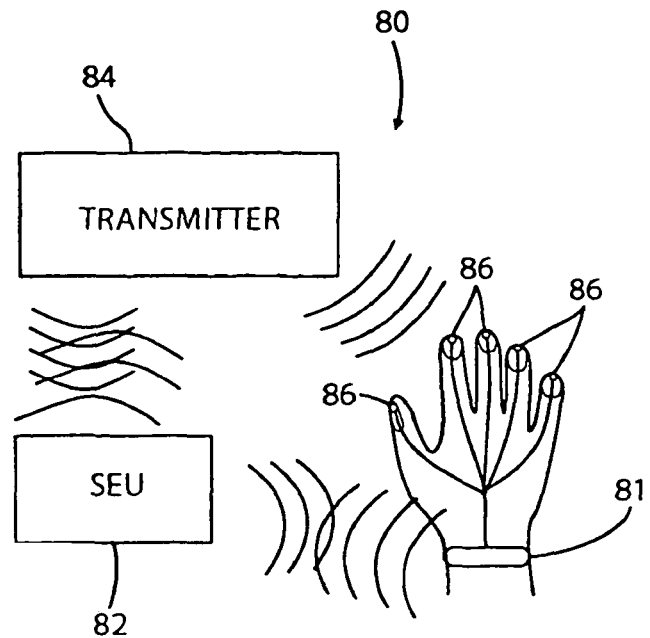
FIG. 7 an exemplary embodiment of a user's hand illustrating the wireless communication of the tracker system.

Referring now to FIG. 7, there is shown an alternative embodiment of the tracker system 80 in accordance with the present invention. Wherein in the alternative embodiment it is contemplated that the sensors 86 may be connected to a transducer 81, wherein the transducer is configured to convert the analog signals to digital signals and wirelessly communicates the digital data to the SEU 82. In one embodiment in accordance with the present invention, the transducer 81 is configured to be hard wired to at least five sensors. In this configuration the transducer would assign a unique sensor identification (ID) to each sensor, wherein this unique sensor ID would be transmitted to the SEU 82 along with the coordinate data of each sensor. Although the transducer has been described as being wirelessly coupled to the SEU 82 it is contemplated that it may communicate with the SEU 82 through a wired communication port. It shall be understood that more than one transducer 81 may be utilized with the system in accordance with the present invention. For example, sensors may be disposed on each fingertip of a user's hands, wherein at least two transducers 81 will be utilized, one transducer 81 being disposed on each of the user's hands and in association with the sensors disposed on each of the user's fingertips respectively.

Although the SEU 82 has bee described as being an independent component separate from the computing system 10 it is contemplated that the SEU may be integrally formed with the computing system. For example, the SEU may be configured to be a removable communications card in the form of a PCMCIA card, compact flash card, PCI card or other similar removable devices. Alternatively, SEU may be integrated into the system board of the computing system.

Although specific hardware has been described in conjunction with the present invention, it shall be understood that it is contemplated that variances in the described hardware may be undertaken without departing from the scope of the present invention.

Methods

In accordance with the present invention, methods of use of the present invention will be described in detail below, wherein it shall be understood that these components will be described in a general sense and should not be considered limiting in any manner. In accordance with the present invention, various mechanical components are utilized in conjunction with software and electronic components to define the system and methods in accordance with the present invention.

Figure 8:
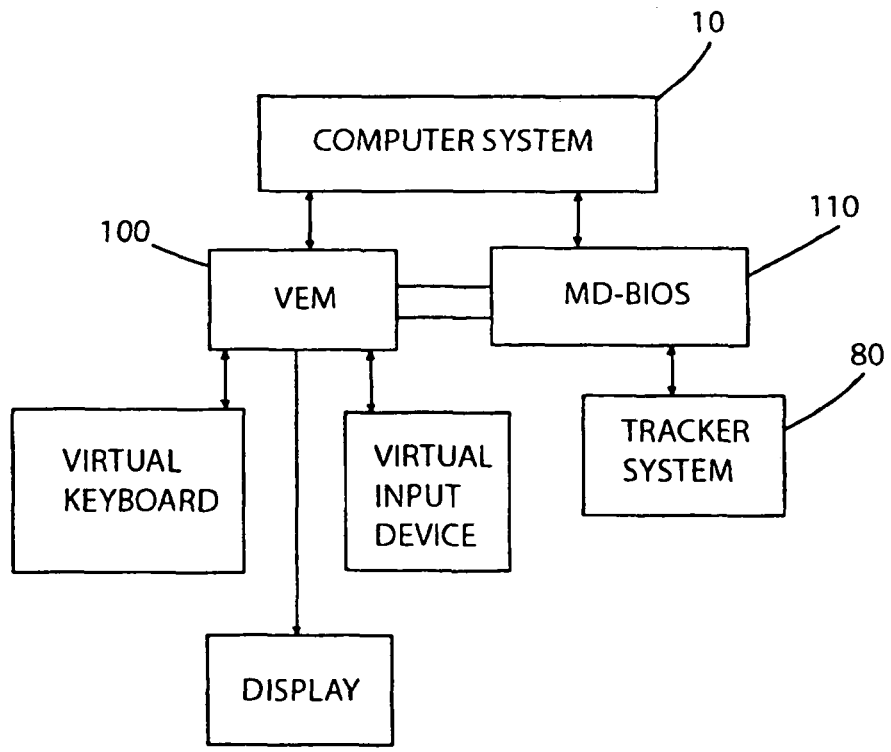
FIG. 8 is a functional flow diagram illustrating the method in accordance with the present invention.

In accordance with the present invention there are provided software components configured to control the various hardware component of the present invention wherein the software and hardware components together form the system of the present invention. Referring now to FIG. 8 there is shown an exemplary functional flow chart illustrating the interaction between the various software components of the present invention. As shown in FIG. 8, the software components in accordance with the present invention comprise a virtual environment manager (VEM) 100 and a multi-dimensional basic input/output system (MD-BIOS) 110, wherein the software components are configured to interact with the hardware components described above. Furthermore, it is contemplated that the software components of the present invention will be embodied in a computer readable media such as a cd-rom, dvd, hard drive, flash memory, programmable read only memory or any other type of computer readable media.

As shown in FIG. 8, the VEM 100 receives coordinate data and a time stamp from MD-BIOS 110, wherein the VEM 100 utilizes the coordinate data to simulate virtual device actions and display the virtual device actions on the display device. Additionally, MD-BIOS 110 and VEM 100 are in communication with an operating system. It shall be understood that the VEM 100 can be tailored for each application purpose. For example, if the system in accordance with the present invention is configured to virtually simulate a computer workstation, then the VEM 100 would be configured as such to generate a virtual workstation. Additionally, if a gaming system is to be replicated then the VEM 100 would be a virtual gaming manager, is a conferencing system is to be replicated than the VEM would be configured to be a Virtual Conferencing Manager. It shall be understood that the above examples should not be considered limiting in any manner, in that they have been provided for exemplary purposes only.

Figure 9:
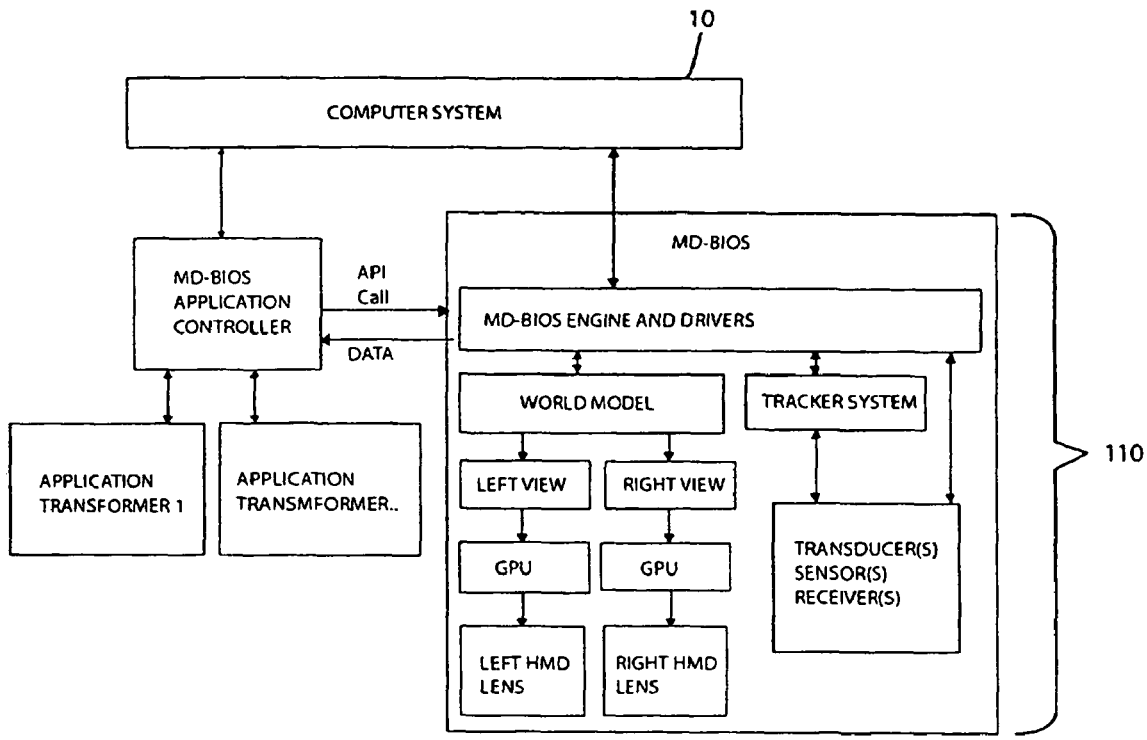
FIG. 9 is a functional flow diagram illustrating the interaction between the software and hardware components of the present invention in accordance with the methods of the present invention.
Figure 10:
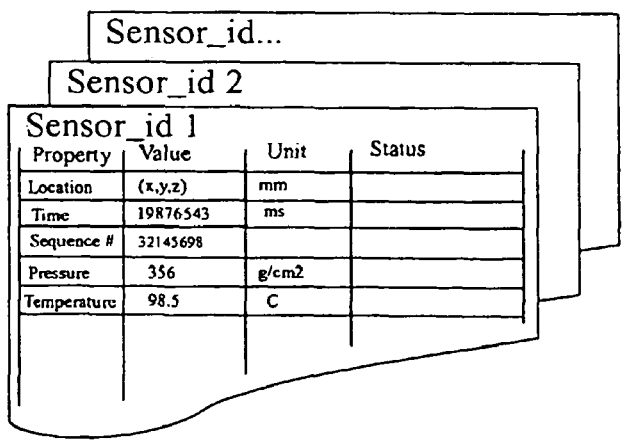
FIG. 10 is a block diagram illustrating an exemplary embodiment of the memory structure of the multi-dimensional basic input/output system in accordance with the present invention.

Referring now to FIG. 9, there is shown an expanded embodiment of MD-BIOS 110 in accordance with the present invention. As shown in FIG. 9, MD-BIOS 110 receives coordinate data from the SEU, wherein MD-BIOS adds time stamp information to the coordinate information. Referring now to FIG. 10, there is shown an exemplary embodiment of the memory structure of MD-BIOS, wherein data received from each sensor is interpreted and placed into appropriate memory location in the memory structure as shown. MD-BIOS is capable of receiving data from a multiple number of sensors, wherein each sensor is assigned a sensor identification tag (id) by the MD-BIOS or transducer depending upon the system's configuration.

Applications that utilize MD-BIOS not only can read the sensor id's and their properties, but can also check the sequence number to know the difference between each input to the application. Applications can also interact with MD-BIOS in one of two ways or in a combination of each. For example, it is contemplated that multiple programs running in a memory space of the personal computer may utilize different sets of sensors. For example, in association with the virtual workstation embodiment, a number of sensors associated with the user's fingertips may be utilized to control the virtual keyboard and mouse in a word processing program, while another program may be collecting data from other sensors associated with the present invention. For example, the present invention may be utilized in a laboratory setting, wherein in addition to manually entering data by utilizing the virtual keyboard, a scientist may wish to automatically collect data from an experiment or room conditions. In this embodiment, the scientist would dispose additional sensors to measure to desired properties. For example, one sensor would be utilized to measure room temperature, another for humidity, another to measure ph or another chemical property of an experiment, etc.

The first method of program interaction is referred to as synchronized interaction. In the synchronized method, if one or more applications are interested in the same set of sensor id's the applications need to register to MD-BIOS to listen to the set of sensor id's which each application has interest and leave a call-back function address with MD-BIOS. Therefore, whenever data is updated, MD-BIOS interrupts the application to acquire the data, then the application resumes processing the data. This provides synchronous operation of data processing and data acquisition. In the asynchronized method, if one or more unequal frequency applications are interested in the same set of sensor id's, MD-BIOS will filter out the application that requires a higher sampling frequency. MD-BIOS will carry out its best resolution, if the requested frequency is outside the resolution of the tracker, then MD-BIOS will either return an error or will return a reduced frequency rate. In this case, some of the lower frequency applications may need to know the data acquisition gap and therefore utilize the sequence number of the sensor id' to determine the frequency.

Additionally as previously discussed and shown in FIG. 5, MD-BIOS may additionally be utilized to create a true three dimensional virtual environment through the use of at least two display devices, wherein MD-BIOS generates a left and right view which are then displayed on a customized display device as previously described in the hardware section above.

Further still, it is contemplated that MD-BIOS may be further configured to control the transmitter in combination with the system electronic unit, wherein the two systems could be utilized to adjust the transmission frequency of the transmitter or switch between the various transmitter types. As described herein in accordance with the present invention, the transmitter is configured to emit an electromagnetic signal that the sensors interact with and produce an electrical signal that is converted into the coordinated received by MD-BIOS. MD-BIOS compares the coordinate information against the previously received coordinate information for each sensor, if the deviation of each sensor is greater than a predetermined amount, for example, sensor movement of a quarter of an inch in one computing cycle at 120 Hz would be considered to be excessive. Therefore, MD-BIOS would automatically direct the transmitter to energize the alternative transmitting devices, wherein MD-BIOS would then sample the coordinate generated by all transmitting devices, if one set of coordinate information is outside the parameters as described above then that coordinate information is discarded and the other two sets of coordinate information are compared. If the two remaining coordinate information sets are similar, MD-BIOS chooses one of the transmitting systems and turns the remaining systems off. Therefore, MD-BIOS will automatically switch between the individual transmitting devices if interference is detected. Typically, MD-BIOS will automatically switch without the user's knowledge, though it is contemplated that the user may specify a desired system and adjust the default values to their preferences.

In accordance with the present invention the Virtual Environment Manager is utilized to generate a virtual workstation environment. The virtual workstation includes a virtual keyboard at least one virtual input device. As described above MD-BIOS receives coordinate data from the sensors adds a time stamp to the coordinate information and stores the coordinate data in a memory structure as shown in FIG. 10. The virtual environment manager includes a plurality of action thresholds to determine if sensor movement is to be interpreted to be an intended user input or is sensor movement can be attributed to inherent user movement such as natural heartbeat or muscle twitching. Initially, these threshold values are set at default levels, though these default levels may be adjusted by the user to suit the user's own preferences.

Referring now to FIG. 11 there is shown threshold values that the VEM utilizes for determining if sensor movement correlates to intended user input. After receiving coordinate data from MD-BIOS, the coordinate data is utilized to determine whether the sensor movement is to be returned as a key press or other intended input or if the sensor movement is due to natural movement. Initially, VEM generates a virtual keyboard having a known origin, wherein the coordinates generated for each of the sensors are compared to the origin coordinates to determine where the user's hands are in relation to the keys of the virtual keyboard. A virtual input device, such as a mouse is also generated wherein a set of origin coordinates are also established for the virtual input device, thereby allowing VEM to determine sensor location in relation to the virtual keyboard and virtual input device.

As shown in FIG. 11, the key press threshold is a vector property wherein a value of less than negative one millimeter of a sensor's coordinates will be interpreted as a key press, wherein VEM will compare the sensor's coordinates to the origin coordinates of the virtual keyboard or mouse to determine the proper key press. The key press will then be transmitted to the appropriate program, such as a word processing program, text-editing program, graphics program, etc. A key release will be interpreted as a vector having a value of greater than 1 millimeter and having duration greater than one second. A key hold will be determined by MD-BIOS as a vector having a value equal to one millimeter.

Movement of the virtual input device is determined by vector movement of the sensors, if the coordinate values of the sensors are moved less than one millimeter then VEM will not consider this to be a mouse movement, if the coordinate movement is greater than one millimeter this will be interpreted as a mouse move. To determine if the user intends to depress a button on the mouse, VEM utilizes the threshold values which have been pre-established for key presses on the virtual keyboard.

In accordance with the present invention a series of functional flow diagrams will be described herein, wherein the functional flow diagrams are utilized to illustrate the interaction between the various components of the present invention.

Methods

In accordance with the present invention there is provided methods for a virtual computing environment. Wherein a virtual environment manager will be embodied in the form of a virtual workstation manager. That is the present invention will be utilized to replicate a personal computing system and the physical input devices in a virtual environment. As will be described in detail below, the virtual workstation manager will generate virtual input devices such as a keyboard, a mouse or other input devices.

Figure 12:
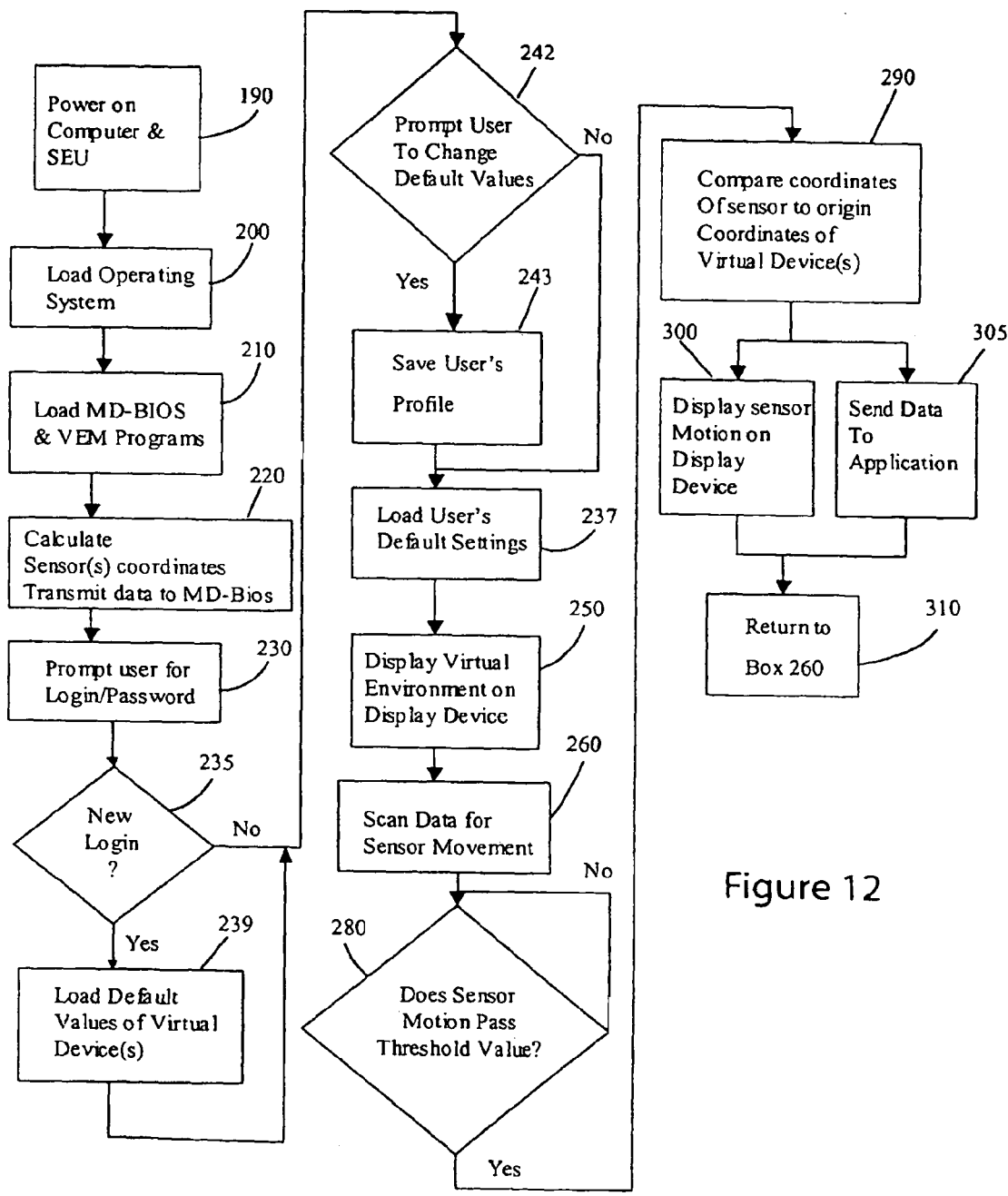
FIG. 12 is a functional flow diagram illustrating the method steps in accordance with the present invention.

Referring now to FIG. 12, there is shown an exemplary embodiment of a method in accordance with the present invention, wherein the VEM and MD-BIOS are embodied in a computer readable medium. The method according to the present invention comprises the steps of: initializing a computer system, including initializing the SEU, loading an operating system into a memory space, loading VEM and MD-BIOS into a memory space. As soon as MD-BIOS is loaded into a memory space, MD-BIOS begins to receive coordinate information from the SEU; VEM then begins to scan for sensor movement to determine if any sensor movement passes the threshold values. A display device is initialized, wherein VEM (such as VWM) then displays virtual hands, virtual keyboard and at least one virtual input device on the display device. MD-BIOS each of these processes will be described in greater detail with reference to detailed functional flow diagrams.

The methods according to the present invention may utilize hardware devices such as those described above or hardware devices similar to those shown and described above, wherein the present invention utilizes software or firmware to control the hardware in a manner to replicate a virtual environment. In accordance with the present invention comprises at least one software program or firmware code previously described herein wherein the software includes the VEM and MD-BIOS programs Referring now to FIG. 12 there is shown a functional flow diagram illustrating exemplary steps of the method in accordance with the present invention. At Box 190 a computing system is powered on, this includes powering on the SEU additionally if the SEU is embodied as an individual component separate from the computer system. As Box 200 an operating system is loaded into a memory space. At Box 210 MD-BIOS and the Virtual Environment Manager are loaded into a memory space within the computer system. After loading MD-BIOS and the virtual workstation manager into a memory space, MD-BIOS immediately begins receive coordinate information from the SEU at Box 215. As described in detail above the electrical signals generated by the sensors are converted to coordinate information and a time stamp is added by MD-BIOS and the data is stored in a memory location. VEM then compares the coordinates of each sensor to determine if motion of the sensor(s) has occurred and whether the sensor motion is intended to be a key press on the virtual keyboard or virtual mouse. The transmission and scanning rate of the tracker is controlled by MD-BIOS. Wherein the scanning and transmitting frequency of the tracker is controlled in response to the physical location of the sensor(s) in relation to the tracker and the origin coordinates of the virtual devices. For example, as the sensors are moved closer to the virtual devices the scanning rate of the tracker will be increased, thereby increasing the accuracy and resolution of the system. When the sensors move away from the virtual devices, the scanning rate is reduced, thereby lowering the power consumption of the devices. In addition to controlling the scanning rate, VEM also may be configured to display a visual indicator of the sensor(s) position on the display device as well as provide auditory feedback to the user. For example, as the sensor(s) are moved to a location above the virtual keyboard, the sensor may change colors to indicate how close the sensor is to the keyboard, when the sensor moves toward the keyboard, VEM changes the color of the sensor to indicate a key press and provides an auditory response to the user to denote a key press.

In an alternative embodiment the virtual keyboard may be configured to respond to absolute movement of each of the user's fingers (sensors). In this embodiment, the threshold values are set to zero or near zero, wherein any movement of the user's finger will correlate to a typing motion or mouse motion depending upon where the user's fingers are located in relation to the virtual devices.

At Box 230 the system prompts the user to enter the user's login and password. At Diamond 235 it is determined If the user already has a password and login then Box 237, where the user's saved settings are loaded into a memory space. A user's settings may control what is displayed on the virtual display device such as input devices (keyboard, mouse, tablet), the location of these input devices in the virtual setting and any other user definable preferences such as visual or audio feedback, tactile feedback and sensitivity of sensor movement, or other preferences. For example, user A may have saved settings from a previous use, wherein once logged into the system, VEM (such as VWM) displays a virtual keyboard, a virtual monitor and a virtual mouse, wherein the virtual workstation manager controls the origin coordinates of where each of these devices will be displayed in the virtual environment. If it is determined in Diamond 235 that a new user is logging in then at Box 239 default values for the virtual devices displayed on the display device are loaded into memory. At diamond 242, the system prompts the user whether or not they want to customize the default values. If the user chooses to customize the default values then Box 243. At Box 243 the user's customized settings are saved under their login profile and then to Box 240. If the user does not choose to customize the default settings then Box 240.

At Box 240 the display device is initialized and at Box 250 the virtual devices are displayed in the virtual environment at the location dictated by either the user's settings or the loaded default values.

If the user is a previous user, the virtual environment manager will be called wherein the user's preferred settings will be retrieved from a memory location and loaded into a memory space. If the user is new to the system, the Virtual Environment Manager will be continue to use system default values into memory. These default values may be changed by the user and saved under the user's personal profile before exiting the system, wherein these settings will be loaded when the user utilizes the system in the future.

Examples of user definable settings are the type and style of keyboard that will be displayed in the virtual environment. For example, the user may prefer to utilize a standard size keyboard having a standard QWERTY layout, or the user may prefer to utilize an ergonomic keyboard. Additional settings would be the physical location of the keyboard in the virtual environment. Such that when the system is initialized the keyboard will be shown in the virtual environment wherein the coordinates of the keyboard are known. In addition to displaying a keyboard as a user setting, additional settings may control the display of other virtual input devices such as a mouse, a virtual monitor or similar devices. Each of the virtual devices displayed within the virtual environment will have origin coordinates known to the virtual environment manager. The user in the virtual environment may control the style, size and location on the virtual input devices. For example, the keyboard may include handles, wherein the user can grab the handles in the virtual environment and move, stretch, pull-apart the keyboard. The other virtual input devices may also include handles to allow the devices to be re-positioned re-sized or stylized within the virtual environment. When the computer system is powered down, the virtual environment manager can saves the user's settings, wherein the virtual environment may be loaded each time as left by the user in each previous use.

Once the user has logged into the computer system, the operating system and virtual environment manager and MD-BIOS finishes loading into memory with the user's settings. After loading the operating system and MD-BIOS into memory, the display device is initialize, Box 240, wherein a graphical user interface (GUI) is displayed on the display device Box 250. For example, if the operating system is based on Microsoft Windows® then the standard GUI interface will be displayed in the display device. In addition to displaying the operating system's GUI, virtual input devices will also be display on the display device. As described above, the placement, size, shape and orientation of the input devices as displayed within the virtual environment is dictated by either the users saved preferences or in the case of a new user the default settings of the Virtual Environment Manager. In addition to displaying virtual input devices on the display device, a virtual set of hands may also be displayed if the user is wearing sensors on each of their fingertips.

Referring now to Box 260, the transmission rate of the signal is controlled by MD-BIOS and the virtual workstation manager in conjunction with the coordinate location of the sensors in relation to the tracker. The transmission rate of the tracker may be controlled according to sensor position. For example, if it is determined that the sensor is disposed near the known location of an input device, then the tracker's scan rate will be increased to increase accuracy of the system, if the sensor is disposed at a given distance from any virtual input device than the transmission rate of the tracker will be reduced, thereby saving power and reducing processing cycles. Further still, as described above, if coordinates received from the SEU are outside the operating parameters of the system, MD-BIOS will direct the transmitter to energize the alternative transmission sources, wherein the coordinates generated from these alternative transmission sources will be compared and the strongest or more accurate coordinate information will be utilized. Wherein MD-BIOS will direct the transmitter to turn off the alternative transmitting devices. In a preferred embodiment this process will occur automatically without any user interaction.

Referring now to Box 270, each of the sensors are constantly sampled by the SEU and coordinate data is sent to MD-BIOS where a timestamp is added and the information is placed into a memory location.

At Diamond 280, the virtual environment manager and determines if the velocity component(s) and the vector component(s) of the detected sensor motion pass threshold values. Threshold values are utilized to filter out undesired input as well as increase system accuracy. For example there are natural vibrations associated with humans such as heartbeat, slight hand motion or other natural vibrations. If it is determined that the vector components are greater than the threshold values, then it is determined if the coordinates are in the vicinity of the known coordinates of the virtual input devices generated by the virtual environment manager. For example, if the coordinates received correlate to a keyboard position for a letter, the velocity component and the previous coordinates are compared to determine the intentions of the user. By comparing the previous coordinates and the present coordinates in addition to the velocity component it can be determine if the motion is intended to replicate a keystroke, key release, key hold or key repeating. If the coordinates correspond to the location of the mouse, then the vector and velocity components will be utilized to determine if the user intended a mouse move, a mouse button depress/release, or a single or double click.

The movement of the sensors will be displayed on the display device in the form of a virtual set of hands or in the case of mouse motion, movement of a pointer within the virtual environment. In addition to displaying motion within the virtual environment, it may also be desirable to provide feedback in the form of audio, tactile, or visual feedback of interaction between the user and the virtual input devices. For example, if a key is determined to be depressed on a keyboard, then the virtual keyboard will be displayed wherein the chosen key is illustrated as being depressed. In addition to the visual feedback, audio or tactile feedback may be provided in the form of "clicking" sounds intended to replicate the physical sound of a standard keyboard.

At Box 300 and 305 the coordinate information generated from sensor motion is compared to the known coordinate information of the virtual input devices. For example, if a virtual keyboard is displayed according to the user's defined settings, coordinates of the keyboard are a known value that are stored within the shared memory manipulated through MD-BIOS API calls. Thus, when coordinates are calculated from sensor motion, the coordinates transmitted from the memory location of MD-BIOS are compared to the known coordinates of the keyboard. If the coordinates correspond to or are within a pre-defined range of an individual key disposed on the keyboard then the virtual environment manager will determine the user's intention as indicated in Box 330. The virtual environment manager determines the user's intention by comparing the velocity component generated by sensor movement and comparing the velocity component to a known value. For example, if the vector component is toward the plane of the keyboard, then the virtual workstation manager will interpret this to indicate a key press on the virtual keyboard. If the vector component is away from the plane of the keyboard it may also indicate that a key release was performed and the user's finger is moving away from the key. If the velocity component is zero or nearly zero this may be interpreted to indicate a key hold, such as a user holding down a shift key or the like. A vector of zero may also indicate a key repeating such as when a typed word includes two or more of the same characters. After the user's intention is determined then at Box 305, the intended information is sent to the operating system for entry into the event queue or windows manager. In accordance with the present invention, the key presses may be determined utilizing pure vector and velocity without consideration of the z-axis component. This would allow a user to utilize the present system while resting their hands on a surface, such as a tabletop or upon their person or the like.

At Box 300, the user's intended motion may be displayed on the virtual display device in the form of a virtual key-press on the virtual keyboard, motion of a virtual hand or pair of virtual hands, or an auditory or tactile response may be generated in response to the sensor's motion.

At Box, the system returns to Box 270, wherein the system returns to scanning for sensor motion and the process is repeated until the system is powered off.

It shall be understood that although the sensor motion component has been described herein in reference to a key press on a keyboard it shall be understood that this should not be considered limiting in any manner. In that the coordinates may correspond to any type of virtual input device, wherein each virtual input device has parameters which are utilized by the virtual environment manager to interpret the sensor motion. For example, if the coordinates received correlate to coordinated for a mouse, it will be determined if the coordinates define movement of the mouse, which will be displayed within the virtual environment. A mouse button press, mouse button release, a single button press or a double button press.

It is further contemplated that the virtual environment manager may be capable of distinguishing between different sets of sensors by each sensor(s) or transducer(s) unique ID. For example, if two users both utilizing a system in accordance with the present invention are near one another each tracker will only track those sensors to which the system is initialized. Thus, multiple systems can be utilized within close proximity to one another.

As shown in FIG. 12, the functional flow diagram illustrates a graphic based system, wherein the virtual reality system in accordance with the present invention is configured to display three-dimensional virtual input devices in a virtual environment. It is further contemplated that the present invention may be utilized in a text-based system. In a text based system the functional flow diagram as shown in FIG. 12 would not include Box 200 wherein the operating system is loaded into a memory space. In the text-based system the virtual keyboard generated by the virtual environment manager would be displayed one dimensionally and the virtual input device in a preferred embodiment would be a touch pad or a similar tracking device.

It is further contemplated that a portion of the software components of the present invention may be embodied in the form of a BIOS chip, wherein the BIOS chip would be installed on the computer system's mother board, such that when the computer system is powered on the software in accordance with the present invention would be loaded into a memory space from the BIOS.

Figure 13:
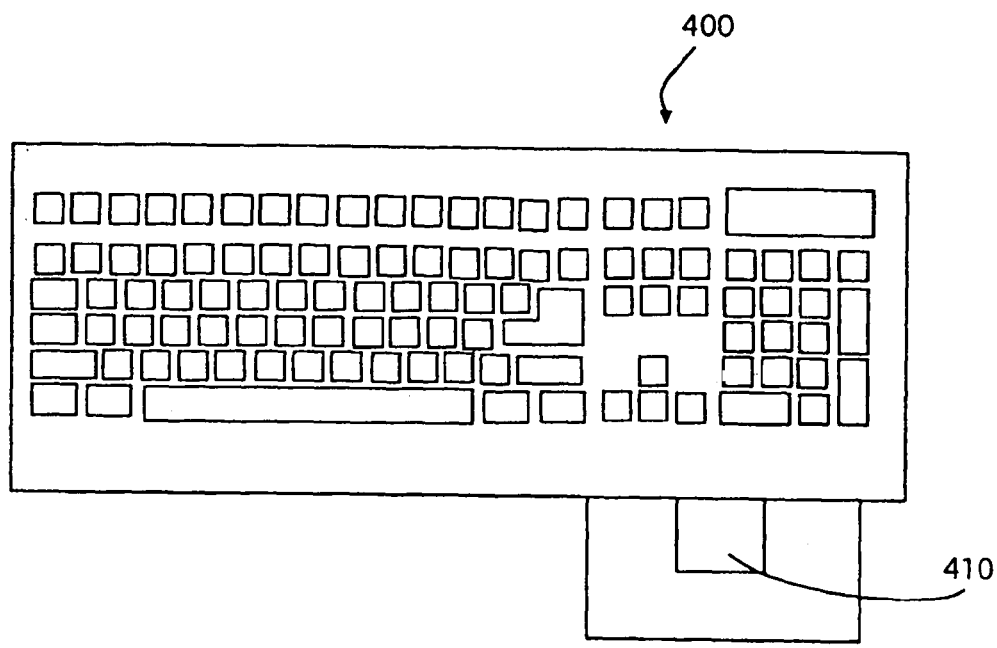
FIG. 13 is an exemplary embodiment of a virtual workstation environment as seen from a user's perspective, wherein a virtual keyboard is shown disposed three dimensionally over a virtual mouse.
Figure 14:
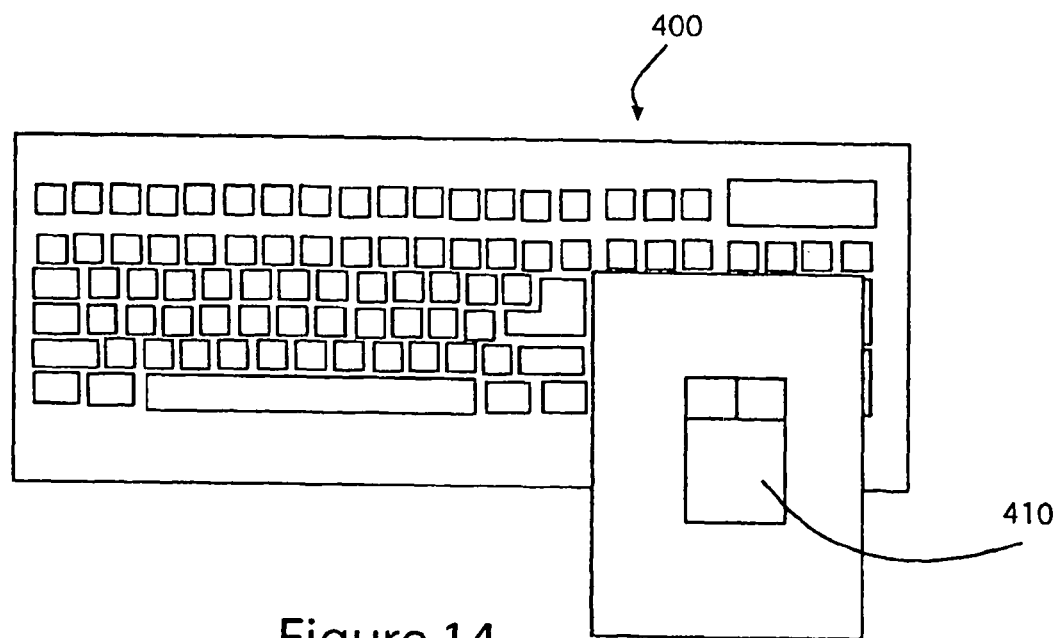
FIG. 14 is an exemplary embodiment of a virtual workstation environment as seen from a user's perspective, wherein the virtual mouse is shown disposed three dimensionally over the virtual keyboard.

Referring now to FIGS. 13 and 14 there are shown exemplary embodiments of various virtual keyboards as displayed in the virtual environment. As shown in FIG. 13, the virtual keyboard 300 may be disposed over the top of the virtual mouse 310 thereby allowing a user to immediately toggle between the keyboard and the mouse without having to physically move the sensors a great amount. This type of setup reduces motion associated with switching back and forth between the keyboard and the mouse, thereby potentially reducing repetitive stress injuries. Further still by providing such a layout, users of programs that require a user to switch back and forth between a pointing device and text input may be able to increase their productivity because less time is spent switching between the two devices. Referring now to FIG. 13, there is shown the virtual keyboard 300 and virtual mouse 310, wherein the virtual mouse is disposed over the virtual keyboard. As shown in FIGS. 13 and 14 the virtual mouse can be transposed between the two positions shown either through specific hand motions wherein the sensors and VEM generate a specific signal to transpose the mouse from one position to another. Alternatively, the mouse may be transposed utilizing a voice command, a hot key associated with the virtual keyboard or a hot spot located on within the virtual display. Additionally, although a conventional computer mouse is shown being displayed in the virtual environment, it is contemplated that any type of input device may be displayed, for example the input device may be a touch pad, trackball, tablet and stylus or similar input devices.

Figure 15:
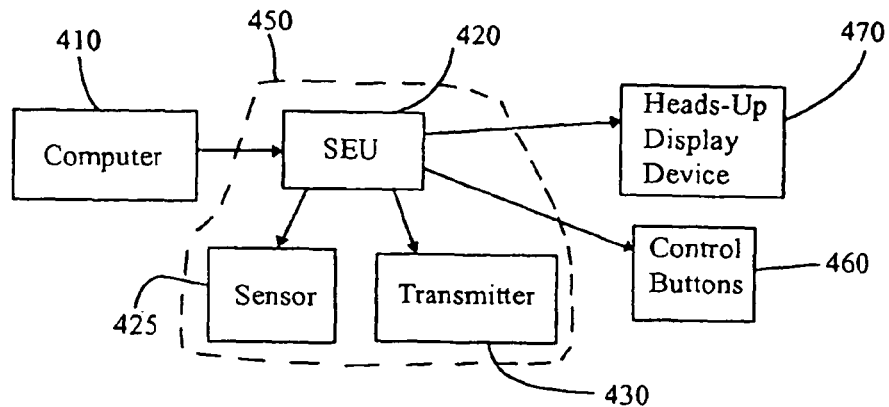
FIG. 15 is a functional flow chart illustrating hardware components of a virtual car control center.
Figure 16:
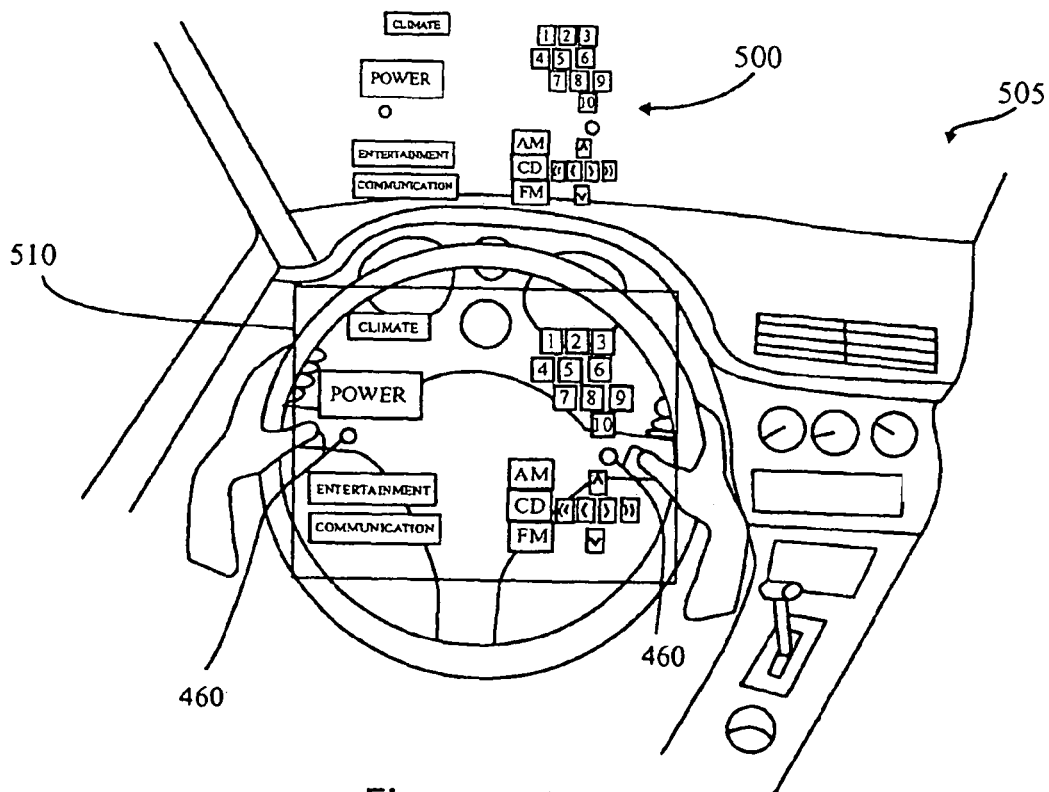
FIG. 16 is an exemplary embodiment of the present invention wherein the virtual environment manager has been configured as a virtual car control system.

Referring now to FIGS. 15 and 16 there is shown yet another application of the system in accordance with the present invention, wherein the system of the present invention is configured as a virtual car control system (VCCS) 400. In the present embodiment, the VCCS comprises software and hardware components, wherein the software and hardware components interact to provide a virtual system that enables a user to control various systems within an automotive environment without physically removing their hands from the steering wheel and shifting their eyesight from the road.

The VCCS system 400 includes hardware and software elements to replicate and control mechanical and electrical controls within an automotive environment. The VCCS includes a computer unit 410, a tracker system 450 including a system electronic unit 420, at least one sensor 425 and at least one transmitter 430, a control button 460 and a heads up display device 470 or alternatively a see through HMD. The VCCS further includes software components 480 stored on a computer readable medium disposed within the computer unit 410. The software components include an operating system 482, a virtual environment manager program 484 and a multi-dimensional basic input/output subsystem (MD-BIOS) 486 program.

Referring now to FIG. 16 there is shown an exemplary embodiment of the VCCS as seen from a user's perspective in accordance with the present invention. As shown in FIG. 16, an image showing three-dimensional buttons 500 would be projected onto the windshield 505 by a heads up display device 470, when the buttons are displayed on the windshield coordinate information is associated with each of the buttons. The coordinate information of each button locates each button in space in a plane spaced apart from the steering wheel, this can be seen by the three-dimensional buttons disposed on box 510 which are shown for exemplary purposes only and will not be actually seen by the user. By placing the origin coordinates for each button in a plane aligned with the physical steering wheel of the vehicle, the user may interact with the buttons without removing their hand's from the steering wheel. In addition to the three-dimensional buttons displayed on the windshield, the VCCS may further include at least one physical button. In a preferred embodiment the physical button(s) would be disposed on the steering wheel or steering column. The physical buttons may be utilized to turn the heads up display on and off, menu return, enter, clear, dial, send or any similar command which may be utilized to control any aspect of the VCCS system.

In use, at least one sensor would be disposed on a user's person, in a preferred embodiment at least one sensor would be disposed on each of the user's thumbs, but it is contemplated that additional sensors may be disposed on the user's additional fingers. The sensor(s) interact with a signal generated from a transmitter, wherein the sensors produce a position signal due to interaction with the transmitted signal. The position signal is converted into coordinate information by the SEU after being transmitted to the SEU. The coordinate information is transmitted to the MD-BIOS software where time stamp data is added and the coordinate information is stored in a memory location. It is further contemplated that a sensor identification tag may also be associated with the sensor, added by the SEU or added by MD-BIOS to the coordinate data. The coordinate data is then utilized by the VEM to determine if motion of a sensor passes threshold values, and if so, what is the user's intent, the coordinate data is then compared to the origin coordinate information for each of the three-dimensional buttons virtually located in a plane adjacent to the steering wheel. A virtual hand may also be displayed on the windshield to illustrate the motion of the sensor or a cursor or other visual marker may be displayed on the windshield so that the user may visually correlate their hand location on the steering wheel with the virtual three-dimensional buttons displayed on the windshield.

As described above the VCCS system in accordance with the present invention provides a virtual interface allowing a user to control various components of an automobile. Each of the buttons would be displayed on the windshield as having three-dimensional characteristics. Wherein multiple layers of buttons may be utilized to control various systems. For example, as one button is pressed, additional buttons may be displayed on the windshield, wherein the additional buttons are displayed as being tiled over the previous layer of buttons. This may be better understood as shown in FIGS. 17-19 wherein there is shown an exemplary embodiment of the VCCS system in use in accordance with the present invention.

Figure 17:
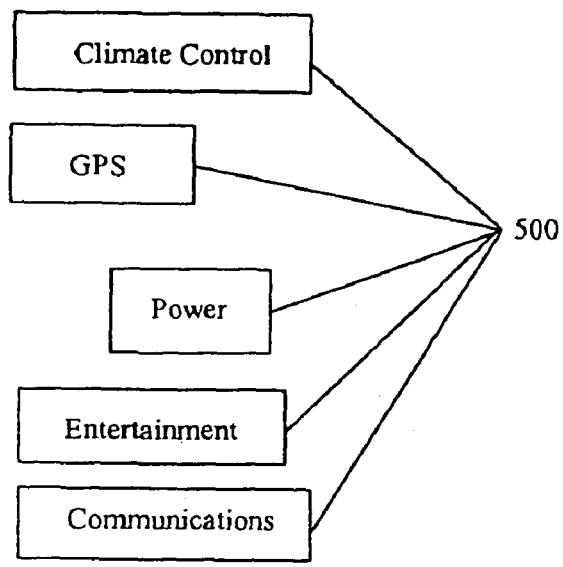
FIG. 17 is an exemplary embodiment of the high-level virtual buttons in accordance with the virtual car control system.
Figure 18:
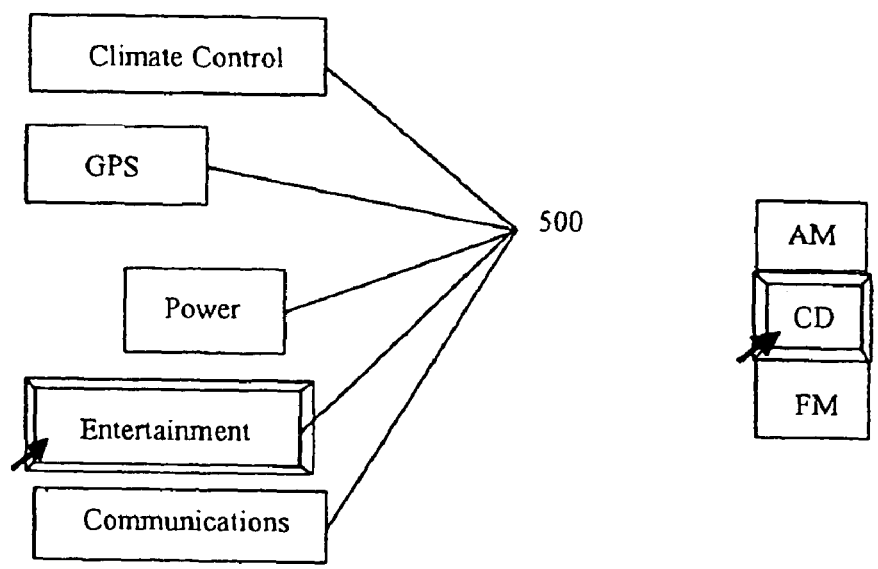
FIG. 18 is an exemplary embodiment illustrating the high-level virtual buttons and the second level of virtual buttons in accordance with the virtual car control system.

Referring now to FIG. 17 there is shown a series of three-dimensional buttons as they would be displayed by the heads-up display device and projected onto an automobiles windshield. As previously described, the display device or the VCCS system may be controlled by a physical button wherein, after the button has been depressed the buttons would be displayed on the windshield. The buttons displayed would have origin coordinates that would place the buttons in plane space adjacent to the user's left hand on the steering wheel wherein the first level of buttons displayed would be high-level system buttons. For example, one button will be displayed to access the climate control system, another for the GPS system, and another for an entertainment system and so on. It shall be understood that the list above should be considered exemplary and should not be considered limiting in any manner. If the user desires to access the entertainment system, they would move their thumb to a physical location which would correlate to the virtual entertainment system button, wherein motion of their thumb over the virtual entertainment button would be deemed to be a button press by the software components of the present invention. As a result, a second set of virtual buttons would be displayed by the heads-up display device and projected onto the windshield as shown in FIG. 18. The additional buttons displayed would have origin coordinates that would place the buttons in plane space adjacent to the user's right hand on the steering wheel. As shown, the additional buttons would provide the user with audio/video components as installed, such as AM/FM radio, cassette, compact disc, DVD audio and the like. As shown in FIG. 19, the user has selected the CD button, wherein the visual display of the CD button is changed, for example the button is made larger thereby appearing to be in a different plane than the other buttons and the color of the button may change to indicate that the button has been selected. Additionally, it is contemplated that an audible feedback may also be associated with button selection in addition to the visual feedback described above.

Figure 19:
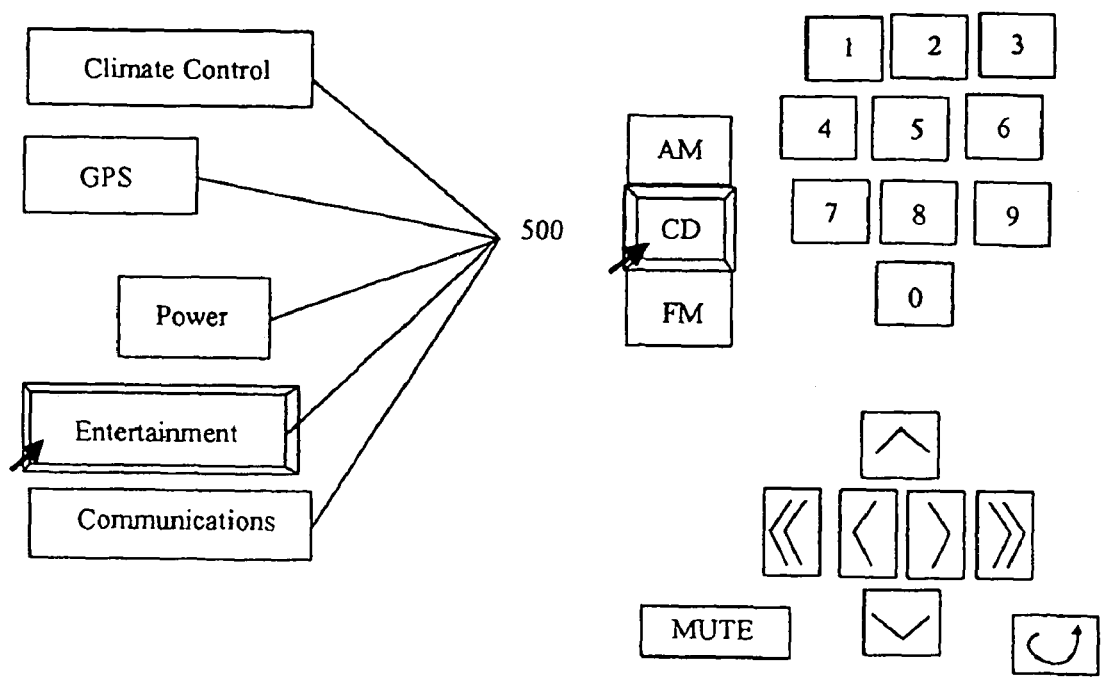
FIG. 19 is an exemplary embodiment illustrating the high-level virtual buttons, the second level, and third level of virtual buttons in accordance with the virtual car control system.

As shown in FIG. 19, after selecting the CD button, additional buttons will be displayed adjacent to the selected CD button wherein the additional buttons include controls associated with the CD player. For example, fast forward, skip, rewind, disc selection, mute, volume and menu return.

Figure 20:
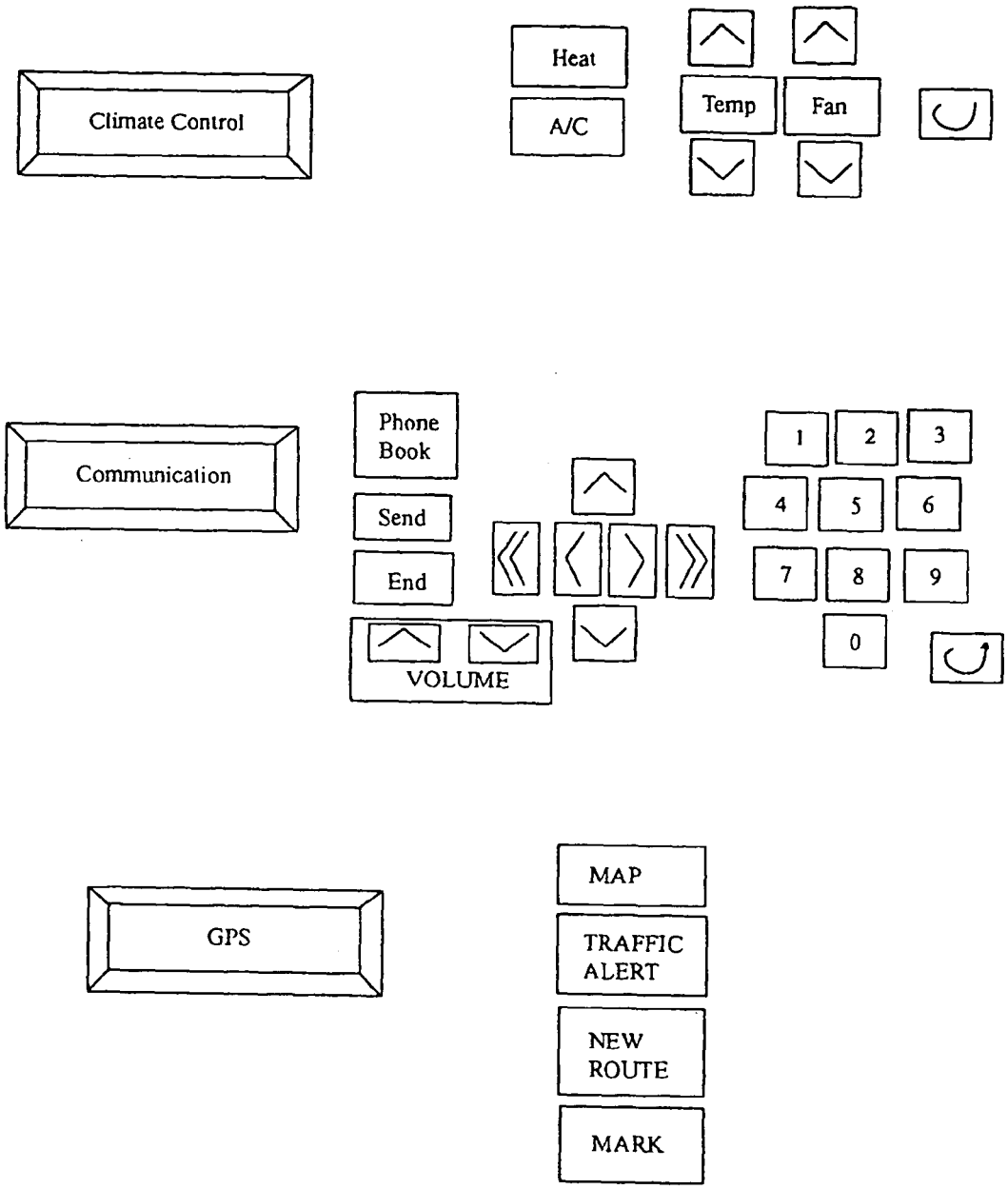
FIG. 20 illustrates exemplary embodiments of additional second level virtual buttons after selection of the high-level virtual button.

Referring now to FIG. 20 there is shown exemplary embodiments of additional buttons that may be displayed in accordance with the VCCS system of the present invention. As shown in FIG. 20, additional buttons may be displayed to control a navigation system such as a GPS system, Climate control system, communication system such as a cellular phone, as well as automotive control systems such as traction control, system information and the like. As shown in FIG. 20, each of the top level buttons have been selected thereby causing the second menu to be displayed on the screen. It shall be understood that the menus shown in FIGS. 16-20 should be considered exemplary and not limiting in any manner in that the menus may be altered without deviating from the scope of the invention.

According to another embodiment of the invention, video and/or audio systems may be used to obtain and track coordinate, spatial and temporal characteristics of a real world object (e.g., fingers of a hand). As explained in more detail below, the audio-video (AV) apparatus may be the AV subsystems commonly installed in mobile telecommunications devices such as cellular telephones and personal digital assistants (PDAs). According to this embodiment of the invention, no sensors need to be mounted on the real world object, as is required in the previously disclosed embodiments.

Figure 21:
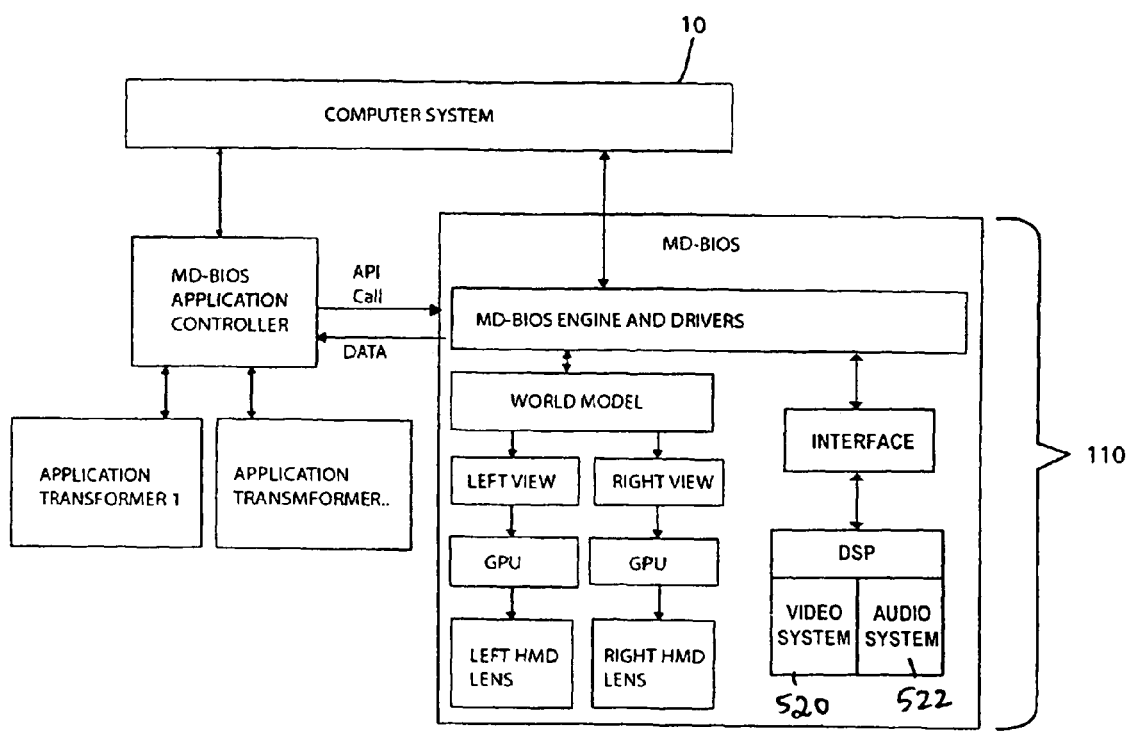
FIG. 21 is a diagram illustrating the interaction between the software and hardware components of the present invention, including the interface between the audio-visual components of a 3G or 3C device, according to an embodiment of the present invention.

As shown in FIG. 21, instead of employing a tracker system 80 requiring use of sensors attached to the real world object, as described in the embodiment illustrated in FIGS. 3 and 9 above, a video system 520 and optionally audio system 522 of a 3G cellular telephone, 3C (Computing, Communication, Consumer) device, or other computing device is employed to determine and track the position (i.e. coordinates), size of the real world object(s), and/or temporal information relating to the real world object. A multi-dimensional basic input/output system (MD-BIOS) 110 is configured to receive the positional and temporal data of the real world object from the video and optional audio systems of the computing device.

FIG. 22 is a conceptual diagram of what will be referred to herein as the "Audio-Visual 3D" system, according to an embodiment of the present invention. A 3G phone or 3C device 610 having a first detection mechanism (e.g. a camera) 612 and a second detection mechanism (e.g. a microphone or pressure sensor, infrared motion detector, etc.) 614 is configured to determine the coordinate $(x_w, y_w, z_w)$ of a real world object 616 in the physical world 618. The first detection mechanism is used to determine coordinates the x, y coordinate, i.e., $(x_i, y_i)$ of an image 620 of the object 616 projected onto an image plane 622. (For ease in illustrating the image plane is shown as a reversed image plane in the drawing. The actual image plane is at coordinate $(x_i, y_i, -Z_i)$, where $-Z_i$ is the focal length of the first detection mechanism.) The $(x_i, y_i, Z_i)$ coordinate corresponds to a pixel (or pixels) of the raw bi-dimensional image data. Predefined and preprocessed control points on the physical world surface 618 may be used to assist in determining the $(x_w, y_w, z_w)$ from (x, y) image coordinates. As explained in more detail below, change in coordinates caused by the object moving in space can be tracked and determined by comparing changes in chroma and light intensity of a sequence images, and dynamically determining edges of the object over time.

The second detection mechanism 614 is used to detect whether the object (e.g. a user's fingertips) has passed through or has come in contact with the virtual x-z plane (or planes), which is represented by y=−h (or y=d−h).

From the object image coordinate $(x_i, y_i, Z_i)$ determined by the first detection mechanism 612, and the distance from the origin to the x-z plane (i.e., −h) the real world coordinate $(x_w, y_w, z_w)$ of the real world object 616 can be determined as follows. From the image data the real world object 616 is first identified, using edge detection and chrominance measurements based on the YUV color space model as an example. Those of ordinary skill in the art will readily understand and appreciate that while the YUV color space model is used in this exemplary embodiment, that other color space models might also be used. If the object is a fingertip, the edge is detected using the edge detection processes explained more fully below, the central point of the highest $y_i$ (in screen coordinate) edge pixels is determined in the image data, and the $x_i$ value of the object is obtained. This information may be used to determine a predetermined identifier of the object (e.g. thumb, middle finger, ring finger, etc.)

Once the object or objects have been identified, the variable angle θ in FIG. 22 of each object (id, x, y) on the image plane is obtained by calculating the arccosine of the inner (i.e. scalar) product of unit vectors $v_i$ and $v_s$. In other words, $\theta = \cos^{-1}(v_i(x_i, y_i, Z_i) \cdot v_s(0, -h, 0))$, where the lower case vectors are the unit vectors of the upper case vectors $V_i$ and $V_s$ shown in FIG. 22, where the subscripts $_i$ stand for image, and $_s$ stand for surface. And through out the present disclosure the right hand coordinate system is used.

Once an object contacts the y=−h surface, the second detection mechanism 614 can determine the value of h, and the real world coordinate $(x_w, y_w, z_w)$ can then be determined as follows. Since R=h/cos θ, or R=h/$v_i(x_i, y_i, Z_i) \cdot v_s(0, -h, 0)$, then $(x_w, y_w, z_w) = R\, v_i(x_i, y_i, Z_i)$. The real world coordinate of the object 616, and the real world coordinate of other objects (e.g. other fingertips) may then be obtained by the MD-BIOS, and the process repeated to track the change over time in space of the object(s).

A time stamp and object identifier (id) may also be included with the coordinate data $(x_w, y_w, z_w)$ to produce an Audio-Visual multi-dimensional (MD) data object (id, $x_w$, $y_w$, $z_w$, t), which can be used for real-time applications. This Audio-Visual MD data object is obtained by the MD-BIOS and available for a virtual application as describe in more detail below. Other data that does not hit on the y=−h plane, but may need to be displayed on the screen of an application can be calculated from the two-dimensional data by the Mono-View 3D I/O method describe below, or by estimating the object movement on the image frame relative to other reference objects in the physical world, or if the object is an object of a human (e.g. finger), a user's habit for displaying the fingertip relative to the virtual device or in a 3D space environment.

The Audio-Visual 3D system does not require information concerning the size of the real world object 616. Indeed, the Audio-Visual 3D system may, in fact, be configured to determine the size of the object 616. Accordingly, the system is suitable for initial calibration or profiling of a particular object or objects of a particular user. This profiling data can be stored in system memory and later retrieved for normal operation. User profiling is described in more detail later in this disclosure.

According to an embodiment of the invention illustrated in FIG. 23, if the size $S_w$ of the real world object 616 is known (e.g. as previously determined by application of the Audio-Video 3D system profiling process described in more detail below or manual input) or can otherwise be estimated, a single video image system may be used to determine the real world coordinate $(x_w, y_w, z_w)$ of an object. This embodiment will be referred to as the "Mono-View 3D I/O" method.

The Mono-View 3D I/O method determines the real world coordinate $(x_w, y_w, z_w)$ from R, which is deduced from a known object size $S_w$, which may have been predetermined from a calibration or "profiling" method (described in detail below) using the Audio-Video 3D system. Defining the camera lens center 630 as the origin (x, y, z)=(0, 0, 0) the image plane 622 can be expresses as $z = Z_i$, where $Z_i$ is a constant real number (if not optical zoomed or adjusted) representing the focal length from the origin (0, 0, 0) to the image plane 622. Each pixel on the image plane 622 is represented by pixel (x, y, $Z_i$) 620, which can be expressed by space vector $r_i\, v_{(i, j, k)}$, where $r_i$ is a scalar expressed in the direction from (0, 0, 0) to pixel (x, y, $Z_i$) 620 and $v_{(i, j, k)}$ is its unit vector. (Note that $r_i$ corresponds to the adjustment factor e for R previously described.) For a specific object, for example an index finger or right thumb, an object location indicator (e.g. 616 in FIG. 23 or 616a in FIG. 24) on the image plane 622 is identified and defined as object(id_1, x1, y1, $Z_i$, t), and its unit vector is evaluated. For the same object, two control points (e.g. 638 in FIG. 23 or 638*a* in FIG. 24) on the image plane 622 are identified and defined as object(id_2, x2, y2, $Z_i$, t) and object (id_3, x3, y3, $Z_i$, t), and its size between the two points is evaluated. Based on the projection vector, the location indicator's world coordinate $(x_w, y_w, z_w)$ may then be determined.

When Mono-View 3D I/O is used, the determined real world coordinate $(x_w, y_w, z_w)$ may have to be modified, since the object size image through the image system lens may not be linear. According to this modification, and as shown in FIG. 23, the first factor, e, represents the statistical regression relationship of R, $S_i$, $S_w$, and the real world coordinate is modified as $(x_w, y_w, z_w)$=e R $v_i(x_i, y_i, Z_i)$. The real world size may also be corrected by a factor, d, to compensate for distortion effects caused by a wide-angle lens (FoV>60°) or fish-eye lens (FoV>110°). For standard lenses (typical human perception is about 40°, e.g. f=50 mm in 35 mm fil) and above, so the warp or distortion effects are negligible.

The object size $S_w$ (such as fingertip size) can be evaluated by two control points, e.g. 638*a* in FIG. 24, on the object. The following code segment illustrates the evaluation of object size $S_w$ performed in C/C++:

```
/* code in comments are done in other functions, inserted here for complete illustration
purpose.
    //expand from 2D 'CPoint    fngr_ctrl_pts[ FINGERS ][CTRL_PT_LENGTH];' to 3D
after fingers are identified.
    class cVertex {
    public:
        float   x ;
        float   y ;
        float   z ;
        ...
        cVertex( CPoint c2D ) throw( )
        { x= c2D.x, y=c2D.y, z=0 ; };
        ...
    };
    const float camera_focus_length = (float) 4.9 ;         //4.9mm for my "Logitech
QuickCame for NoteBook Pro" webcam
    const cVertex lens_center( 159.5, 119.5, 0);    //eg. for CIF format (=320*240) center
coordinate in floating point
                                                    //field of view(x,y) = (20.4*2, 15.5*2) degree
    const float mm_per_pixel_at_focus = camera_focus_length * tan(20.4*PI/180)/160;
*/
cVertex touch3d( fngr_ctrl_pts[i][CTL_PT_TOUCH]) ;
touch3d -= lens_center ;                    //x,y is in pixel
touch3d *= mm_per_pixel_at_focus ;          //transform x,y from pixel to mm
touch3d.z =camera_focus_length ;            //(x,y,z) is now in mm
touch3d /= touch3d.vectLength( ) ;          //make it a unit vector in mm
/*
CSize fngr_scrn_size = fngr_ctrl_pts[i][CTL_PT_LEFT]
            – fngr_ctrl_pts[i][CTL_PT_RIGHT];
float finger_size_on_screen = sqrt( (float)
                fngr_scrn_size.cx*fngr_scrn_size.cx +
                fngr_scrn_size.cy*fngr_scrn_size.cy );
float real_finger_size = real_fngr_size_vect.vectLength( );
*/
float pixels_per_mm = finger_size_on_screen / real_finger_size ;
            //pixels_per_mm=Si/Sw, reversed back to Sw/Si at next step
//formula acquired by power regression for a specific camera, it shows the relationship
between distance and
//pixels per millimeter of real world object size appears on screen pixels.
float distance = 416.09 / pow( pixels_per_mm, (float)0.9209);
            // r^p * R = K (where K depend on lens configuration)
            //Where p= 0.9209, K= 416.09
//current finger_id i and its CURRent position p(x,y,z), still in camera coordinate for
now
fngr_md_output[i][CURR].p = distance * touch3d ;
    //(x_w, y_w, z_w) = e R v( i, j, k)       Where e is the adjustment factor that adjust R
//then translate to world coordinate base on camera height and lens tilt angle
//float gc_lens_tilt_rdn = (float) (–18.5 * PI/180) ; //p.x is the same direction as screen
coordinate
    cVertex     vtx ;       //for rotate camera tilt angle back to be orthogonal
vtx = fngr_md_output[fid][CURR].p ;
fngr_md_output[fid][CURR].p.y= cos(gc_lens_tilt_rdn)*vtx.y
                                – sin(gc_lens_tilt_rdn)*vtx.z ;
fngr_md_output[fid][CURR].p.z= cos(gc_lens_tilt_rdn)*vtx.z
                                + sin(gc_lens_tilt_rdn)*vtx.y ;
//we got the finger 3D position here as fngr_md_output[i][CURR].p
```

The existing hardware configuration of some 3G or 3C devices may be insufficient by itself to achieve the desired 3D panoramic effect required for some applications. To achieve a panoramic effect, tilt, pan and zoom in/out features of the 3G or 3C device may be used to capture two or more snapshots. Each of these snapshots provides local 3D location information, similar to that described above in relation to FIGS. 22 and 23. Assuming that the camera of the device does not move, the Audio-Video 3D method may be used to determine a global position and global velocity associated with a real world object. More specifically, as shown in FIG. 25, the Audio-Visual 3D method described above in connection with FIG. 22 determines a first local position $P_1(x_1, y_1, z_1)$ of an object 616a at a first time, $t_1$, using coordinate information projected onto a first image plane 622a. The imaging system of the 3G or 3C device reports the panning angle $\theta_a$ between a first local x-z plane 652 and a global z-axis. Using this information, the global position of $P_1$ can then be obtained by the rotation matrix:

$$P_1(x_{g1}, y_{g1}, z_{g1}) = \begin{bmatrix} x_1 & y_1 & z_1 \end{bmatrix} \begin{bmatrix} \cos\theta_a & 0 & -\sin\theta_a \\ 0 & 1 & 0 \\ \sin\theta_a & 0 & \cos\theta_a \end{bmatrix}$$

Similarly, at a subsequent time, $t_2$, after the object has moved to a second local position 616b, the image coordinates of the object projected onto a second image plane 622b and the panning angular vector $\theta_a$ between a second local x-z plane 654, can be used to determine the global position of $P_2$ by the rotation matrix:

$$P_2(x_{g2}, y_{g2}, z_{g2}) = \begin{bmatrix} x_2 & y_2 & z_2 \end{bmatrix} \begin{bmatrix} \cos\theta_b & 0 & -\sin\theta_b \\ 0 & 1 & 0 \\ \sin\theta_b & 0 & \cos\theta_b \end{bmatrix}$$

Having determined the global positions of points $P_1$ and $P_2$, at two different instants in time (i.e. $t_1$ and $t_2$), the first derivative of the vector $V(X_{g2}-X_{g1}, Y_{g2}-Y_{g1}, Z_{g2}-Z_{g1})$, which represents the velocity may be determined.

$$\frac{\sqrt{(x_{g2}-x_{g1})^2 + (y_{g2}-y_{g1})^2 + (z_{g2}-z_{g1})^2}}{(t_2 - t_1)}$$

If both panning (rotation about global y-axis) and tilting (rotation about global x-axis) are present, the global position may be determined by the combination of two rotation matrices. In such circumstances the final global position will be the local position $P_l(x_l, y_l, z_l)$, as calculated by the Audio-Visual 3D method described above, combined with the panned global position $P_p(x_p, y_p, z_p)$ after panning $\theta_p$ as explained above:

$$P_p(x_p, y_p, z_p) = \begin{bmatrix} x_l & y_l & z_l \end{bmatrix} \begin{bmatrix} \cos\theta_p & 0 & -\sin\theta_p \\ 0 & 1 & 0 \\ \sin\theta_p & 0 & \cos\theta_p \end{bmatrix}$$

Combining the tilting rotation around the x-axis 660 results in:

$$P_t(x_t, y_t, z_t) = \begin{bmatrix} x_p & y_p & z_p \end{bmatrix} \begin{bmatrix} 1 & 0 & 0 \\ 0 & \cos\theta_t & \sin\theta_t \\ 0 & -\sin\theta_t & \cos\theta_t \end{bmatrix}$$

Using the vector and velocity formula previously described, the vector and velocity information, taking into account panning and tilting, can be determined. This information may then be communicated to the MD-BIOS and available for use by an application.

Overall, the precision at which a fixed-sized object may be determined by the imaging system depends on the number of pixels of the imaging system detector used to detect the object. More specifically, and as shown in FIG. 26, the precision is determined by 1) the number of x and y direction pixels; 2) the distance between the lens and the object; and 3) the zoom in/out or perspective value with focus length adjustment. For a virtual device (e.g. virtual application surface 624) in a typical short range environment, a higher resolution image plane 622c (relative to the object of interest) can be though of as an image plane that is closer to the object 625, assuming the pixel size is the same as it is for the lower resolution image 622d. (Note that the image planes 622c and 622d are actually formed on the opposite side (in terms of Zi) and opposite orientation (in terms of x and y) through a lens. The image planes are shown in the drawing on opposite sides and opposite orientation for ease in illustration.)

FIG. 26 also illustrates how the system suitably conforms to the assumptions discussed above for the Mono-View 3D input method. Specifically, because the size control points (see 638a in FIG. 24) of the object's (e.g. user's fingers) 625 do not "pitch", that is the fingers do not self rotate around the y-axis direction, the control line lengths projected onto the image plane 622 is quite steady, and the assumptions are, therefore, appropriate.

Referring now to FIG. 27, there is shown a flow diagram illustrating the Audio-Visual 3D input method, according to an embodiment of the present invention. At F10 ("F" prefix indicating "flow" reference), the computing system 10 is ready and stands by until at F20, the MD-BIOS engine and drivers are loaded into random access memory. At F30, the system detects the input method of the current setup. At F40, a determination is made as to whether to use Audio-Visual 3D input. If "no", the user has decided to use an alternative MD-BIOS input process, e.g., the sensor tracker system 80 previously described. If "yes", at F60 the user is prompted for login information and to select a user and environment profile.

If the user is a new user, a visual calibration (or "profiling") process is performed at F70. The MD-BIOS adjusts camera lighting conditions and visual factors so that the user profile can be properly obtained. User profiling involves determining the user's body object size, color and/or shape, and is discussed in more detail below. The user profile information (e.g. colors, textures and sound wave properties) obtained by various actions made by an object of the user's body parts in the user profiling process F70, are then stored in a database at F110 for future reference. (See FIG. 32 and accompanying description for more details concerning user profiling.)

If a new audio environment is present, at F90 the system performs an acoustic calibration process. At F100, the MD-BIOS adjusts the sensitivity and amplification of an automatic gain controller (AGC) of a microphone for reception of sound waves. During this adjustment process, the MD-BIOS may also switch to infrared detection if, for example, visible light conditions are weak. Once the new audio environment has been properly calibrated, the environment profile information is stored in a database at F110 for future reference.

At F120, the MD-BIOS retrieves the appropriate selected user and environment profiles from the database. At F140, the Mono-View 3D input method described above is employed to identify real world objects, e.g., using the first detection mechanism 612 in FIG. 22, and, optionally, employs an infrared or sound detection mechanism (i.e. second detection mechanism 614) to detect movement to the y=−h plane. At F160, using the Mono-View 3D I/O method, the MD-BIOS consolidates the two streams of data obtained from F140 and F150 for each object being identified and tracked. This data is then stored in a data queue of the MD-BIOS, each object having coordinate, identifier and/or time stamp information, i.e. (id, $x_w$, $y_w$, $z_w$, t), which is available for an application. An MD-BIOS dispatcher, at F130, reads and sends back coordinate information to and from VEM application at F180. The VEM is described in more detail above.

FIG. 28 illustrates in more detail how an audio subsystem of an audio-visual system may be employed for x-z plane detection, in order to complete the Audio-Visual 3D input method shown in FIG. 27. First, at F60 the user is prompted as to whether the user is a "new user" and/or whether the environment is a "new environment". If a new user, at F70 the system asks the user to place their objects (e.g. fingertips) at predetermined locations reflected on a display screen to perform a visual profiling process, and at F80 the imaging subsystem employed by the Audio-Visual 3D method is employed to calibrate and retrieve user profile data. If a new environment, at F90 the objects of the user come into contact with a physical world surface, as if operating a virtual device. At F100, the audio subsystem samples sound waves caused by the user's objects coming into contact with the physical world surface, and records the amplitude and/or frequency of the sound waves. Because the desired sound waves may be masked out by noises in the environment, the desired sound waves may be too low to be reliably detected. To overcome this problem, an AGC may be configured in the audio subsystem at F100, and one or more filters may be used to filter out the unwanted noise. Sound waves generated by, for example, typing on a virtual keyboard or tapping on various physical world surfaces (e.g., a table) produce unique sound wave patterns (or "sound characters") having different frequencies and amplitudes. At F110, the user and environment data (e.g., hand or finger size, color, shape, etc.), as detected by the visual and audio subsystems, are stored in a database for future retrieval by an application. The MD-BIOS may also retrieve the recorded sound character data from the user/environment database and pre-filter the character data for applications (e.g. as in F150 in FIG. 26).

At steps F120-F170 in FIG. 28, the MD-BIOS loads user profile and environment information from the user/environment database. This profile and environment information may be "new user" and "new environment" information as obtained by the processes described above, or may comprise profile and environment information that was previously stored for an existing user and/or environment. At F190a, an application requests target sound signals from the MD-BIOS. At F130, the MD-BIOS responds to the requests from the application and dispatches the requested data to the application. At F200, the application receives the requested data from the MD-BIOS. Finally, at F210 application specific logic interprets the received data (id, $x_w$, $y_w$, $z_w$, t) to determine an operator's intention, such as generate keystrokes or mouse clicks in Virtual Workstation application.

FIG. 29 illustrates how an infrared (IR) subsystem may be used for x-z plane detection, in order to complete the Audio-Visual 3D input method shown in FIG. 27. Due to the properties of IR detection, the detected signals are less likely to be interfered with compared to x-z plane detection using an audio subsystem. Further, the IR subsystem can be shared with the image system when a visible light source is not available, can't be used for security reasons, or can't be used for safety concerns (e.g. as may be present, for example, in a virtual display panel application in an automobile).

In real-time, long-range applications, e.g., as in wide range and/or fast moving training, gaming or virtual reality application environments, the sound waves detected by the audio subsystem may be recorded slightly later than image data recorded by the image subsystem. Accordingly, as illustrated in FIG. 30, it may be necessary to synchronize the sound wave data with the image data. The timing misalignment actually only becomes of concern when M fps×N meters away from the object is greater than about 345 m/sec sound speed in a standard-temperature-pressure (STP) environment. So, for example, at 60 frames per second, synchronization of sound data to image data becomes problematic when an object of interest is greater than about 6 meters away. According to an aspect of the invention, if necessary, when a sound wave sample is obtained by the audio subsystem, the sound wave sample is matched to its corresponding image frame. Knowing the speed of sound, the distance of the object from the audio-visual system, and the number of frames per second of the image subsystem, the number of "gap frames" may be calculated. The number of gap frames thereby allows matching the detected sound wave sample with the proper image frame.

While synchronization of a sound wave sample to the proper image frame may be necessary in some real-time, long-range applications, in most applications synchronization is not necessary. For example, even in a setop box equipped with a remote virtual keyboard/mouse, where the MD-BIOS controls the auto-zoom, focus, tilt, panning, etc. functions using the Audio-Visual or Mono-View 3D I/O methods, the system may be used by a user sitting a few meters away from a screen display (e.g. TV or HDTV) and observe representations of their fingers or other objects in real time on the display screen without the need to synchronize the audio and visual input data. Therefore, in most applications real-time interaction is possible without having to synchronize the audio and visual input data. Of course, not all embodiments of the present invention require use of a sound subsystem. However, an advantage of using a sound subsystem is that it results in a reduction in analysis power needed to identify an object, since the amount of sound signal data is much less than video image data.

According to an aspect of the present invention, before the two-dimensional image data of an object may be transformed into three-dimensional coordinates, a segmentation process (such as an edge detection process) is performed on the image data. This edge detection process segments an image frame into a plurality of segments. Using a Laplacian of Gaussian (LoG) operator, which calculates the second spatial derivative of the image, edges of the segments may be determined. In areas where the image has a constant intensity (i.e., where the intensity gradient is zero), the LoG response will be zero or close to zero. In the vicinity of a change in intensity, however, the LoG response will be positive on the darker side, and negative on the lighter side (produced from the convolution operator M below). The LoG operation may be modified by extending the smoothing capability to its maximum (using appropriate standard deviation, a); reserving the difference ratio to its maximum accuracy for LoG distribution when carefully choosing a denominator to change LoG values from floating point values to integers; and using only the minimum required computing power (e.g., minimum number of 0s in a minimum matrix size) since N*0 is wasted energy. Following these modifications, the LoG at standard deviation, σ=2.6 and a denominator of 0.0024 produces the following exemplary 5×5 convolution operator:

$$M = \begin{vmatrix} 1 & 1 & 2 & 1 & 1 \\ 1 & 2 & 2 & 2 & 1 \\ 2 & 2 & -36 & 2 & 2 \\ 1 & 2 & 2 & 2 & 1 \\ 1 & 1 & 2 & 1 & 1 \end{vmatrix}$$

This exemplary convolution operator M does not have 0s in is elements. Hence, computation power is not wasted by performing calculations on zero-valued elements. Yet the operator stretches to its maximum standard deviation, thereby minimizing "salt and pepper" (i.e., dot noise) effects and facilitating the shape discovery process in the detected object image. Using such an operator, the second order derivative "Zero-Crossing" value can be set to 100-150 for lower contrast background image areas (e.g., image background of finger images) and to 200-300 for a higher contrast image of the objects of interest (e.g. fingers). Alternatively, adaptive thresholds may be set using, for example, a histogram to localize an optimal Zero Crossing threshold for edge selection. The "Zero Crossing" threshold is a function of brightness and has characteristics similar to the HLS (hue, lightness, saturation) model. So, for example, in conditions where light is too dim or too bright (contrast becomes lower), the Zero Crossing threshold will need to be lower.

FIG. 31 shows a flow diagram illustrating a Dynamic Edge Detection method, according to an embodiment of the present invention. The Dynamic Edge Detection process is used in normal 3D input operation (to determine R, e, and unit vector $v_{(i,j,k)}$ and may also be used for profiling (to determine $S_w$) (see FIG. 23). A first step in the method is to determine whether Dynamic Edge Detection for profiling or operation is to be performed.

If profiling, at F80-20 the MD-BIOS adjusts video subsystem lighting conditions and the video subsystem takes a snapshot of the real world objects (e.g., hands, or various colors of gloves). Preferably, a higher pixel mode is used for profiling compared to normal operation. FIG. 32 is a flow diagram illustrating an exemplary profiling process applied to obtain profiling information of the fingers of a user's hand (e.g. for a virtual workstation) or gloves (e.g. for a virtual gaming application or in cold environment), according to an aspect of the present invention. Similar processes may be performed to obtain profiling information of other objects for other applications. First, at F70 the user taps her fingers at specified physical world positions that overlap with a system generated image. R and h (see FIGS. 22 and 23) are known. At F80-10 (see FIG. 32), the Audio-Visual 3D system takes a snapshot of the hands (or various colors of gloves, if any), preferably in a high-resolution mode. At F80-20, objects are identified by segmentation of color, texture and/or edge in predefined regions. Optionally, at F80-30 chroma data from the segmentation process is retrieved for statistics and modeling purposes. At F80-40, the system calculates control points of objects (see, e.g. FIG. 24) to determine image sizes $S_i$ (see FIG. 23) of targeted objects. Then, at F80-50, the real world object sizes $S_w$ (refer again to FIG. 23) are computed based on the formula, $R=e\times S_w/S_i$. Finally, at F110 the profile information is stored in a user profile database. This information may then be retrieved by, for example the Mono-View 3D method, for application purposes.

If normal operation of the Dynamic Edge Detection process of FIG. 30, at F140-(10-30) (see FIG. 33B) the video subsystem takes a snapshot of the real world object(s), and a "Moving Delta" process compares the snapshot (i.e. current image data) with a previous snapshot to determine regions of the image that contain moving object(s). According to one embodiment, the video subsystem of a 3G mobile device or 3C device is used in CIF (320×240) or VGA (640×480) mode. After the moving regions (targeted regions) have been determined (or the profiling information is obtained), at F300 the LoG convolution operator M described above operates on each pixel in the targeted regions to approximate edges and curves of parts of the objects determined to have moved.

FIG. 33A is a table illustrating how the Y, UV components retrieved from the YUV (or [I]YUV) video data stream are applied in the Moving Delta process. Using the YUV color space model (Y=luminance (brightness), U, V=chrominance (color)), deltas of moving objects can be ascertained. The table also shows target Y, UV values for moving and stationary skin components of an object, according to an exemplary embodiment of the invention.

FIG. 33B is a flow diagram illustrating an exemplary Moving Delta process. At F140-10, for each pixel frame, pixels are scanned for both x and y coordinates. As shown, the Moving Delta process is pixel based, unlike blocks of data such as sprites of an MPEG. Accordingly, unlike MPEG evaluation, a clear delta relative to a prior previous position of the object can be determined.

FIGS. 34A through 34D show an example of how the YUV Moving Delta process determines the deltas of a plurality of objects (here fingers) by comparing pixel data of an image of previous finger positions to current finger positions. The YUV values allow a determination to be made as to whether a pixel in a previous frame has changed in a current frame. The Y changes create regions for the LoG operator (e.g., the 5×5 convolution matrix M) to operate on, and therefore avoid the need to calculate the entire bitmap for edge detection and shape discovery. FIG. 34A shows a combined image of the current and previous finger positions. The current finger positions are completely filled in, while the previous finger positions are filled in with a mesh pattern. FIG. 34B shows the outlines of the previous finger positions. FIG. 34C shows the outlines of the current finger positions. FIG. 34D shows a combined image of the previous and current finger positions, together with the outlines of both the previous and current finger positions. The previous finger position outlines are shown in pink, and the current finger positions are shown in white.

Motion may also be used to locate target objects for modeling and identification purposes. Accordingly, the Moving Delta process may be employed in the profiling process (refer to FIG. 32 above) to recognize traits of the target objects, since all other noise, non-target foreground and background objects can be excluded in the process (e.g. edge delta process).

Following the Moving Delta and LoG operations in the Dynamic Edge Detection process in FIG. 31, at F310, an "Extended Zero Crossing" process is performed, whereby the approximated edges and curves are analyzed to isolate those edges and curves that likely correspond to the object(s) of interest. For example U-shaped curves, which possibly correspond to the fingertips of a hand of the user, are isolated. FIG. 35 shows the Extended Zero Crossing process in more detail. In effect, the Extended Zero Crossing extends the Zero Crossing LoG selection criteria in order to completely retrieve all possible finger edge pixels. Note that there are two loops in the Extended Zero Crossing flow diagram. The outer loop starts from the first decision diamond to step F310-50. The inner loop, which checks eight neighboring pixels, is between F310-10 and F310-30.

Determining edges of an object is impacted by the available contrast between a given edge pixel and neighboring pixels. From time to time, the contrast may become blurred, especially when the object is moving. For example, if the object moves up and down in a fluorescent light environment (about 60 Hz), an edge of the moving object may disappear along the path of movement of the object. From the perspective of the video subsystem imaging sensor this blurring effect is along the direction of photon energy flow. FIGS. 36A and 36B are color screenshots illustrating how a missing edge may be caused by fast moving objects that are over-exposed, and/or the light intensity being too low to achieve sufficient exposure. Using a YUV color space model, the missing but expected edges can be clearly observed. Note that the motions are not properly "frozen" and the light reflection is not properly captured.

To overcome the missing edge problem, at F320 of the Dynamic Edge Detection process in FIG. 31, a "Moving Edge Recovery" process may be performed to compensate for missing but expected edges (e.g. edges of a fingertips). Missing but expected edges may result from poor image quality caused by, for example, inadequate focus light intensity and/or exposure time (on the optical side), or inadequate Zero Crossing value if LoG detection algorithm is used. FIG. 37 is a flow diagram illustrating the "Moving Edge Recovery" process in more detail, according to an aspect of the present invention. First, at F140-40 the moving edge(s) of an object of interest (e.g. fingertip) are determined using, for example, the UV skin model discussed above. Next, a first determination is made as to whether an edge is detected in the targeted region. If "yes", at F140-50 the existing high Zero-Crossing edge is used, and at F140-90 the current edge is linked with the previous edge if there is a gap between the two. If "no", a second determination is made as to whether a low threshold exists. If "yes", at F140-70 the new lower Zero-Crossing edge is used, and at F140-90 the current edge is linked with the previous edge if there is a gap between the two. If "no", at F140-80 the UV fingertip edge or the Moving Delta edge is used, and at F140-90 the current edge is linked with the previous edge if there is a gap between the two.

FIGS. 38A-J are color screenshot outputs from an exemplary audio-visual 3D system prototype, comparing edge detection with and without the Moving Edge Recovery process shown in FIG. 37. The series of screenshots illustrate the Moving Edge Recovery process assists the Dynamic Edge Detection process determine object edges. Note that because the little and ring fingers are maintained in stationary positions throughout the process, their characteristics do not need to be detected or processed again. Their positions were previously determined and, therefore, require no update.

FIG. 38A is an RGB screenshot of a user's hand when all fingers are placed down on the real world surface.

FIG. 38B is a color screenshot (Y=greyscale) illustrating the user's hand after finger edges and orientations have been detected. The finger sizes are represented by the white horizontal lines of the triangles. Regressions along the finger edges (the white vertical line segments) are used to guarantee a steady side edge, so that individual pixel shifts, caused by digitization or noise, do not disrupt the edges. The orientation of each of the fingers is shown be both the vertical green lines in the middles of the fingers and the directions at which the white triangles point. Fingertips are represented by tips of the white triangles, and fingertip touch points are indicated by the small white circles with red centers.

FIG. 38C is an RGB screenshot after the index and middle fingers have moved upward from the pose position shown in FIG. 38A.

FIG. 38D is a YUV screenshot of the user's hand after the "Moving Delta" process has been performed and skin chroma has been identified for reference. The solid pink colors reveal the hand and show the current finger/skin object of the user's hand. The dot/mesh patterns represent the Y and UV moving delta and shows the shapes and positions of the fingers prior to being moved to the position shown in FIG. 38C.

FIG. 38E is a YUV screenshot of the user's hand with the skin chroma removed from the output. The Moving Delta is maintained to reveal the original (i.e. pose) finger positions prior to being moved to the current position shown in FIGS. 38C and 38D.

FIG. 38F is a screenshot of the user's hand illustrating the Y edge and the recovered Moving Edge. The missing edge in the normal Zero Crossing process is compensated by the Moving Edge Recovery process.

FIG. 38G is a screenshot of the user's hand illustrating the Y, UV Moving Delta and LoG without the Moving Edge being recovered. Note that the fingertips are not well defined.

FIG. 38H is a screenshot of the user's hand illustrating the Y, UV Moving Delta and LoG with the Moving Edge being recovered. Note that the application of the Moving Edge Recovery process results in the fingertips being well defined.

FIG. 38I is a screenshot of the user's hand illustrating that without application of the Moving Edge Recovery process (see FIG. 38G) the U-shaped approach is unable to detect the moved index and middle fingers.

FIG. 38J is a screenshot of the user's hand illustrating how the U-shaped detection process successfully detects the moved index and middle fingers when the Moving Edge Recovery process (see FIG. 38H) is applied. (Note that the thumb is also detected since it has moved more than one pixel from its previous position, although it has not moved upward as has the index and middle fingers.)

The input information obtained from the Mono-View 3D I/O and Audio-Visual 3D input methods and infrastructure described above may be used in many virtual applications, some of which are described below.

According to a first exemplary application, the input information is employed to generate a virtual workstation (VW). As an alternative to obtaining the input information using fingertip sensors, e.g., as described in the exemplary VW application above, the Audio-Visual and/or Mono-View 3D I/O processes and the audio-visual infrastructure of existing and future 3G or 3C devices may be used to obtain the input information for the VW.

FIG. 39 shows a VW application environment illustrating how the audio-visual infrastructure of a 3G or 3C device, and the Audio-Visual and/or Mono-View 3D I/O methods described above may be used to provide input information to the VW. The VW environment is similar to that described in FIGS. 22 and 26 above, except that virtual keyboard and mouse 624a are shown merged with the a table or imaginary surface 618a.

For ergonomic concerns, it is desired that the VW user be able to rest her hands or fingers on the physical world surface, and possibly even within areas of the physical world surface that correspond to keys of a keyboard or of a mouse. To accomplish this ergonomic desirability, the VW manager must not confuse a rest state with an operational (e.g., typing, mouse movement or clicking) state. According to an aspect of the invention, the "Relative Movements" of the user's fingers are monitored to determine the user's intention of operating on a virtual object, such as keyboard keys, which have the following characteristics. "Home keys" are the keys for the index finger, which are the "F" and "J" keys on a conventional QWERTY keyboard. "Home area" keys are (A, S, D, F) and (N, J, K, L) for the left and right hands, respectively. (The left and right thumbs may rest on the spacebar, or for some users on the "V" and "N" keys.) The Home-area key positions are the natural rest area for the user's hands and fingers. Prior art approaches require a user to hang their hands and fingers in space, thereby creating serious discomfort and possible injury. A special "Hold" key is used in the relative movement keystroke aspect of the invention. Its layout position is similar to the Fn or "Windows" key on most modern keyboards. The Hold key allows a user to inform the system of the user's intention of repeatedly typing a particular Home-area key, until either the finger at the Home-area key changes location or until the Hold key is released. Other types of keys are Control keys: Shift, Control, Alt, Fn (not the F1 through F12 keys), Windows key, etc.

With the above definitions, the VW system is able to track and determine "press", "release" and "hold" events in accordance with a relative movement keystroke method. For example, a "press" of a key area is determined by the detection of a round-trip (i.e. leave and back) movement, such as, for example when the index finger on the "J" key area moves up and down.

If a finger touches a key area that is not a Home-key area, a "pressed" event is sent repeatedly (e.g. every 50 milliseconds) until the finger leaves the area. If the finger touches a Home-key area and the Hold-key is not pressed, then after the finger moves away from the key area a "release" event is generated. If the Hold-key is pressed, then a "release" event is generated if either the finger on the Home-key area or Hold-key is moved away from the key area.

If a finger rests on a Home-key area and the Hold-key is not pressed, no event is generated. However, if a finger rests on a Home-key area and the Hold-key is also pressed, a "press" event for the Home-key is generated repeatedly until either of the fingers leaves its key area. If a finger rests on a key area that is not a Home-key area, a "press" event is generated repeatedly as described in the previous paragraph, irrespective of the position of the Hold-key.

Mouse movement is tracked when the user's indicator finger (e.g. index or middle) is in touch with the virtual mouse pad surface. Mouse clicks (e.g. left or right) is detected and events generated similar to that for the keyboard keys. For example, a double-click is the same or similar to pressing a key area twice within a predetermined amount of time.

FIG. 40 is a flow diagram illustrating operation of the VW using the Audio-Visual 3D infrastructure and methodology described above. First, at F5 a VW button (hardkey or softkey) on the 3G or 3C device is pressed by a user. The 3G or 3C device's default mode is typically a voice communications mode. Hence, using a VW button allows the device to conserve power by not entering the VW mode unless a user first presses the VW button. The VW mode may also be exited, if after a predetermined idle time the VW has not been used. At F15, the MD-BIOS stands by and is ready to operate using the audio-visual infrastructure of the 3G or 3C device. Between F60 and F110, a VW manager requests user and environmental profile information (see FIG. 27 for further details). At F120, the MD-BIOS is ready to load a selected profile and environment. The user may use a default VW (as in F65) or may use a customized VW (as in F 220). The user profile and environmental data stored in the database at F110 may include, but is not limited to, user fingertips, keyboard and mouse locations, shape, size, color, layout, language, moving and click speed, etc. required to operate a keyboard and mouse securely and accurately. At F 170, the MD-BIOS consolidates (id, x, y, z, t) data into working memory. At F130, the MD-BIOS listens for data requests from the application, conditions and filters signals, and sends coordinate data to the application in response to a request by the VW manager at F190, similar to a client-server methodology. At F210, the VW manager compares finger positions with the VW model and displays the VW model and user's hands on a display. At F320 a decision is made as to whether the VW objects have been properly targeted. If "no", the process branches back to F190, where the VW manager again requests coordinate data from the MD-BIOS. If "yes", at F240 a determination is made as to whether the objects have touched the virtual keyboard or mouse x-z planes. If "yes", at F260 a keyboard action signal is generated and transmitted to a keyboard driver. If "no", at F270 a mouse action signal is generated and transmitted to a mouse driver. The keyboard and mouse action signals are then used to simulate key pressing, mouse moving or clicking on the display, together with a set of virtual hands. Other features and operational aspects of the VW described above in connection with the VW using finger sensors may also be applied here in the Audio-Visual 3D input method. For example, among other attributes, the virtual keyboard and mouse pad may be displayed in the virtual environment so that they overlap. (See FIGS. 13 and 14.) As explained above, such a configuration and display helps to reduce repetitive stress injuries.

FIG. 41 is a conceptual diagram of a Virtual Conferencing (VC) application that uses the Audio-Visual and/or Mono-View 3D I/O methods, according to an exemplary embodiment of the present invention. The VC application is similar to the VW application except that the display space overlaps with the action space of the user's hands.

The distance between the camera 612 and the physical world surface 618 may be acquired during MD-BIOS calibration (see F70 in FIG. 27) by placing a known sized object (e.g. a ruler) on the surface 618. The Mono-View 3D I/O method can then be performed to determine the distance for the user for later use. As shown in FIG. 41, the VC system projects documents 740 and/or virtual devices onto a table for editing or co-authoring with remote groups. Alternatively, the document and/or virtual devices may be projected by a projector 730 for display on a wall or silver screen 750.

FIG. 42 is a flow diagram illustrating the operation of the VC shown in FIG. 41. The flow is similar to that shown for the VW in FIG. 40, except the application needs to calibrate object size and determine the location of objects rendered from the projector 730. To perform these functions, the same or similar mathematics and configuration used in the Mono-View 3D I/O method described above (see FIG. 23) may be used.

The VC application shown in FIGS. 41 and 42 may be extended for operation in a three-dimensional space, e.g., utilizing the Mono-View 3D I/O methods described above, for operation in a 3D display space, thereby allowing complete 3D input and output interaction to be realized. Additionally, one or more VWs may be included within the VC system, to facilitate authoring by multiple users and/or communications with a remote group.

FIG. 43 is a drawing illustrating a Virtual Car Control System (VCCS) application, which uses the Audio-Visual and/or Mono-View 3D I/O methods described above. A headsup display 500 is displayed on the windshield 505 of the vehicle. The headsup display 500 displays virtual controls and image indicator points 764 that correspond to the thumbs (world objects 766) of the driver. An infrared detection surface 624*b* within the circumference of the steering wheel 768 provides a virtual plane 624*b* that maps the position of real world object 616 onto corresponding position on the headup display. One or more infrared detectors 614*a* detect and track the positions of the driver's thumbs. A Virtual Control Panel (VCP) button 774 is provided to activate the VCCS system. The driver need not wear any sensors on her fingers, need not have to move her eyes away from the road, and need not move her hands away from the steering wheel 768 in order to maintain and operate controls of the vehicle.

The VCCS actually belongs to a broader category of virtual applications that may be referred to as Virtual Control Panel (VCP) applications. VCP applications are input source independent applications, which use the Audio-Video 3D or Mono-View 3D I/O methods as its input source. The VCP can be extended to other applications such as flight simulation, can augment virtual reality application (e.g. remote medication), training, learning, etc.

As described, the VCP system utilizes the Audio-Visual 3D input method, together with the one or more infrared detectors 614*a* to receive coordinate information. In an alternative embodiment, the Mono-View 3D I/O method may be used by, for example, configuring a camera near the top seam of the windshield 762. The camera, when properly positioned, is then able to view and track finger movement of the driver.

FIG. 44 is a drawing illustrating a Virtual Music Station (VMS) application, which uses the Audio-Visual and/or Mono-View 3D I/O methods described above. This application conforms with the "controller" and "transformer" concept discussed above. A VMS manager (an instance of VEM) operates similar to the VW manager, which controls data distribution to its transformers (i.e., keyboard and mouse). As shown in FIG. 44, the VMS manger uses the building blocks of a Virtual Control Panel 780 (buttons, knobs, shift controls, etc.) and Virtual Keyboard 782 (music keys). Together these building blocks can simulate the operation of an electronic music instrument. FIG. 44 illustrates the display to the user, including the Virtual Control Panel 780, Virtual Keyboard 782, and a set of virtual hands 784, which lets the user know her hand positions relative to the VMS.

FIG. 45 is a drawing illustrating how the Audio-Visual and/or Mono-View 3D I/O methods discussed above may be used in a Real Gamestation (RG) application. According to this application, a player may use their body parts to directly control the corresponding body parts of a virtual character in a gaming environment without having to translate keyboard, mouse or gamepad movements indicating the player's intention. Unlike prior art approaches, this direct control provides more realistic sensations when playing the game. Accordingly, the Audio-Video and/or Mono-View I/O methods replaces gamepads, such as used in Microsoft Xbox, Sony Playstation, Nintendo Gamecube, and other gaming systems. The left-hand side of FIG. 45 shows how the RG system may use a projector or large screen television as its display. The right-hand side of the drawing shows how, alternatively, a dual-view system, e.g. head/eye mounted display (H/EMD) or other type of 3D display capable of rendering two complementary views to form 3D perception may be used. Optionally, haptic output received on one or more of the player's body parts may be employed to intensify the gaming pleasure, e.g., by providing tactile feedback for touch sensation. RG provides not only entertainment, but may also be used for exercise and fitness. Further, the audio/video frame synchronization and tilt, panning aspects of the invention may be incorporated into the RG system, to compensate for fast moving objects and to increase the horizontal and vertical fields of view. Auto-focus and auto-zoom features of the audio-visual infrastructure may also be used to increase accuracy and extend the distance of the detection range. For RG systems employing a single camera, preferably the target objects are close to 45 degrees with respect to each one of the x, y, and z axes. This allows changes in the object's position to more sensitively reflected by $\cos(\pi/4)$.

Although the present application has been described in detail with reference to an entertainment system this shall not be considered limiting in any manner. Further still, it is contemplated that the VCCS system may be utilized in combination with mechanical switches or physical control means. For example, the entertainment system may be controlled with the UCC system by the driver and also may be controlled by the driver or a passenger with conventional means installed in the automobile. As described previously, the heads-up display may be controlled by a mechanical switch, a virtual switch or the display may be time controlled, wherein once activated, if no input is received from the user, the display will turn off, wherein the user can then re-activate the system. It is further contemplated that the system may have additional restrictive controls such as a maximum speed control, wherein the system may not be accessed if the vehicle is traveling beyond a pre-set speed, or if the steering wheel has been rotated past a pre-set degree. Additionally, the VCCS system may utilize voice command software in addition to those hardware and software components described above.

Although the coordinate information of the present invention has been described herein as being restricted to the x, y, and z-axis, the sensors are further capable of generating yaw, pitch and roll coordinate information in combination with the hardware and software components of the present invention. The additional coordinate information may be utilized by applications not mentioned specifically herein. For example, if the virtual environment manager of the present invention was tailored to represent a virtual flight training simulator, the yaw, pitch and roll coordinates would be utilized to simulate movement of a virtual plane.

Although the present invention has been described with reference to a virtual workstation such as a personal computer or laptop computer it is contemplated that the system and methods in accordance with the present invention may be utilized to replace other types of physical systems. Such as Virtual Game station or VR conference. For example, the present invention may be utilized to replace a gaming system such as an X-Box® or a Playstation®. It is further contemplated that the present invention may be utilized in combination with others, wherein the multiple systems may be utilized for communication between each of the users. Systems such as this may be utilized by military forces for covert communications, pilots, motorsport race teams and other similar careers that may require communication amongst more than one person. Another contemplated use for the present invention is warehouse management and inventory control, wherein the user may roam freely around the warehouse entering inventory, fulfilling orders, or maintaining quality control. Although the present invention has been described with regards to specific examples these examples should not be considered limiting in any manner in that the methods of the present invention may be applied to a wide variety of technologies, many of which were not disclosed here.

The instant invention is shown and described herein in what is considered to be the most practical, and preferred embodiments. It is recognized, however, that departures may be made there from, which are within the scope of the invention, and that obvious modifications will occur to one skilled in the art upon reading this disclosure.

What is claimed is:

1. A method of determining the location of an object in three-dimensional space, comprising: using an imaging device, capturing an image of a real world object; determining a size of the real world object represented in the captured image; and based on a size of the real world object and the size of the real world object represented in the captured image, determining three-dimensional coordinates of the real world object.

2. The method of claim 1, further comprising determining the size of the real world object using the data in the captured image of the real world object.

3. The method of claim 2, further comprising: storing the determined size of the real world object; and retrieving the determined size of the real world object for use in the determining of three-dimensional coordinates of the real world object.

4. The method of claim 2, wherein determining the size of the real world object comprises a calibration for the real world object of a system used to perform the determining of three-dimensional coordinates of the real world object.

5. The method of claim 2, further comprising modifying the determined size of the real world object to compensate for distortion effects produced by the imaging device.

6. The method of claim 5, wherein the imaging device includes a lens and the modifying of the determined size of the real world object compensates for distortion effects produced by the lens.

7. The method of claim 6, wherein the lens is a wide angle lens.

8. The method of claim 2, further comprising modifying the determined size of the real world object to compensate for nonlinear effects produced by the imaging device.

9. The method of claim 8, wherein the imaging device includes a lens and the modifying of the determined size of the real world object compensates for distortion effects produced by the lens.

10. The method of claim 1 wherein the size of the real world object is predetermined.

11. The method of claim 10, further comprising: storing the predetermined size of the real world object; and retrieving the stored predetermined size of the real world object for use in the determining of three-dimensional coordinates of the real world object.

12. The method of claim 1, further comprising determining a distance between the captured image and the real world object.

13. The method of claim 12, further comprising modifying the determined distance to correct for nonlinear optical effects produced by the imaging device.

14. The method of claim 12, wherein the captured image is at a focal length of the imaging device.

15. The method of claim 1, further comprising determining a vector along a line between the captured image and an origin of the imaging device.

16. The method of claim 1 wherein the determined three-dimensional coordinates are used to operate or control a virtual device.

17. The method of claim 16 wherein the virtual device comprises a virtual workstation, virtual conferencing system, virtual control panel, a virtual music station, or a virtual gaming system.

18. The method of claim 1 wherein the imaging device comprises a single camera.

19. The method of claim 18 wherein the single camera comprises a camera in a communications or computing device.

20. The method of claim 19 wherein the communications or computing device comprises a mobile communications or computing device.

21. The method of claim 1, further comprising: storing the size of the real world object; and retrieving the stored size of the real world object for use in the determining of three-dimensional coordinates of the real world object.

* * * * *